United States Patent
Kim et al.

(10) Patent No.: US 9,531,576 B2
(45) Date of Patent: Dec. 27, 2016

(54) METHOD AND APPARATUS FOR TRANSMITTING MODULATION SYMBOL USING 256QAM IN A WIRELESS ACCESS SYSTEM

(71) Applicant: LG ELECTRONICS INC., Seoul (KR)

(72) Inventors: Bonghoe Kim, Seoul (KR); Dongyoun Seo, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 134 days.

(21) Appl. No.: 14/527,401

(22) Filed: Oct. 29, 2014

(65) Prior Publication Data

US 2015/0249564 A1 Sep. 3, 2015

Related U.S. Application Data

(60) Provisional application No. 61/897,204, filed on Oct. 29, 2013.

(51) Int. Cl.
*H04L 27/36* (2006.01)
*H04L 1/00* (2006.01)
*H04W 72/04* (2009.01)
*H04L 5/00* (2006.01)
*H04L 27/34* (2006.01)

(52) U.S. Cl.
CPC .......... *H04L 27/362* (2013.01); *H04L 1/0003* (2013.01); *H04L 1/0009* (2013.01); *H04L 5/001* (2013.01); *H04L 5/0007* (2013.01); *H04L 27/3416* (2013.01); *H04L 27/36* (2013.01); *H04W 72/042* (2013.01); *H04L 1/0066* (2013.01); *H04L 5/0048* (2013.01); *H04L 5/0053* (2013.01)

(58) Field of Classification Search
CPC .... H04L 27/362; H04L 5/0007; H04L 1/0003; H04L 1/0009; H04W 72/042
See application file for complete search history.

(56) References Cited

U.S. PATENT DOCUMENTS

| | | | |
|---|---|---|---|
| 8,422,579 B1 | 4/2013 | Morais | |
| 8,432,881 B2* | 4/2013 | Ko | H04L 5/0053 370/341 |
| 2003/0123582 A1* | 7/2003 | Kim | H04B 7/0848 375/347 |

(Continued)

FOREIGN PATENT DOCUMENTS

| | | |
|---|---|---|
| EP | 2571173 A1 | 3/2013 |
| EP | 2611092 A1 | 7/2013 |
| WO | WO 2013/123961 A1 | 8/2013 |

*Primary Examiner* — Charles C Jiang
*Assistant Examiner* — Thad Defauw
(74) *Attorney, Agent, or Firm* — Birch, Stewart, Kolasch & Birch, LLP

(57) ABSTRACT

Disclosed herein is a wireless access system and, more particularly, methods and apparatuses for designing a 256 quadrature amplitude modulation (QAM) constellation point and transmitting a modulation symbol using the same in order to support a 256QAM scheme. The method for transmitting a modulation symbol using a 256 quadrature amplitude modulation (QAM) scheme at a transmitter in a wireless access system includes modulating octuplet bits into one modulation symbol using the 256QAM scheme, mapping the modulation symbol to one of 256QAM constellation points and transmitting the mapped modulation symbol.

12 Claims, 13 Drawing Sheets

(56) References Cited

U.S. PATENT DOCUMENTS

2011/0122960 A1\* 5/2011 Vitale .................... H03M 13/11
375/261
2013/0216001 A1\* 8/2013 Petrov .................... H04L 1/007
375/298

\* cited by examiner

METHOD AND APPARATUS FOR TRANSMITTING MODULATION SYMBOL USING 256QAM IN A WIRELESS ACCESS SYSTEM

This application claims the benefit of Provisional U.S.A. Patent Applications No. 61/897,204 filed on Oct. 29, 2013 which is hereby incorporated by reference as if fully set forth herein.

BACKGROUND OF THE INVENTION

Field of the Invention

The present invention relates to a wireless access system and, more particularly, to methods and apparatuses for designing a 256 quadrature amplitude modulation (QAM) constellation point and transmitting a modulation symbol using the same in order to support a 256QAM scheme.

Discussion of the Related Art

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

SUMMARY OF THE INVENTION

A current LTE/LTE-A system is designed to adopt Quadrature Phase Shift Keying (QPSK), 16 Quadrature Amplitude Modulation (16QAM), and 64QAM as the modulation schemes. However, in order to increase the data transmission amount as well as to efficiently use radio resources, many people and developers are conducting intensive research into a method for indicating whether to use 256QAM having a higher modulation order. However, a new transport block size should be defined to support 256QAM, and new MCS signaling for supporting the 256QAM scheme needs to be defined. In addition, new methods for mapping modulation symbols modulated by 256QAM on constellation points.

An object of the present invention is to provide an efficient data transmission method.

Another object of the present invention is to provide a method for designing a constellation point for supporting a 256QAM scheme.

Another object of the present invention is to provide a method for transmitting and receiving data using a 256QAM scheme.

Another object of the present invention is to provide an apparatus for supporting such methods.

The technical objects of the present invention are not limited to the above technical description and other technical problems which are not described herein will become apparent to those skilled in the art from the following description.

The present invention relates to a wireless access system and, more particularly, to methods and apparatuses for designing a 256 quadrature amplitude modulation (QAM) constellation point and transmitting a modulation symbol using the same in order to support a 256QAM scheme.

According to an aspect of the present invention, a method for transmitting a modulation symbol using a 256 quadrature amplitude modulation (QAM) scheme at a transmitter in a wireless access system includes modulating eight bit streams into one modulation symbol using the 256QAM scheme, mapping the modulation symbol to one of 256QAM constellation points and transmitting the mapped modulation symbol.

The method may further include the transmitter transmitting a higher layer signal including an indicator indicating whether the 256QAM scheme is supported and selecting a modulation and coding scheme (MCS) index indicating the 256QAM scheme from the second table and transmitting the MCS index to a receiver.

According to another embodiment of the present invention, a transmitter for transmitting a modulation symbol using a 256 quadrature amplitude modulation (QAM) scheme in a wireless access system includes a transmission unit and a processor configured to support the 256QAM scheme. The processor is configured to modulate eight bit streams into one modulation symbol using the 256QAM scheme, map the modulation symbol to one of 256QAM constellation points; and transmit the mapped modulation symbol using the transmission unit.

At this time, the transmitter may control the transmission unit to transmit a higher layer signal including an indicator indicating whether the 256QAM scheme is supported, and select a modulation and coding scheme (MCS) index indicating the 256QAM scheme from the second table and transmit the MCS index to a receiver.

At this time, the MCS index may have a size of 5 bits.

In the aspects of the present invention, the 256QAM constellation points may be configured as in FIG. 14 or table 11.

The 256QAM constellation points may be configured by arranging 64 64QAM constellation points in a first quadrant and by imaginary-number axis symmetry, real-number axis symmetry and original symmetry of the 64QAM constellation points.

The transmitter may simultaneously manage a first table for supporting a legacy modulation scheme and a second table for supporting a 256QAM scheme.

The transmitter may be a base station and the receiver may be a user equipment (UE), upon downlink data transmission.

The above-described aspects of the present invention are merely some of preferred embodiments of the present invention and various embodiments including the technical features of the present invention may be derived by persons skilled in the art based on the detailed description of the invention.

BRIEF DESCRIPTION OF THE DRAWINGS

The accompanying drawings, which are included to provide a further understanding of the invention, illustrate embodiments of the invention and together with the description serve to explain the principle of the invention.

DESCRIPTION OF SPECIFIC EMBODIMENTS

Figure 1:
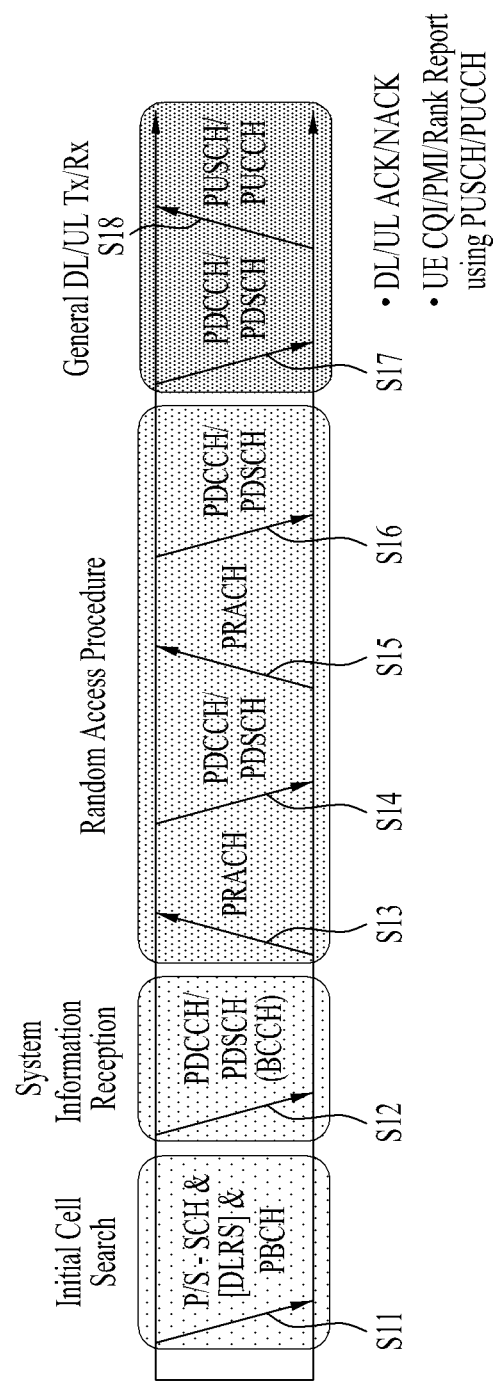
FIG. 1 is a conceptual diagram illustrating physical channels used in the embodiments and a signal transmission method using the physical channels.

Embodiments of the present invention relates to a wireless access system and methods and apparatuses for designing a 256 quadrature amplitude modulation (QAM) constellation point and transmitting a modulation symbol using the same in order to support a 256QAM scheme.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS.

The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DownLink (DL).

The embodiments of the present disclosure may be supported by standard specifications disclosed for at least one of wireless access systems including an Institute of Electrical and Electronics Engineers (IEEE) 802.xx system, a $3^{rd}$ Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the invention.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term used in embodiments of the present disclosure, a data block is interchangeable with a transport block in the same meaning. In addition, the MCS/TBS index table used in the LTE/LTE-A system can be defined as a first table or a legacy table, and the MCS/TBS index table which is used for supporting the 256QAM can be defined as a second table or a new table.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB. During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PDSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
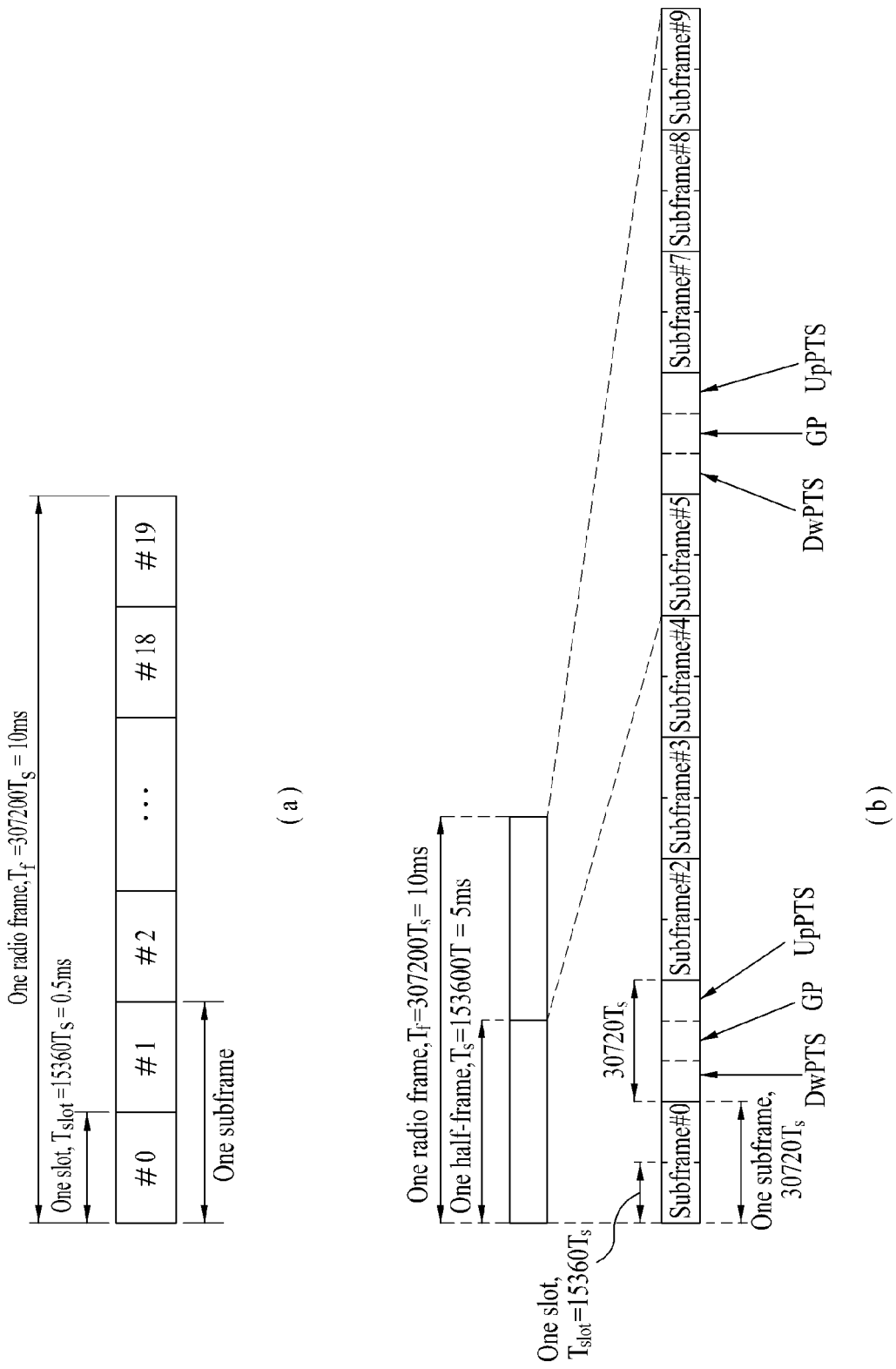
FIG. 2 is a diagram illustrating a structure of a radio frame for use in the embodiments.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms ($T_f=307200 \cdot T_s$) long, including equal-sized 20 slots indexed from 0 to 19. Each slot is 0.5 ms ($T_{slot}=15360 \cdot T_s$) long. One subframe includes two successive slots. An $i^{th}$ subframe includes $2i^{th}$ and $(2i+1)^{th}$ slots. That is, a radio frame includes 10 subframes. A time required for transmitting one subframe is defined as a Transmission Time Interval (TTI). $T_s$ is a sampling time given as $T_s=1/(15 \text{ kHz} \times 2048)=3.2552 \times 10^{-8}$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms ($T_f=307200 \cdot T_s$) long, including two half-frames each having a length of 5 ms ($=153600 \cdot T_s$) long. Each half-frame includes five subframes each being 1 ms ($=30720 \cdot T_s$) long. An subframe includes $2i^{th}$ and $(2i+1)^{th}$ slots each having a length of 0.5 ms ($T_{slot}=15360 \cdot T_s$). $T_s$ is a sampling time given as $T_s=1/(15 \text{ kHz} \times 2048)=3.2552 \times 10^{-8}$ (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 3:
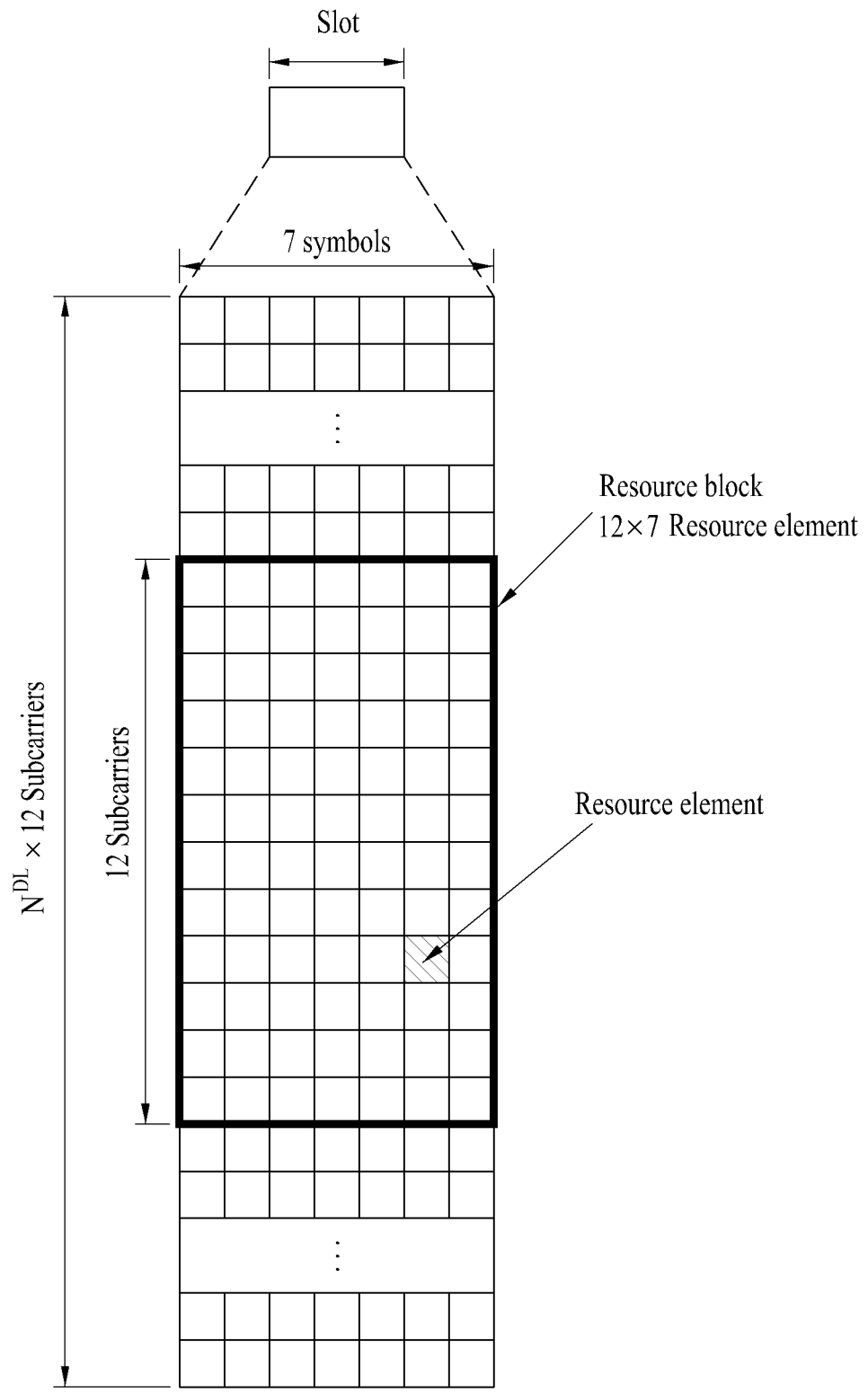
FIG. 3 is a diagram illustrating an example of a resource grid of a downlink slot according to the embodiments.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, $N_{DL}$ depends on a DL transmission bandwidth. A UL slot may have the same structure as a DL slot.

Figure 4:
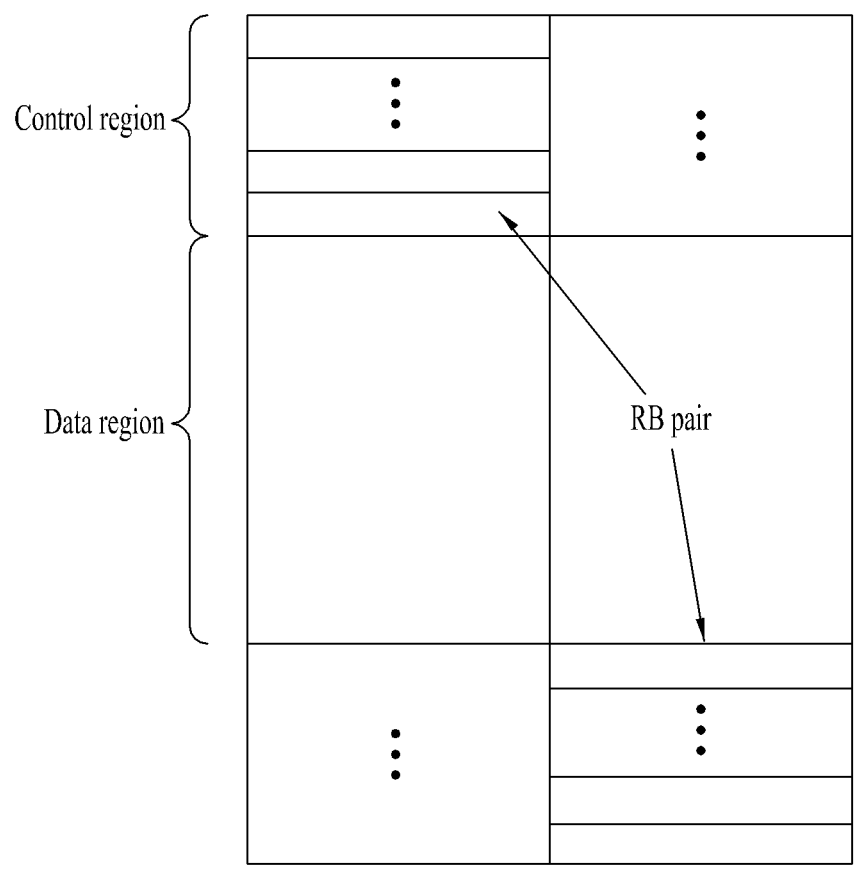
FIG. 4 is a diagram illustrating a structure of an uplink subframe according to the embodiments.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
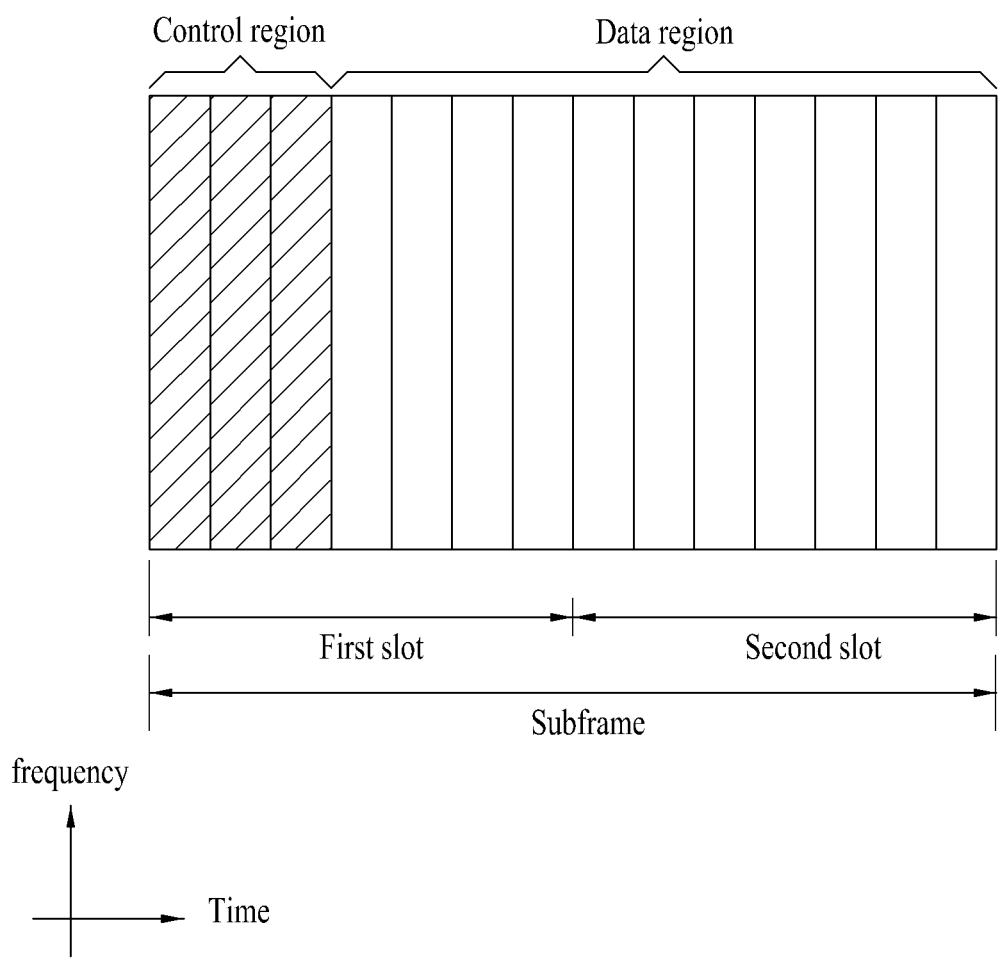
FIG. 5 is a diagram illustrating a structure of a downlink subframe according to the embodiments.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.2 Physical Downlink Control Channel (PDCCH)

1.2.1 PDCCH Overview

The PDCCH may deliver information about resource allocation and a transport format for a Downlink Shared Channel (DL-SCH) (i.e. a DL grant), information about resource allocation and a transport format for an Uplink Shared Channel (UL-SCH) (i.e. a UL grant), paging information of a Paging Channel (PCH), system information on the DL-SCH, information about resource allocation for a higher-layer control message such as a random access response transmitted on the PDSCH, a set of Tx power control commands for individual UEs of a UE group, Voice Over Internet Protocol (VoIP) activation indication information, etc.

A plurality of PDCCHs may be transmitted in the control region. A UE may monitor a plurality of PDCCHs. A PDCCH is transmitted in an aggregate of one or more consecutive Control Channel Elements (CCEs). A PDCCH made up of one or more consecutive CCEs may be transmitted in the control region after subblock interleaving. A CCE is a logical allocation unit used to provide a PDCCH at a code rate based on the state of a radio channel. A CCE includes a plurality of RE Groups (REGs). The format of a PDCCH and the number of available bits for the PDCCH are determined according to the relationship between the number of CCEs and a code rate provided by the CCEs.

1.2.2 PDCCH Structure

A plurality of PDCCHs for a plurality of UEs may be multiplexed and transmitted in the control region. A PDCCH is made up of an aggregate of one or more consecutive CCEs. A CCE is a unit of 9 REGs each REG including 4 REs. Four Quadrature Phase Shift Keying (QPSK) symbols are mapped to each REG. REs occupied by RSs are excluded from REGs. That is, the total number of REGs in an OFDM symbol may be changed depending on the presence or absence of a cell-specific RS. The concept of an REG to which four REs are mapped is also applicable to other DL control channels (e.g. the PCFICH or the PHICH). Let the number of REGs that are not allocated to the PCFICH or the PHICH be denoted by $N_{REG}$. Then the number of CCEs available to the system is $N_{CCE}(\lfloor N_{REG}/9 \rfloor)$ and the CCEs are indexed from 0 to $N_{CCE}-1$.

To simplify the decoding process of a UE, a PDCCH format including n CCEs may start with a CCE having an index equal to a multiple of n. That is, given CCE i, the PDCCH format may start with a CCE satisfying i mod n=0.

The eNB may configure a PDCCH with 1, 2, 4, or 8 CCEs. {1, 2, 4, 8} are called CCE aggregation levels. The number of CCEs used for transmission of a PDCCH is determined according to a channel state by the eNB. For example, one CCE is sufficient for a PDCCH directed to a UE in a good DL channel state (a UE near to the eNB). On the other hand, 8 CCEs may be required for a PDCCH directed to a UE in a poor DL channel state (a UE at a cell edge) in order to ensure sufficient robustness.

[Table 2] below illustrates PDCCH formats. 4 PDCCH formats are supported according to CCE aggregation levels as illustrated in [Table 2].

TABLE 2

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

A different CCE aggregation level is allocated to each UE because the format or Modulation and Coding Scheme (MCS) level of control information delivered in a PDCCH for the UE is different. An MCS level defines a code rate used for data coding and a modulation order. An adaptive MCS level is used for link adaptation. In general, three or four MCS levels may be considered for control channels carrying control information.

Regarding the formats of control information, control information transmitted on a PDCCH is called DCI. The configuration of information in PDCCH payload may be changed depending on the DCI format. The PDCCH payload is information bits. [Table 3] lists DCI according to DCI formats.

TABLE 3

| DCI Format | Description |
|---|---|
| Format 0 | Resource grants for the PUSCH transmissions (uplink) |
| Format 1 | Resource assignments for single codeword PDSCH transmissions (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g. paging/broadcast system information) |
| Format 1D | Compact resource assignments for PDSCH using multi-user MIMO (mode 5) |
| Format 2 | Resource assignments for PDSCH for closed-loop MIMO operation (mode 4) |
| Format 2A | Resource assignments for PDSCH for open-loop MIMO operation (mode 3) |
| Format 3/3A | Power control commands for PUCCH and PUSCH with 2-bit/1-bit power adjustment |
| Format 4 | Scheduling of PUSCH in one UL cell with multi-antenna port transmission mode |

Referring to [Table 3], the DCI formats include Format 0 for PUSCH scheduling, Format 1 for single-codeword PDSCH scheduling, Format 1A for compact single-codeword PDSCH scheduling, Format 1C for very compact DL-SCH scheduling, Format 2 for PDSCH scheduling in a closed-loop spatial multiplexing mode, Format 2A for PDSCH scheduling in an open-loop spatial multiplexing mode, and Format 3/3A for transmission of Transmission Power Control (TPC) commands for uplink channels. DCI Format 1A is available for PDSCH scheduling irrespective of the transmission mode of a UE.

The length of PDCCH payload may vary with DCI formats. In addition, the type and length of PDCCH payload may be changed depending on compact or non-compact scheduling or the transmission mode of a UE.

The transmission mode of a UE may be configured for DL data reception on a PDSCH at the UE. For example, DL data carried on a PDSCH includes scheduled data, a paging message, a random access response, broadcast information on a BCCH, etc. for a UE. The DL data of the PDSCH is related to a DCI format signaled through a PDCCH. The transmission mode may be configured semi-statically for the UE by higher-layer signaling (e.g. Radio Resource Control (RRC) signaling). The transmission mode may be classified as single antenna transmission or multi-antenna transmission.

A transmission mode is configured for a UE semi-statically by higher-layer signaling. For example, multi-antenna transmission scheme may include transmit diversity, open-loop or closed-loop spatial multiplexing, Multi-User Multiple Input Multiple Output (MU-MIMO), or beamforming. Transmit diversity increases transmission reliability by transmitting the same data through multiple Tx antennas. Spatial multiplexing enables high-speed data transmission without increasing a system bandwidth by simultaneously transmitting different data through multiple Tx antennas. Beamforming is a technique of increasing the Signal to Interference plus Noise Ratio (SINR) of a signal by weighting multiple antennas according to channel states.

A DCI format for a UE depends on the transmission mode of the UE. The UE has a reference DCI format monitored according to the transmission mode configure for the UE. The following 10 transmission modes are available to UEs:

(1) Transmission mode 1: Single antenna port (port 0);
(2) Transmission mode 2: Transmit diversity;
(3) Transmission mode 3: Open-loop spatial multiplexing when the number of layer is larger than 1 or Transmit diversity when the rank is 1;
(4) Transmission mode 4: Closed-loop spatial multiplexing;
(5) Transmission mode 5: MU-MIMO;
(6) Transmission mode 6: Closed-loop rank-1 precoding;
(7) Transmission mode 7: Precoding supporting a single layer transmission, which does not based on a codebook (Rel-8);
(8) Transmission mode 8: Precoding supporting up to two layers, which do not based on a codebook (Rel-9);
(9) Transmission mode 9: Precoding supporting up to eight layers, which do not based on a codebook (Rel-10); and
(10) Transmission mode 10: Precoding supporting up to eight layers, which do not based on a codebook, used for CoMP (Rel-11).

1.2.3 PDCCH Transmission

The eNB determines a PDCCH format according to DCI that will be transmitted to the UE and adds a Cyclic Redundancy Check (CRC) to the control information. The CRC is masked by a unique Identifier (ID) (e.g. a Radio Network Temporary Identifier (RNTI)) according to the owner or usage of the PDCCH. If the PDCCH is destined for a specific UE, the CRC may be masked by a unique ID (e.g. a cell-RNTI (C-RNTI)) of the UE. If the PDCCH carries a paging message, the CRC of the PDCCH may be masked by a paging indicator ID (e.g. a Paging-RNTI (P-RNTI)). If the PDCCH carries system information, particularly, a System Information Block (SIB), its CRC may be masked by a system information ID (e.g. a System Information RNTI (SI-RNTI)). To indicate that the PDCCH carries a random access response to a random access preamble transmitted by a UE, its CRC may be masked by a Random Access-RNTI (RA-RNTI).

Then the eNB generates coded data by channel-encoding the CRC-added control information. The channel coding may be performed at a code rate corresponding to an MCS level. The eNB rate-matches the coded data according to a CCE aggregation level allocated to a PDCCH format and generates modulation symbols by modulating the coded data. Herein, a modulation order corresponding to the MCS level may be used for the modulation. The CCE aggregation level for the modulation symbols of a PDCCH may be one of 1, 2, 4, and 8. Subsequently, the eNB maps the modulation symbols to physical REs (i.e. CCE to RE mapping).

1.2.4 Blind Decoding (BD)

A plurality of PDCCHs may be transmitted in a subframe. That is, the control region of a subframe includes a plurality of CCEs, CCE 0 to CCE $N_{CCE,k}-1$. $N_{CCE,k}$ is the total number of CCEs in the control region of a $k^{th}$ subframe. A UE monitors a plurality of PDCCHs in every subframe. This means that the UE attempts to decode each PDCCH according to a monitored PDCCH format.

The eNB does not provide the UE with information about the position of a PDCCH directed to the UE in an allocated control region of a subframe. Without knowledge of the position, CCE aggregation level, or DCI format of its PDCCH, the UE searches for its PDCCH by monitoring a set of PDCCH candidates in the subframe in order to receive a control channel from the eNB. This is called blind decoding. Blind decoding is the process of demasking a CRC part with a UE ID, checking a CRC error, and determining whether a corresponding PDCCH is a control channel directed to a UE by the UE.

The UE monitors a PDCCH in every subframe to receive data transmitted to the UE in an active mode. In a Discontinuous Reception (DRX) mode, the UE wakes up in a monitoring interval of every DRX cycle and monitors a PDCCH in a subframe corresponding to the monitoring interval. The PDCCH-monitored subframe is called a non-DRX subframe.

To receive its PDCCH, the UE should blind-decode all CCEs of the control region of the non-DRX subframe. Without knowledge of a transmitted PDCCH format, the UE should decode all PDCCHs with all possible CCE aggregation levels until the UE succeeds in blind-decoding a PDCCH in every non-DRX subframe. Since the UE does not know the number of CCEs used for its PDCCH, the UE should attempt detection with all possible CCE aggregation levels until the UE succeeds in blind decoding of a PDCCH.

In the LTE system, the concept of Search Space (SS) is defined for blind decoding of a UE. An SS is a set of PDCCH candidates that a UE will monitor. The SS may have a different size for each PDCCH format. There are two types of SSs, Common Search Space (CSS) and UE-specific/Dedicated Search Space (USS).

While all UEs may know the size of a CSS, a USS may be configured for each individual UE. Accordingly, a UE should monitor both a CSS and a USS to decode a PDCCH. As a consequence, the UE performs up to 44 blind decodings in one subframe, except for blind decodings based on different CRC values (e.g., C-RNTI, P-RNTI, SI-RNTI, and RA-RNTI).

In view of the constraints of an SS, the eNB may not secure CCE resources to transmit PDCCHs to all intended UEs in a given subframe. This situation occurs because the remaining resources except for allocated CCEs may not be included in an SS for a specific UE. To minimize this obstacle that may continue in the next subframe, a UE-specific hopping sequence may apply to the starting point of a USS.

[Table 4] illustrates the sizes of CSSs and USSs.

TABLE 4

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

To mitigate the load of the UE caused by the number of blind decoding attempts, the UE does not search for all defined DCI formats simultaneously. Specifically, the UE always searches for DCI Format 0 and DCI Format 1A in a USS. Although DCI Format 0 and DCI Format 1A are of the same size, the UE may distinguish the DCI formats by a flag for format0/format 1a differentiation included in a PDCCH. Other DCI formats than DCI Format 0 and DCI Format 1A, such as DCI Format 1, DCI Format 1B, and DCI Format 2 may be required for the UE.

The UE may search for DCI Format 1A and DCI Format 1C in a CSS. The UE may also be configured to search for DCI Format 3 or 3A in the CSS. Although DCI Format 3 and DCI Format 3A have the same size as DCI Format 0 and DCI Format 1A, the UE may distinguish the DCI formats by a CRC scrambled with an ID other than a UE-specific ID.

An SS $S_k^{(L)}$ is a PDCCH candidate set with a CCE aggregation level $L \in \{1,2,4,8\}$. The CCEs of PDCCH candidate set m in the SS may be determined by the following equation.

$$L \cdot \{(Y_k+m) \bmod \lfloor N_{CCE,k}/L \rfloor\}+i \qquad \text{[Equation 1]}$$

where $M^{(L)}$ is the number of PDCCH candidates with CCE aggregation level L to be monitored in the SS, m= 0, . . . , $M^{(L)}-1$, i is the index of a CCE in each PDCCH candidate, and i=0, . . . , L−1. k=$\lfloor n_s/2 \rfloor$ where $n_s$ is the index of a slot in a radio frame.

As described before, the UE monitors both the USS and the CSS to decode a PDCCH. The CSS supports PDCCHs with CCE aggregation levels {4, 8} and the USS supports PDCCHs with CCE aggregation levels {1, 2, 4, 8}. [Table 5] illustrates PDCCH candidates monitored by a UE.

TABLE 5

| | Search space $S_k^{(L)}$ | | Number of PDCCH |
|---|---|---|---|
| Type | Aggregation level L | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to [Equation 1], for two aggregation levels, L=4 and L=8, $Y_k$ is set to 0 in the CSS, whereas $Y_k$ is defined by [Equation 2] for aggregation level L in the USS.

$$Y_k=(A \cdot Y_{k-1}) \bmod D \qquad \text{[Equation 2]}$$

where $Y_{-1}=n_{RNTI} \neq 0$, $n_{RNTI}$ indicating an RNTI value. A=39827 and D=65537.

2. Carrier Aggregation (CA) Environment 2.1 CA Overview

A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present disclosure, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present disclosure may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguraiton message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present disclosure.

Figure 6:
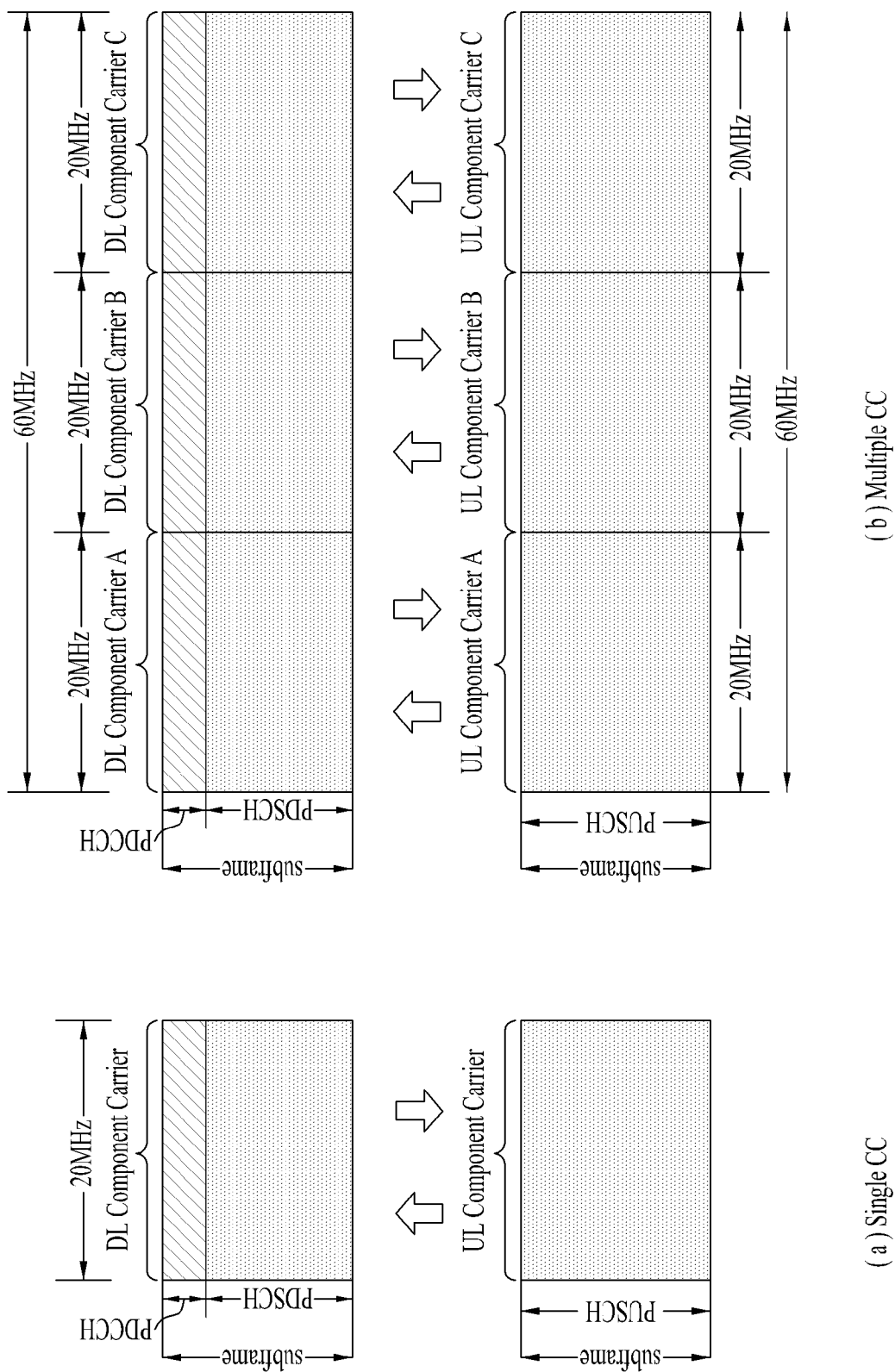
FIG. 6 is a diagram illustrating an example of a component carrier (CC) of the embodiments and carrier aggregation (CA) used in an LTE_A system.

FIG. 6 illustrates an example of CCs and CA in the LTE-A system, which are used in embodiments of the present disclosure.

FIG. 6(a) illustrates a single carrier structure in the LTE system. There are a DL CC and a UL CC and one CC may have a frequency range of 20 MHz.

FIG. 6(b) illustrates a CA structure in the LTE-A system. In the illustrated case of FIG. 6(b), three CCs each having 20 MHz are aggregated. While three DL CCs and three UL CCs are configured, the numbers of DL CCs and UL CCs are not limited. In CA, a UE may monitor three CCs simultaneously, receive a DL signal/DL data in the three CCs, and transmit a UL signal/UL data in the three CCs.

If a specific cell manages N DL CCs, the network may allocate M (M≤N) DL CCs to a UE. The UE may monitor only the M DL CCs and receive a DL signal in the M DL CCs. The network may prioritize L (L≤M≤N) DL CCs and allocate a main DL CC to the UE. In this case, the UE should monitor the L DL CCs. The same thing may apply to UL transmission.

The linkage between the carrier frequencies of DL resources (or DL CCs) and the carrier frequencies of UL resources (or UL CCs) may be indicated by a higher-layer message such as an RRC message or by system information. For example, a set of DL resources and UL resources may be configured based on linkage indicated by System Information Block Type 2 (SIB2). Specifically, DL-UL linkage may refer to a mapping relationship between a DL CC carrying a PDCCH with a UL grant and a UL CC using the UL grant, or a mapping relationship between a DL CC (or a UL CC) carrying HARQ data and a UL CC (or a DL CC) carrying an HARQ ACK/NACK signal.

2.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher-layer signaling (e.g. RRC signaling).

If cross carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set may be defined within the UE DL CC set. That is, the eNB transmits a PDCCH only in the PDCCH monitoring set to schedule a PDSCH or PUSCH for the UE.

Figure 7:
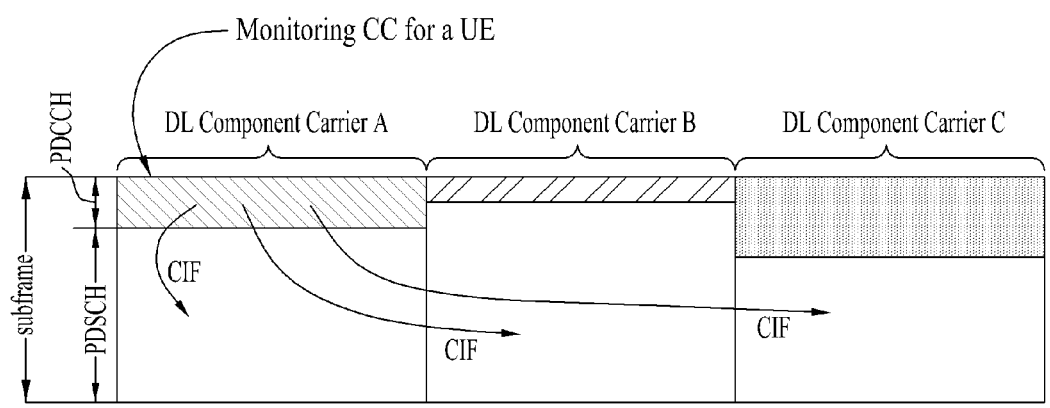
FIG. 7 illustrates a subframe structure of an LTE-A system according to cross-carrier scheduling.

FIG. 7 illustrates a cross carrier-scheduled subframe structure in the LTE-A system, which is used in embodiments of the present disclosure.

Referring to FIG. 7, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher-layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

Figure 8:
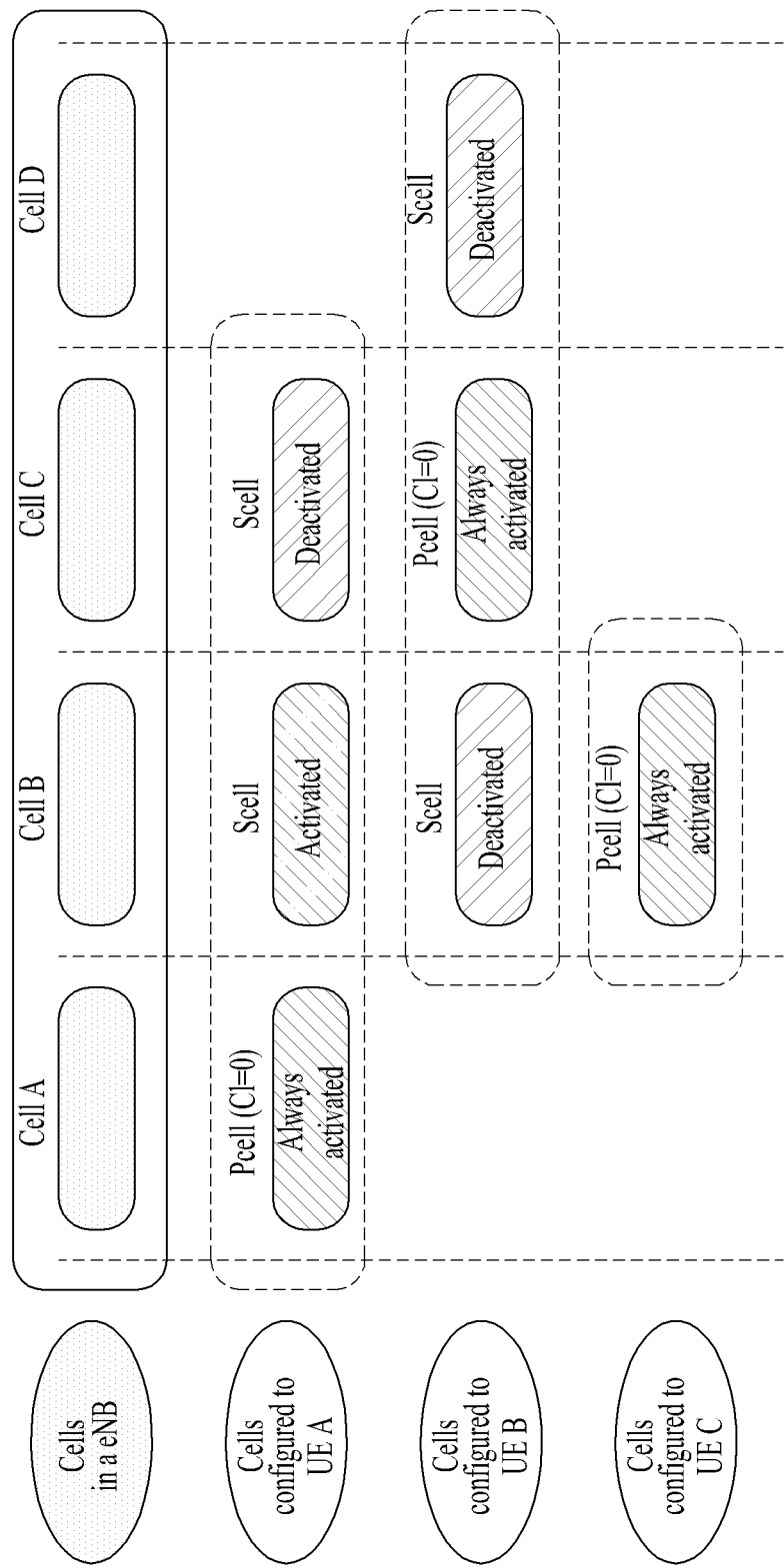
FIG. 8 is conceptual diagram illustrating a construction of serving cells according to cross-carrier scheduling.

FIG. 8 is conceptual diagram illustrating a construction of serving cells according to cross-carrier scheduling.

Referring to FIG. 8, an eNB (or BS) and/or UEs for use in a radio access system supporting carrier aggregation (CA) may include one or more serving cells. In FIG. 8, the eNB can support a total of four serving cells (cells A, B, C and D). It is assumed that UE A may include Cells (A, B, C), UE B may include Cells (B, C, D), and UE C may include Cell B. In this case, at least one of cells of each UE may be composed of P Cell. In this case, P Cell is always activated, and S Cell may be activated or deactivated by the eNB and/or UE.

The cells shown in FIG. 8 may be configured per UE. The above-mentioned cells selected from among cells of the eNB, cell addition may be applied to carrier aggregation (CA) on the basis of a measurement report message received from the UE. The configured cell may reserve resources for ACK/NACK message transmission in association with PDSCH signal transmission. The activated cell is configured to actually transmit a PDSCH signal and/or a PUSCH signal from among the configured cells, and is configured to transmit CSI reporting and Sounding Reference Signal (SRS) transmission. The deactivated cell is configured not to transmit/receive PDSCH/PUSCH signals by an eNB command or a timer operation, and CRS reporting and SRS transmission are interrupted.

3. Channel Encoding

A wireless access system performs coding of transmission information of a transmission end (or transmitter) using a forward error correction code, and transmits the coded information, so that channel errors can be corrected by a reception end (or receiver).

The reception end demodulates a received (Rx) signal, performs decoding of forward error correction code, and recovers transmission information. By the decoding process, errors of the Rx signal caused by a radio frequency (RF) channel can be corrected. Although various kinds of error correction codes can be applied to the embodiments, the embodiments will hereinafter be described using a turbo code as an example.

Figure 9:
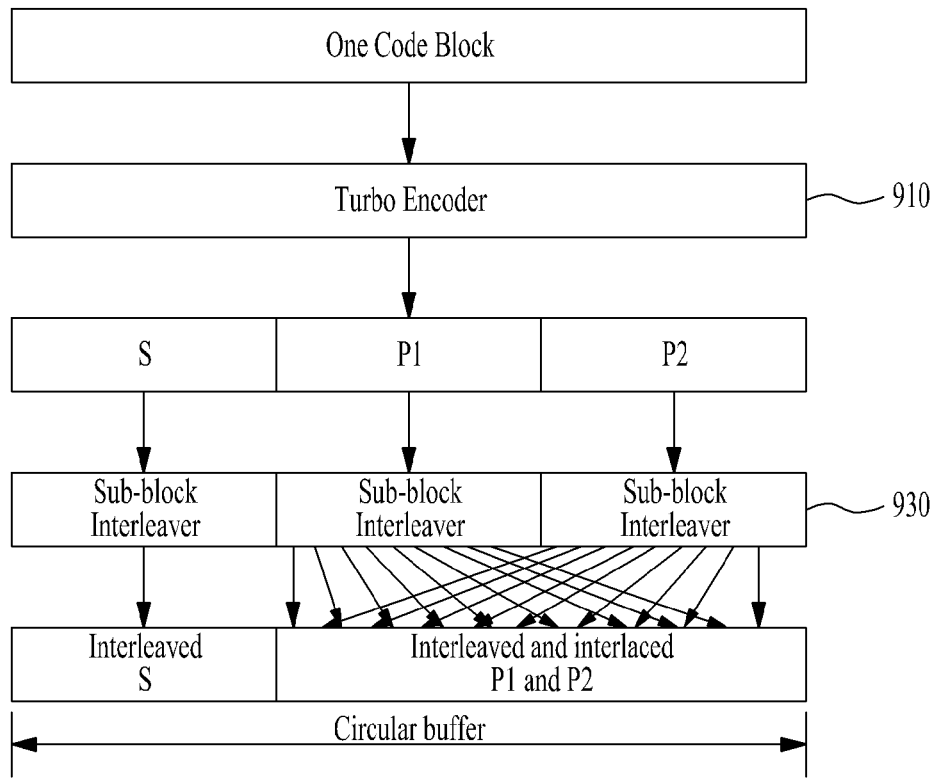
FIG. 9 is a conceptual diagram illustrating an example of rate matching using a turbo coder for use in the embodiments.

FIG. 9 is a conceptual diagram illustrating an example of rate matching using a turbo coder for use in the embodiments.

Referring to FIG. 9, the turbo coder may include a recursive systematic convolution code and an interleaver. An interleaver for facilitating parallel decoding may be used when the turbo code is actually implemented. One kind of such interleaver may be Quadratic Polynomial Permutation (QPP). The QPP interleaver may indicate a performance suitable for a specific size of a transport block (i.e., a data block), and the turbo-code performance increases in proportion to the TB size. Accordingly, to conveniently implement the turbo code by the wireless access system, the wireless access system divides a predetermined-sized TB into a plurality of small-sized TBs, and encodes the small-sized TBs. In this case, each small-sized TB is referred to as a code block.

Generally, although these code blocks have the same size, one of several code blocks may have another size due to the limitation of the QPP interleaver size. The transmitter performs the error correction coding process on the basis of a code block of the interleaver. For example, as can be seen from FIG. 9, one code block is input to the turbo coder 910. The turbo coder 910 performs ⅓ coding of an input code block, and outputs a systematic block and parity blocks (1, 2).

Thereafter, the transmitter performs interleaving of each block using the sub-block interleaver 930 so as to reduce influence of burst error encountered when data is transmitted through RF channels. The transmitter may map the interleaved code block to actual radio resources, and transmit the mapped result.

Since the amount of radio resources used for transmission is constant, the transmitter performs rate matching to the encoded code block so as to adjust the amount of radio resources to the amount of radio resources to be used for transmission. Generally, rate matching may be performed through puncturing or repetition of data.

Rate matching may be performed on the basis of an encoded code block unit as in WCDMA of 3GPP. In another method, the systematic block of the encoded code block and the parity blocks are separated from each other, such that independent interleaving may be performed for the separated systematic block and each parity block. As described above, FIG. 9 shows that the systematic block and the parity blocks are separated from each other so that rate matching is carried out.

A Cyclic Redundancy Code (CRC) for error detection is attached to a transport block (TB) transmitted from a higher layer of the transmitter, and CRC is attached to each code block separated from the TB. Various TB sizes need to be defined according to service categories of a higher layer. The transmitter may perform quantization to transmit TBs to the receiver. For TB quantization, a dummy bit is added in such a manner that a source TB transmitted from the higher layer can be adjusted for the size of TB of a physical layer. In this case, quantization may be preferably performed to minimize the amount of added dummy bits.

In accordance with the embodiments, the relationship among transport Block Size (TBS) modulation, MCS, and the number of allocated resources is a function. That is, the remaining one parameter is decided according to values of any two parameters. Accordingly, if the transmitter and/or the receiver perform signaling of the corresponding parameters, the transmitter and/or the receiver must inform the counterpart device of only two of three parameters.

For convenience of description and better understanding of the present invention, it is assumed that the transmitter uses parameters associated with MCS and the number of allocated resources so as to inform the receiver of a transport block size (TBS).

As exemplary factors capable of affecting the number of allocated resources, a pilot for performing channel estimation according to antenna construction, and resources used for transmission of RS (Reference Signal) and control information may be used. The above-mentioned factors may be changed every transmission moment.

4. 256QAM Transmission Supporting Method 4.1 Legacy MCS table

An eNB may use a downlink control channel (e.g., PDCCH/EPDCCH) in order to send a transport block size (TBS) for downlink data to a UE. At this time, the eNB combines a modulation and coding scheme (MCS) index, which is modulation and coding rate related information, and resource allocation information and transmits information about the TBS transmitted on a PDSCH to the UE.

For example, an MCS index ($I_{MCS}$) field has 5 bits and radio resources may be allocated from 1 RB to 110 RBs. Accordingly, in the case of non-MIMO, a TBS (duplication size permission) corresponding to 32 (states)×110 (RBs) may be signaled. However, three states (e.g., 29, 30 and 31) of the MCS index field having 5 bits are used to indicate change in modulation scheme upon retransmission. Accordingly, only a TBS corresponding to 29×110 may be actually signaled.

Currently, in an LTE/LTE-A system, examples of a modulation scheme supporting downlink data transmission include quadrature phase shift keying (QPSK), 16 quadrature amplitude modulation (16QAM) and 64QAM. An MCS index indicates a modulation order and a TBS index and the MCS index indicates the same TBS even when a modulation scheme is different at a switching point where the modulation scheme is changed, for efficient operation in various channel environments. This is because change in amount of information sent per unit time is less than change in signal to interference plus noise ratio (SINR) at the switching point where the modulation scheme is changed. Even when the modulation scheme is changed at the switching point, the same TBS may be indicated to efficiently allocate radio resources.

In order to indicate a real transport block size, an MCS index field (e.g., $I_{MCS}$) transmitted via a downlink control channel is mapped to another variable (that is, $I_{TBS}$). Table 6 below shows a legacy MCS table having a size of 5 bits, which is currently used in an LTE/LTE-A system, and shows a modulation and TBS index ($I_{TBS}$) table according to an MCS index ($I_{MCS}$).

TABLE 6

| MCS Index $I_{MCS}$ | Modulation Order $Q_m$ | TBS Index $I_{TBS}$ |
| --- | --- | --- |
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |

TABLE 6-continued

| MCS Index $I_{MCS}$ | Modulation Order $Q_m$ | TBS Index $I_{TBS}$ |
|---|---|---|
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

Currently, in an LTE/LTE-A system, since only QPSK, 16QAM and 64QAM are employed as modulation schemes, in order to support 256QAM, an $I_{MCS}$ for a new modulation order 8 and a new transport block size for 256QAM should be defined. In addition, new MCS index signaling for supporting a 256QAM scheme needs to be defined.

4.2 Definition of New MCS Table for Supporting 256QAM

Hereinafter, methods for supporting 256QAM by controlling a relationship between $I_{MCS}$ and $I_{TBS}$ without changing the size of an MCS index field of 5 bits will be described.

First, if retransmission is necessary, one reserved state is necessary to change a modulation scheme without changing a TBS. In addition to the $I_{MCS}$ states 29, 30 and 31 of Table 6, one $I_{MCS}$ state (e.g., $I_{MCS}=28$) may be used for 256QAM. That is, the $I_{MCS}$ states 28, 29, 30 and 31 may be set to indicate the modulation schemes for a retransmission TBS, that is, 256QAM, QPSK, 16QAM and 64QAM (or QPSK, 16QAM, 64QAM and 256QAM), respectively. In this case, it is possible to minimize implementation complexity by redefining an $I_{MCS}$ in a legacy implementation method.

Table 7 below shows an example of an MCS table which is newly defined in order to support 256QAM.

TABLE 7

| MCS Index $I_{MCS}$ | Modulation Order $Q_m$ | TBS Index $I_{TBS}$ |
|---|---|---|
| 0 | 2 | 0 |
| 1 | 2 | 2 |
| 2 | 2 | 4 |
| 3 | 2 | 6 |
| 4 | 2 | 8 |
| 5 | 4 | 10 |
| 6 | 4 | 11 |
| 7 | 4 | 12 |
| 8 | 4 | 13 |
| 9 | 4 | 14 |
| 10 | 4 | 15 |
| 11 | 6 | 16 |
| 12 | 6 | 17 |
| 13 | 6 | 18 |
| 14 | 6 | 19 |
| 15 | 6 | 20 |
| 16 | 6 | 21 |
| 17 | 6 | 22 |
| 18 | 6 | 23 |
| 19 | 6 | 24 |
| 20 | 8 | 25 |
| 21 | 8 | 27 |
| 22 | 8 | 28 |
| 23 | 8 | 29 |
| 24 | 8 | 30 |
| 25 | 8 | 31 |
| 26 | 8 | 32 |
| 27 | 8 | 33 |
| 28 | 2 | reserved |
| 29 | 4 | |
| 30 | 6 | |
| 31 | 8 | |

Table 7 shows an example of a method for supporting 256QAM by controlling a relationship between $I_{MCS}$ and $I_{TBS}$ without increasing the size of a legacy MCS index field in order to support 256QAM. As shown in Table 7, unlike Table 6, $I_{TBS}$ having sequential sizes are allocated to two $I_{MCS}$ having different modulation schemes, that is, 64QAM and 256QAM.

4.3 $I_{MCS}$ Signaling Method

Since the $I_{MCS}$ field of Table 6 and Table 7 has a size of 5 bits, even when a DCI format supported by a legacy LTE/LTE-A system is used, a legacy UE is not significantly influenced. However, from the viewpoint of an eNB which manages a UE which does not support 256QAM and a UE which supports 256QAM, use of a new Table 7 only is not efficient. Accordingly, the eNB may provide a data service to all UEs by selectively using Table 6 and Table 7.

Accordingly, methods for signaling $I_{MCS}$ fields and TBSs for a legacy UE which does not support 256QAM and a new UE which supports 256QAM may be differently defined. In the embodiments of the present invention, Table 6 is referred to as a first table or a legacy table and one of all tables newly defined in the embodiments of the present invention including Table 7 is referred to as a second table or a new table. That is, the first table is configured to support a legacy modulation scheme (e.g., QPSK, 16QAM and 64QAM) and the second table is configured to support a legacy modulation scheme and 256QAM.

Figure 10:
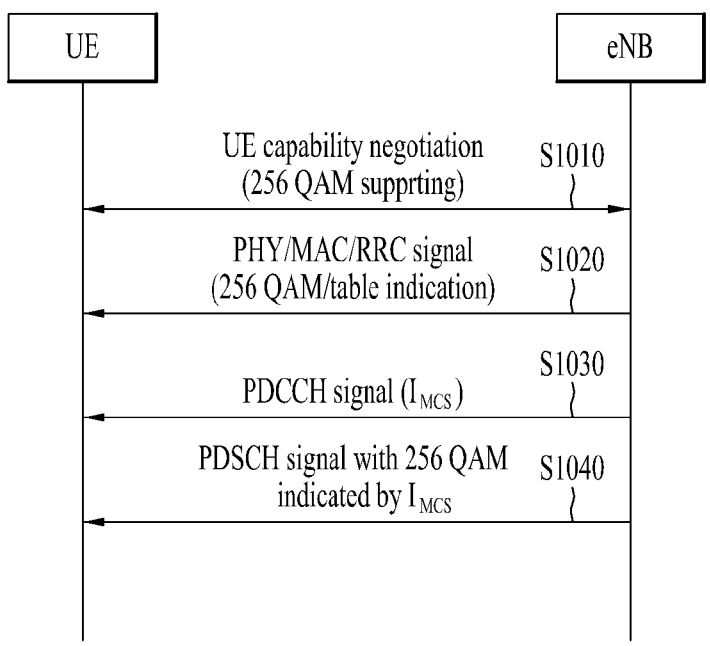
FIG. 10 is a flowchart illustrating one of methods for transmitting an MCS index supporting 256QAM according to the embodiments.

FIG. 10 is a diagram showing one of methods for transmitting an MCS index for supporting 256QAM as an embodiment of the present invention.

In FIG. 10, assume that a UE and an eNB have a first table and a second table, respectively. At this time, the first table is equal to Table 6 and defines an MCS index for a legacy UE. In addition, the second table is equal to Table 7 and defines an MCS index for a UE supporting 256QAM. Of course, instead of Table 7, a table configured to support 256QAM described in the embodiments of the present invention may be used as the second table.

Referring to FIG. 10, the UE and the eNB perform a UE capability negotiation process for negotiating whether 256QAM is supported or not after initial access (S1010).

In step S1010, assume that the UE and the eNB mutually have confirmed that 256QAM is supported and have exchanged various parameters and/or fields for supporting 256QAM.

Thereafter, if downlink data modulated using 256QAM needs to be transmitted, the eNB may first transmit, to the UE, a physical layer signal (e.g., a PDCCH signal and/or an EPDCCH signal) or a higher layer signal (e.g., a MAC signal, an RRC signal, etc.) including a 256QAM indicator indicating use of 256QAM or a table identifier indicating a second table (S1020).

In step S1020, the UE, which has received the 256QAM indicator indicating use of 256QAM or the second table identifier, may recognize that downlink data transmitted by the eNB thereafter has been modulated using 256QAM. Accordingly, the UE may use the second table.

Thereafter, the eNB transmits a PDCCH signal and/or an EPDCCH signal including $I_{MCS}$ to the UE. At this time, since the UE has already prepared the second table for 256QAM, a TBS according to the received $I_{MCS}$ may be derived from the second table (S1030).

The eNB modulates and transmits downlink data (e.g., DL-SCH signal) according to the modulation order and the TBS sent to the UE via $I_{MCS}$. In addition, the UE receives and demodulates the downlink data based on $I_{MCS}$ received in step S1030 (S1040).

The method described in Chapter 4.1 or 4.2 is applicable to the method for signaling $I_{MCS}$ in step S1030. For example, according to the methods described in Chapters 4.1 and 4.2, a legacy MCS table (i.e., a first table) and an MCS/TBS index table (i.e., a second table) for supporting 256QAM have a size of 5 bits. Accordingly, signaling of the PDCCH/EPDCCH signal including $I_{MCS}$ of step S1030 may be performed using the same method as in the LTE/LTE-A system.

In step S1040, the eNB may modulate octuple bits into one modulation symbol using a 256 QAM scheme and transmit the modulation symbol to the UE by mapping the modulated modulation symbol to a 256QAM constellation point. The UE may decode a downlink modulation symbol according to the received $I_{MCS}$.

As another embodiment, the eNB may indirectly notify the UE of whether the 256QAM scheme is used. For example, if a new transmission mode is defined for 256QAM, the UE may recognize that the 256QAM scheme is used by notifying the UE of a new transmission mode via RRC signaling, without explicit signaling of step S1020. In this case, step S1020 may not be performed.

5. Constellation Point Mapping Method

In FIG. 10, in order to perform step S1040, OFDM signals or OFDM symbols transmitted via a PDSCH should be mapped to constellation points and transmitted. That is, how the OFDM signals transmitted using the 256QAM scheme are mapped to constellation points needs to be newly defined. Hereinafter, methods for designing the constellation point for supporting 256QAM will be described in detail.

The constellation point for 256QAM defined in the embodiments of the present invention may be defined using a method for extending a constellation point mapping method for 64QAM, thereby reducing design complexity. At this time, in a QAM scheme, a plurality of bit streams is mapped to one modulation symbol, thereby increasing transmission efficiency. While 6 bits are mapped to one of 64 constellation points in 64QAM, 8 bits are mapped to one of 256 constellation points in 256 QAM.

5.1 64QAM Constellation Point Design

Table 8 below shows constellation points of 64QAM. In the embodiments of the present invention, complex(a, b) denotes a complex number a+j*b (a and b being integers) and sqrt(a) denotes a size indicating $\sqrt{a}$ According to Table 8, a bit stream composed of 6 bits [b0 b1 b2 b3 b4 b5]=[0 1 1 0 1 0] is modulated into an OFDM symbol and is mapped to a constellation point corresponding to complex(+7.0/sqrt (42.0), −3.0/sqrt(42.0)) and transmitted.

TABLE 8

| | |
|---|---|
| complex(+3.0/sqrt(42.0), +3.0/sqrt(42.0)), | //< b0 b1 b2 b3 b4 b5 = 0 0 0 0 0 0 |
| complex(+3.0/sqrt(42.0), +1.0/sqrt(42.0)), | //< b0 b1 b2 b3 b4 b5 = 0 0 0 0 0 1 |
| complex(+1.0/sqrt(42.0), +3.0/sqrt(42.0)), | //< b0 b1 b2 b3 b4 b5 = 0 0 0 0 1 0 |
| complex(+1.0/sqrt(42.0), +1.0/sqrt(42.0)), | //< b0 b1 b2 b3 b4 b5 = 0 0 0 0 1 1 |
| complex(+3.0/sqrt(42.0), +5.0/sqrt(42.0)), | //< b0 b1 b2 b3 b4 b5 = 0 0 0 1 0 0 |
| complex(+3.0/sqrt(42.0), +7.0/sqrt(42.0)), | //< b0 b1 b2 b3 b4 b5 = 0 0 0 1 0 1 |
| complex(+1.0/sqrt(42.0), +5.0/sqrt(42.0)), | //< b0 b1 b2 b3 b4 b5 = 0 0 0 1 1 0 |
| complex(+1.0/sqrt(42.0), +7.0/sqrt(42.0)), | //< b0 b1 b2 b3 b4 b5 = 0 0 0 1 1 1 |
| complex(+5.0/sqrt(42.0), +3.0/sqrt(42.0)), | //< b0 b1 b2 b3 b4 b5 = 0 0 1 0 0 0 |
| complex(+5.0/sqrt(42.0), +1.0/sqrt(42.0)), | //< b0 b1 b2 b3 b4 b5 = 0 0 1 0 0 1 |
| complex(+7.0/sqrt(42.0), +3.0/sqrt(42.0)), | //< b0 b1 b2 b3 b4 b5 = 0 0 1 0 1 0 |
| complex(+7.0/sqrt(42.0), +1.0/sqrt(42.0)), | //< b0 b1 b2 b3 b4 b5 = 0 0 1 0 1 1 |
| complex(+5.0/sqrt(42.0), +5.0/sqrt(42.0)), | //< b0 b1 b2 b3 b4 b5 = 0 0 1 1 0 0 |
| complex(+5.0/sqrt(42.0), +7.0/sqrt(42.0)), | //< b0 b1 b2 b3 b4 b5 = 0 0 1 1 0 1 |
| complex(+7.0/sqrt(42.0), +5.0/sqrt(42.0)), | //< b0 b1 b2 b3 b4 b5 = 0 0 1 1 1 0 |
| complex(+7.0/sqrt(42.0), +7.0/sqrt(42.0)), | //< b0 b1 b2 b3 b4 b5 = 0 0 1 1 1 1 |
| complex(+3.0/sqrt(42.0), −3.0/sqrt(42.0)), | //< b0 b1 b2 b3 b4 b5 = 0 1 0 0 0 0 |
| complex(+3.0/sqrt(42.0), −1.0/sqrt(42.0)), | //< b0 b1 b2 b3 b4 b5 = 0 1 0 0 0 1 |
| complex(+1.0/sqrt(42.0), −3.0/sqrt(42.0)), | //< b0 b1 b2 b3 b4 b5 = 0 1 0 0 1 0 |
| complex(+1.0/sqrt(42.0), −1.0/sqrt(42.0)), | //< b0 b1 b2 b3 b4 b5 = 0 1 0 0 1 1 |
| complex(+3.0/sqrt(42.0), −5.0/sqrt(42.0)), | //< b0 b1 b2 b3 b4 b5 = 0 1 0 1 0 0 |
| complex(+3.0/sqrt(42.0), −7.0/sqrt(42.0)), | //< b0 b1 b2 b3 b4 b5 = 0 1 0 1 0 1 |
| complex(+1.0/sqrt(42.0), −5.0/sqrt(42.0)), | //< b0 b1 b2 b3 b4 b5 = 0 1 0 1 1 0 |
| complex(+1.0/sqrt(42.0), −7.0/sqrt(42.0)), | //< b0 b1 b2 b3 b4 b5 = 0 1 0 1 1 1 |
| complex(+5.0/sqrt(42.0), −3.0/sqrt(42.0)), | //< b0 b1 b2 b3 b4 b5 = 0 1 1 0 0 0 |
| complex(+5.0/sqrt(42.0), −1.0/sqrt(42.0)), | //< b0 b1 b2 b3 b4 b5 = 0 1 1 0 0 1 |
| complex(+7.0/sqrt(42.0), −3.0/sqrt(42.0)), | //< b0 b1 b2 b3 b4 b5 = 0 1 1 0 1 0 |
| complex(+7.0/sqrt(42.0), −1.0/sqrt(42.0)), | //< b0 b1 b2 b3 b4 b5 = 0 1 1 0 1 1 |
| complex(+5.0/sqrt(42.0), −5.0/sqrt(42.0)), | //< b0 b1 b2 b3 b4 b5 = 0 1 1 1 0 0 |
| complex(+5.0/sqrt(42.0), −7.0/sqrt(42.0)), | //< b0 b1 b2 b3 b4 b5 = 0 1 1 1 0 1 |
| complex(+7.0/sqrt(42.0), −5.0/sqrt(42.0)), | //< b0 b1 b2 b3 b4 b5 = 0 1 1 1 1 0 |
| complex(+7.0/sqrt(42.0), −7.0/sqrt(42.0)), | //< b0 b1 b2 b3 b4 b5 = 0 1 1 1 1 1 |
| complex(−3.0/sqrt(42.0), +3.0/sqrt(42.0)), | //< b0 b1 b2 b3 b4 b5 = 1 0 0 0 0 0 |
| complex(−3.0/sqrt(42.0), +1.0/sqrt(42.0)), | //< b0 b1 b2 b3 b4 b5 = 1 0 0 0 0 1 |
| complex(−1.0/sqrt(42.0), +3.0/sqrt(42.0)), | //< b0 b1 b2 b3 b4 b5 = 1 0 0 0 1 0 |
| complex(−1.0/sqrt(42.0), +1.0/sqrt(42.0)), | //< b0 b1 b2 b3 b4 b5 = 1 0 0 0 1 1 |
| complex(−3.0/sqrt(42.0), +5.0/sqrt(42.0)), | //< b0 b1 b2 b3 b4 b5 = 1 0 0 1 0 0 |
| complex(−3.0/sqrt(42.0), +7.0/sqrt(42.0)), | //< b0 b1 b2 b3 b4 b5 = 1 0 0 1 0 1 |

TABLE 8-continued

| | |
|---|---|
| complex(−1.0/sqrt(42.0), +5.0/sqrt(42.0)), | //!< b0 b1 b2 b3 b4 b5 = 1 0 0 1 1 0 |
| complex(−1.0/sqrt(42.0), +7.0/sqrt(42.0)), | //!< b0 b1 b2 b3 b4 b5 = 1 0 0 1 1 1 |
| complex(−5.0/sqrt(42.0), +3.0/sqrt(42.0)), | //!< b0 b1 b2 b3 b4 b5 = 1 0 1 0 0 0 |
| complex(−5.0/sqrt(42.0), +1.0/sqrt(42.0)), | //!< b0 b1 b2 b3 b4 b5 = 1 0 1 0 0 1 |
| complex(−7.0/sqrt(42.0), +3.0/sqrt(42.0)), | //!< b0 b1 b2 b3 b4 b5 = 1 0 1 0 1 0 |
| complex(−7.0/sqrt(42.0), +1.0/sqrt(42.0)), | //!< b0 b1 b2 b3 b4 b5 = 1 0 1 0 1 1 |
| complex(−5.0/sqrt(42.0), +5.0/sqrt(42.0)), | //!< b0 b1 b2 b3 b4 b5 = 1 0 1 1 0 0 |
| complex(−5.0/sqrt(42.0), +7.0/sqrt(42.0)), | //!< b0 b1 b2 b3 b4 b5 = 1 0 1 1 0 1 |
| complex(−7.0/sqrt(42.0), +5.0/sqrt(42.0)), | //!< b0 b1 b2 b3 b4 b5 = 1 0 1 1 1 0 |
| complex(−7.0/sqrt(42.0), +7.0/sqrt(42.0)), | //!< b0 b1 b2 b3 b4 b5 = 1 0 1 1 1 1 |
| complex(−3.0/sqrt(42.0), −3.0/sqrt(42.0)), | //!< b0 b1 b2 b3 b4 b5 = 1 1 0 0 0 0 |
| complex(−3.0/sqrt(42.0), −1.0/sqrt(42.0)), | //!< b0 b1 b2 b3 b4 b5 = 1 1 0 0 0 1 |
| complex(−1.0/sqrt(42.0), −3.0/sqrt(42.0)), | //!< b0 b1 b2 b3 b4 b5 = 1 1 0 0 1 0 |
| complex(−1.0/sqrt(42.0), −1.0/sqrt(42.0)), | //!< b0 b1 b2 b3 b4 b5 = 1 1 0 0 1 1 |
| complex(−3.0/sqrt(42.0), −5.0/sqrt(42.0)), | //!< b0 b1 b2 b3 b4 b5 = 1 1 0 1 0 0 |
| complex(−3.0/sqrt(42.0), −7.0/sqrt(42.0)), | //!< b0 b1 b2 b3 b4 b5 = 1 1 0 1 0 1 |
| complex(−1.0/sqrt(42.0), −5.0/sqrt(42.0)), | //!< b0 b1 b2 b3 b4 b5 = 1 1 0 1 1 0 |
| complex(−1.0/sqrt(42.0), −7.0/sqrt(42.0)), | //!< b0 b1 b2 b3 b4 b5 = 1 1 0 1 1 1 |
| complex(−5.0/sqrt(42.0), −3.0/sqrt(42.0)), | //!< b0 b1 b2-b3 b4 b5 = 1 1 1 0 0 0 |
| complex(−5.0/sqrt(42.0), −1.0/sqrt(42.0)), | //!< b0 b1 b2 b3 b4 b5 = 1 1 1 0 0 1 |
| complex(−7.0/sqrt(42.0), −3.0/sqrt(42.0)), | //!< b0 b1 b2 b3 b4 b5 = 1 1 1 0 1 0 |
| complex(−7.0/sqrt(42.0), −1.0/sqrt(42.0)), | //!< b0 b1 b2 b3 b4 b5 = 1 1 1 0 1 1 |
| complex(−5.0/sqrt(42.0), −5.0/sqrt(42.0)), | //!< b0 b1 b2 b3 b4 b5 = 1 1 1 1 0 0 |
| complex(−5.0/sqrt(42.0), −7.0/sqrt(42.0)), | //!< b0 b1 b2 b3 b4 b5 = 1 1 1 1 0 1 |
| complex(−7.0/sqrt(42.0), −5.0/sqrt(42.0)), | //!< b0 b1 b2 b3 b4 b5 = 1 1 1 1 1 0 |
| complex(−7.0/sqrt(42.0), −7.0/sqrt(42.0)), | //!< b0 b1 b2 b3 b4 b5 = 1 1 1 1 1 1 |

5.2 256QAM Constellation Point Design

Figure 11:
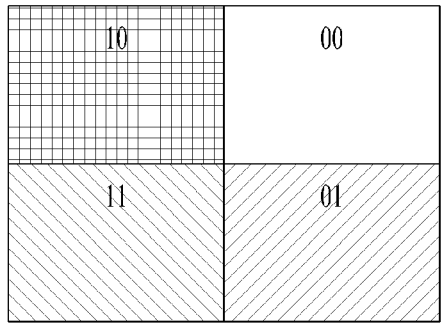
FIG. 11 is a diagram showing an example of a constellation point design method for supporting a 256QAM scheme.
Figure 12:
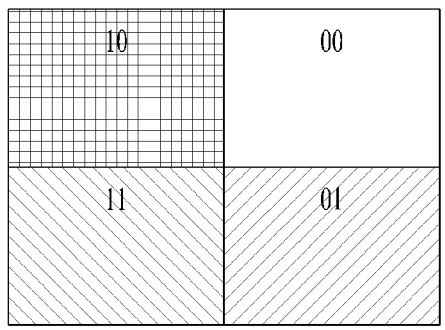
FIG. 12 is a diagram showing another example of a constellation point design method for supporting a 256QAM scheme.

A bit mapping method for a 256QAM constellation point may be designed using a 64QAM bit mapping method. In the 256QAM scheme, since bits greater in number than the number of bits of 64QAM by 2 bits are transmitted via one modulation symbol, the constellation point of 256QAM may be designed according to a combination of 2 bits as shown in FIG. 11 or 12. FIG. 11 or 12 shows an example of a constellation point design method for supporting a 256QAM scheme.

FIG. 11 briefly shows a constellation point which is divided four quadrants as 00, 10, 11 and 01, respectively. After constellation points corresponding to 64QAM are arranged in a third quadrant denoted by 11, two bits [b0 b1] may be added to design constellation points having a length of 8 bits. Thereafter, the constellation points, in which [1 0], [0 1] and [0 0] are for [b0 b1], may be designed by X-axis symmetry, Y-axis symmetry and origin symmetry of the constellation points of the third quadrant. Table 9 below shows one of 256QAM constellation points to which the design method described with reference to FIG. 11 is applied.

TABLE 9

| | |
|---|---|
| complex(+13.0/sqrt(170.0), +13.0/sqrt(170.0)), | //!< b0 b1 b2 b3 b4 b5 b6 b7 = 0 0 0 0 0 0 0 0 |
| complex(+13.0/sqrt(170.0), +15.0/sqrt(170.0)), | //!< b0 b1 b2 b3 b4 b5 b6 b7 = 0 0 0 0 0 0 0 1 |
| complex(+15.0/sqrt(170.0), +13.0/sqrt(170.0)), | //!< b0 b1 b2 b3 b4 b5 b6 b7 = 0 0 0 0 0 0 1 0 |
| complex(+15.0/sqrt(170.0), +15.0/sqrt(170.0)), | //!< b0 b1 b2 b3 b4 b5 b6 b7 = 0 0 0 0 0 0 1 1 |
| complex(+13.0/sqrt(170.0), +11.0/sqrt(170.0)), | //!< b0 b1 b2 b3 b4 b5 b6 b7 = 0 0 0 0 0 1 0 0 |
| complex(+13.0/sqrt(170.0), +9.0/sqrt(170.0)), | //!< b0 b1 b2 b3 b4 b5 b6 b7 = 0 0 0 0 0 1 0 1 |
| complex(+15.0/sqrt(170.0), +11.0/sqrt(170.0)), | //!< b0 b1 b2 b3 b4 b5 b6 b7 = 0 0 0 0 0 1 1 0 |
| complex(+15.0/sqrt(170.0), +9.0/sqrt(170.0)), | //!< b0 b1 b2 b3 b4 b5 b6 b7 = 0 0 0 0 0 1 1 1 |
| complex(+11.0/sqrt(170.0), +13.0/sqrt(170.0)), | //!< b0 b1 b2 b3 b4 b5 b6 b7 = 0 0 0 0 1 0 0 0 |
| complex(+11.0/sqrt(170.0), +15.0/sqrt(170.0)), | //!< b0 b1 b2 b3 b4 b5 b6 b7 = 0 0 0 0 1 0 0 1 |
| complex(+9.0/sqrt(170.0), +13.0/sqrt(170.0)), | //!< b0 b1 b2 b3 b4 b5 b6 b7 = 0 0 0 0 1 0 1 0 |
| complex(+9.0/sqrt(170.0), +15.0/sqrt(170.0)), | //!< b0 b1 b2 b3 b4 b5 b6 b7 = 0 0 0 0 1 0 1 1 |
| complex(+11.0/sqrt(170.0), +11.0/sqrt(170.0)), | //!< b0 b1 b2 b3 b4 b5 b6 b7 = 0 0 0 0 1 1 0 0 |
| complex(+11.0/sqrt(170.0), +9.0/sqrt(170.0)), | //!< b0 b1 b2 b3 b4 b5 b6 b7 = 0 0 0 0 1 1 0 1 |
| complex(+9.0/sqrt(170.0), +11.0/sqrt(170.0)), | //!< b0 b1 b2 b3 b4 b5 b6 b7 = 0 0 0 0 1 1 1 0 |
| complex(+9.0/sqrt(170.0), +9.0/sqrt(170.0)), | //!< b0 b1 b2 b3 b4 b5 b6 b7 = 0 0 0 0 1 1 1 1 |
| complex(+13.0/sqrt(170.0), +3.0/sqrt(170.0)), | //!< b0 b1 b2 b3 b4 b5 b6 b7 = 0 0 0 1 0 0 0 0 |
| complex(+13.0/sqrt(170.0), +1.0/sqrt(170.0)), | //!< b0 b1 b2 b3 b4 b5 b6 b7 = 0 0 0 1 0 0 0 1 |
| complex(+15.0/sqrt(170.0), +3.0/sqrt(170.0)), | //!< b0 b1 b2 b3 b4 b5 b6 b7 = 0 0 0 1 0 0 1 0 |
| complex(+15.0/sqrt(170.0), +1.0/sqrt(170.0)), | //!< b0 b1 b2 b3 b4 b5 b6 b7 = 0 0 0 1 0 0 1 1 |
| complex(+13.0/sqrt(170.0), +5.0/sqrt(170.0)), | //!< b0 b1 b2 b3 b4 b5 b6 b7 = 0 0 0 1 0 1 0 0 |
| complex(+13.0/sqrt(170.0), +7.0/sqrt(170.0)), | //!< b0 b1 b2 b3 b4 b5 b6 b7 = 0 0 0 1 0 1 0 1 |
| complex(+15.0/sqrt(170.0), +5.0/sqrt(170.0)), | //!< b0 b1 b2 b3 b4 b5 b6 b7 = 0 0 0 1 0 1 1 0 |
| complex(+15.0/sqrt(170.0), +7.0/sqrt(170.0)), | //!< b0 b1 b2 b3 b4 b5 b6 b7 = 0 0 0 1 0 1 1 1 |
| complex(+11.0/sqrt(170.0), +3.0/sqrt(170.0)), | //!< b0 b1 b2 b3 b4 b5 b6 b7 = 0 0 0 1 1 0 0 0 |
| complex(+11.0/sqrt(170.0), +1.0/sqrt(170.0)), | //!< b0 b1 b2 b3 b4 b5 b6 b7 = 0 0 0 1 1 0 0 1 |
| complex(+9.0/sqrt(170.0), +3.0/sqrt(170.0)), | //!< b0 b1 b2 b3 b4 b5 b6 b7 = 0 0 0 1 1 0 1 0 |
| complex(+9.0/sqrt(170.0), +1.0/sqrt(170.0)), | //!< b0 b1 b2 b3 b4 b5 b6 b7 = 0 0 0 1 1 0 1 1 |
| complex(+11.0/sqrt(170.0), +5.0/sqrt(170.0)), | //!< b0 b1 b2 b3 b4 b5 b6 b7 = 0 0 0 1 1 1 0 0 |
| complex(+11.0/sqrt(170.0), +7.0/sqrt(170.0)), | //!< b0 b1 b2 b3 b4 b5 b6 b7 = 0 0 0 1 1 1 0 1 |
| complex(+9.0/sqrt(170.0), +5.0/sqrt(170.0)), | //!< b0 b1 b2 b3 b4 b5 b6 b7 = 0 0 0 1 1 1 1 0 |
| complex(+9.0/sqrt(170.0), +7.0/sqrt(170.0)), | //!< b0 b1 b2 b3 b4 b5 b6 b7 = 0 0 0 1 1 1 1 1 |
| complex(+3.0/sqrt(170.0), +13.0/sqrt(170.0)), | //!< b0 b1 b2 b3 b4 b5 b6 b7 = 0 0 1 0 0 0 0 0 |

TABLE 9-continued

| | |
|---|---|
| complex(+3.0/sqrt(170.0), +15.0/sqrt(170.0)), | //!< b0 b1 b2 b3 b4 b5 b6 b7 = 0 0 1 0 0 0 0 1 |
| complex(+1.0/sqrt(170.0), +13.0/sqrt(170.0)), | //!< b0 b1 b2 b3 b4 b5 b6 b7 = 0 0 1 0 0 0 1 0 |
| complex(+1.0/sqrt(170.0), +15.0/sqrt(170.0)), | //!< b0 b1 b2 b3 b4 b5 b6 b7 = 0 0 1 0 0 0 1 1 |
| complex(+3.0/sqrt(170.0), +11.0/sqrt(170.0)), | //!< b0 b1 b2 b3 b4 b5 b6 b7 = 0 0 1 0 0 1 0 0 |
| complex(+3.0/sqrt(170.0), +9.0/sqrt(170.0)), | //!< b0 b1 b2 b3 b4 b5 b6 b7 = 0 0 1 0 0 1 0 1 |
| complex(+1.0/sqrt(170.0), +11.0/sqrt(170.0)), | //!< b0 b1 b2 b3 b4 b5 b6 b7 = 0 0 1 0 0 1 1 0 |
| complex(+1.0/sqrt(170.0), +9.0/sqrt(170.0)), | //!< b0 b1 b2 b3 b4 b5 b6 b7 = 0 0 1 0 0 1 1 1 |
| complex(+5.0/sqrt(170.0), +13.0/sqrt(170.0)), | //!< b0 b1 b2 b3 b4 b5 b6 b7 = 0 0 1 0 1 0 0 0 |
| complex(+5.0/sqrt(170.0), +15.0/sqrt(170.0)), | //!< b0 b1 b2 b3 b4 b5 b6 b7 = 0 0 1 0 1 0 0 1 |
| complex(+7.0/sqrt(170.0), +13.0/sqrt(170.0)), | //!< b0 b1 b2 b3 b4 b5 b6 b7 = 0 0 1 0 1 0 1 0 |
| complex(+7.0/sqrt(170.0), +15.0/sqrt(170.0)), | //!< b0 b1 b2 b3 b4 b5 b6 b7 = 0 0 1 0 1 0 1 1 |
| complex(+5.0/sqrt(170.0), +11.0/sqrt(170.0)), | //!< b0 b1 b2 b3 b4 b5 b6 b7 = 0 0 1 0 1 1 0 0 |
| complex(+5.0/sqrt(170.0), +9.0/sqrt(170.0)), | //!< b0 b1 b2 b3 b4 b5 b6 b7 = 0 0 1 0 1 1 0 1 |
| complex(+7.0/sqrt(170.0), +11.0/sqrt(170.0)), | //!< b0 b1 b2 b3 b4 b5 b6 b7 = 0 0 1 0 1 1 1 0 |
| complex(+7.0/sqrt(170.0), +9.0/sqrt(170.0)), | //!< b0 b1 b2 b3 b4 b5 b6 b7 = 0 0 1 0 1 1 1 1 |
| complex(+3.0/sqrt(170.0), +3.0/sqrt(170.0)), | //!< b0 b1 b2 b3 b4 b5 b6 b7 = 0 0 1 1 0 0 0 0 |
| complex(+3.0/sqrt(170.0), +1.0/sqrt(170.0)), | //!< b0 b1 b2 b3 b4 b5 b6 b7 = 0 0 1 1 0 0 0 1 |
| complex(+1.0/sqrt(170.0), +1.0/sqrt(170.0)), | //!< b0 b1 b2 b3 b4 b5 b6 b7 = 0 0 1 1 0 0 1 0 |
| complex(+1.0/sqrt(170.0), +1.0/sqrt(170.0)), | //!< b0 b1 b2 b3 b4 b5 b6 b7 = 0 0 1 1 0 0 1 1 |
| complex(+3.0/sqrt(170.0), +5.0/sqrt(170.0)), | //!< b0 b1 b2 b3 b4 b5 b6 b7 = 0 0 1 1 0 1 0 0 |
| complex(+3.0/sqrt(170.0), +7.0/sqrt(170.0)), | //!< b0 b1 b2 b3 b4 b5 b6 b7 = 0 0 1 1 0 1 0 1 |
| complex(+1.0/sqrt(170.0), +5.0/sqrt(170.0)), | //!< b0 b1 b2 b3 b4 b5 b6 b7 = 0 0 1 1 0 1 1 0 |
| complex(+1.0/sqrt(170.0), +7.0/sqrt(170.0)), | //!< b0 b1 b2 b3 b4 b5 b6 b7 = 0 0 1 1 0 1 1 1 |
| complex(+5.0/sqrt(170.0), +3.0/sqrt(170.0)), | //!< b0 b1 b2 b3 b4 b5 b6 b7 = 0 0 1 1 1 0 0 0 |
| complex(+5.0/sqrt(170.0), +1.0/sqrt(170.0)), | //!< b0 b1 b2 b3 b4 b5 b6 b7 = 0 0 1 1 1 0 0 1 |
| complex(+7.0/sqrt(170.0), +3.0/sqrt(170.0)), | //!< b0 b1 b2 b3 b4 b5 b6 b7 = 0 0 1 1 1 0 1 0 |
| complex(+7.0/sqrt(170.0), +1.0/sqrt(170.0)), | //!< b0 b1 b2 b3 b4 b5 b6 b7 = 0 0 1 1 1 0 1 1 |
| complex(+5.0/sqrt(170.0), +5.0/sqrt(170.0)), | //!< b0 b1 b2 b3 b4 b5 b6 b7 = 0 0 1 1 1 1 0 0 |
| complex(+5.0/sqrt(170.0), +7.0/sqrt(170.0)), | //!< b0 b1 b2 b3 b4 b5 b6 b7 = 0 0 1 1 1 1 0 1 |
| complex(+7.0/sqrt(170.0), +5.0/sqrt(170.0)), | //!< b0 b1 b2 b3 b4 b5 b6 b7 = 0 0 1 1 1 1 1 0 |
| complex(+7.0/sqrt(170.0), +7.0/sqrt(170.0)), | //!< b0 b1 b2 b3 b4 b5 b6 b7 = 0 0 1 1 1 1 1 1 |
| complex(+13.0/sqrt(170.0), −13.0/sqrt(170.0)), | //!< b0 b1 b2 b3 b4 b5 b6 b7 = 0 1 0 0 0 0 0 0 |
| complex(+13.0/sqrt(170.0), −15.0/sqrt(170.0)), | //!< b0 b1 b2 b3 b4 b5 b6 b7 = 0 1 0 0 0 0 0 1 |
| complex(+15.0/sqrt(170.0), −13.0/sqrt(170.0)), | //!< b0 b1 b2 b3 b4 b5 b6 b7 = 0 1 0 0 0 0 1 0 |
| complex(+15.0/sqrt(170.0), −15.0/sqrt(170.0)), | //!< b0 b1 b2 b3 b4 b5 b6 b7 = 0 1 0 0 0 0 1 1 |
| complex(+13.0/sqrt(170.0), −11.0/sqrt(170.0)), | //!< b0 b1 b2 b3 b4 b5 b6 b7 = 0 1 0 0 0 1 0 0 |
| complex(+13.0/sqrt(170.0), −9.0/sqrt(170.0)), | //!< b0 b1 b2 b3 b4 b5 b6 b7 = 0 1 0 0 0 1 0 1 |
| complex(+15.0/sqrt(170.0), −11.0/sqrt(170.0)), | //!< b0 b1 b2 b3 b4 b5 b6 b7 = 0 1 0 0 0 1 1 0 |
| complex(+15.0/sqrt(170.0), −9.0/sqrt(170.0)), | //!< b0 b1 b2 b3 b4 b5 b6 b7 = 0 1 0 0 0 1 1 1 |
| complex(+11.0/sqrt(170.0), −13.0/sqrt(170.0)), | //!< b0 b1 b2 b3 b4 b5 b6 b7 = 0 1 0 0 1 0 0 0 |
| complex(+11.0/sqrt(170.0), −15.0/sqrt(170.0)), | //!< b0 b1 b2 b3 b4 b5 b6 b7 = 0 1 0 0 1 0 0 1 |
| complex(+9.0/sqrt(170.0), −13.0/sqrt(170.0)), | //!< b0 b1 b2 b3 b4 b5 b6 b7 = 0 1 0 0 1 0 1 0 |
| complex(+9.0/sqrt(170.0), −15.0/sqrt(170.0)), | //!< b0 b1 b2 b3 b4 b5 b6 b7 = 0 1 0 0 1 0 1 1 |
| complex(+11.0/sqrt(170.0), −11.0/sqrt(170.0)), | //!< b0 b1 b2 b3 b4 b5 b6 b7 = 0 1 0 0 1 1 0 0 |
| complex(+11.0/sqrt(170.0), −9.0/sqrt(170.0)), | //!< b0 b1 b2 b3 b4 b5 b6 b7 = 0 1 0 0 1 1 0 1 |
| complex(+9.0/sqrt(170.0), −11.0/sqrt(170.0)), | //!< b0 b1 b2 b3 b4 b5 b6 b7 = 0 1 0 0 1 1 1 0 |
| complex(+9.0/sqrt(170.0), −9.0/sqrt(170.0)), | //!< b0 b1 b2 b3 b4 b5 b6 b7 = 0 1 0 0 1 1 1 1 |
| complex(+13.0/sqrt(170.0), −3.0/sqrt(170.0)), | //!< b0 b1 b2 b3 b4 b5 b6 b7 = 0 1 0 1 0 0 0 0 |
| complex(+13.0/sqrt(170.0), −1.0/sqrt(170.0)), | //!< b0 b1 b2 b3 b4 b5 b6 b7 = 0 1 0 1 0 0 0 1 |
| complex(+15.0/sqrt(170.0), −3.0/sqrt(170.0)), | //!< b0 b1 b2 b3 b4 b5 b6 b7 = 0 1 0 1 0 0 1 0 |
| complex(+15.0/sqrt(170.0), −1.0/sqrt(170.0)), | //!< b0 b1 b2 b3 b4 b5 b6 b7 = 0 1 0 1 0 0 1 1 |
| complex(+13.0/sqrt(170.0), −5.0/sqrt(170.0)), | //!< b0 b1 b2 b3 b4 b5 b6 b7 = 0 1 0 1 0 1 0 0 |
| complex(+13.0/sqrt(170.0), −7.0/sqrt(170.0)), | //!< b0 b1 b2 b3 b4 b5 b6 b7 = 0 1 0 1 0 1 0 1 |
| complex(+15.0/sqrt(170.0), −5.0/sqrt(170.0)), | //!< b0 b1 b2 b3 b4 b5 b6 b7 = 0 1 0 1 0 1 1 0 |
| complex(+15.0/sqrt(170.0), −7.0/sqrt(170.0)), | //!< b0 b1 b2 b3 b4 b5 b6 b7 = 0 1 0 1 0 1 1 1 |
| complex(+11.0/sqrt(170.0), −3.0/sqrt(170.0)), | //!< b0 b1 b2 b3 b4 b5 b6 b7 = 0 1 0 1 1 0 0 0 |
| complex(+11.0/sqrt(170.0), −1.0/sqrt(170.0)), | //!< b0 b1 b2 b3 b4 b5 b6 b7 = 0 1 0 1 1 0 0 1 |
| complex(+9.0/sqrt(170.0), −3.0/sqrt(170.0)), | //!< b0 b1 b2 b3 b4 b5 b6 b7 = 0 1 0 1 1 0 1 0 |
| complex(+9.0/sqrt(170.0), −1.0/sqrt(170.0)), | //!< b0 b1 b2 b3 b4 b5 b6 b7 = 0 1 0 1 1 0 1 1 |
| complex(+11.0/sqrt(170.0), −5.0/sqrt(170.0)), | //!< b0 b1 b2 b3 b4 b5 b6 b7 = 0 1 0 1 1 1 0 0 |
| complex(+11.0/sqrt(170.0), −7.0/sqrt(170.0)), | //!< b0 b1 b2 b3 b4 b5 b6 b7 = 0 1 0 1 1 1 0 1 |
| complex(+9.0/sqrt(170.0), −5.0/sqrt(170.0)), | //!< b0 b1 b2 b3 b4 b5 b6 b7 = 0 1 0 1 1 1 1 0 |
| complex(+9.0/sqrt(170.0), −7.0/sqrt(170.0)), | //!< b0 b1 b2 b3 b4 b5 b6 b7 = 0 1 0 1 1 1 1 1 |
| complex(+3.0/sqrt(170.0), −13.0/sqrt(170.0)), | //!< b0 b1 b2 b3 b4 b5 b6 b7 = 0 1 1 0 0 0 0 0 |
| complex(+3.0/sqrt(170.0), −15.0/sqrt(170.0)), | //!< b0 b1 b2 b3 b4 b5 b6 b7 = 0 1 1 0 0 0 0 1 |
| complex(+1.0/sqrt(170.0), −13.0/sqrt(170.0)), | //!< b0 b1 b2 b3 b4 b5 b6 b7 = 0 1 1 0 0 0 1 0 |
| complex(+1.0/sqrt(170.0), −15.0/sqrt(170.0)), | //!< b0 b1 b2 b3 b4 b5 b6 b7 = 0 1 1 0 0 0 1 1 |
| complex(+3.0/sqrt(170.0), −11.0/sqrt(170.0)), | //!< b0 b1 b2 b3 b4 b5 b6 b7 = 0 1 1 0 0 1 0 0 |
| complex(+3.0/sqrt(170.0), −9.0/sqrt(170.0)), | //!< b0 b1 b2 b3 b4 b5 b6 b7 = 0 1 1 0 0 1 0 1 |
| complex(+1.0/sqrt(170.0), −11.0/sqrt(170.0)), | //!< b0 b1 b2 b3 b4 b5 b6 b7 = 0 1 1 0 0 1 1 0 |
| complex(+1.0/sqrt(170.0), −9.0/sqrt(170.0)), | //!< b0 b1 b2 b3 b4 b5 b6 b7 = 0 1 1 0 0 1 1 1 |
| complex(+5.0/sqrt(170.0), −13.0/sqrt(170.0)), | //!< b0 b1 b2 b3 b4 b5 b6 b7 = 0 1 1 0 1 0 0 0 |
| complex(+5.0/sqrt(170.0), −15.0/sqrt(170.0)), | //!< b0 b1 b2 b3 b4 b5 b6 b7 = 0 1 1 0 1 0 0 1 |
| complex(+7.0/sqrt(170.0), −13.0/sqrt(170.0)), | //!< b0 b1 b2 b3 b4 b5 b6 b7 = 0 1 1 0 1 0 1 0 |
| complex(+7.0/sqrt(170.0), −15.0/sqrt(170.0)), | //!< b0 b1 b2 b3 b4 b5 b6 b7 = 0 1 1 0 1 0 1 1 |
| complex(+5.0/sqrt(170.0), −11.0/sqrt(170.0)), | //!< b0 b1 b2 b3 b4 b5 b6 b7 = 0 1 1 0 1 1 0 0 |
| complex(+5.0/sqrt(170.0), −9.0/sqrt(170.0)), | //!< b0 b1 b2 b3 b4 b5 b6 b7 = 0 1 1 0 1 1 0 1 |
| complex(+7.0/sqrt(170.0), −11.0/sqrt(170.0)), | //!< b0 b1 b2 b3 b4 b5 b6 b7 = 0 1 1 0 1 1 1 0 |
| complex(+7.0/sqrt(170.0), −9.0/sqrt(170.0)), | //!< b0 b1 b2 b3 b4 b5 b6 b7 = 0 1 1 0 1 1 1 1 |
| complex(+3.0/sqrt(170.0), −3.0/sqrt(170.0)), | //!< b0 b1 b2 b3 b4 b5 b6 b7 = 0 1 1 1 0 0 0 0 |

TABLE 9-continued

| | |
|---|---|
| complex(+3.0/sqrt(170.0), −1.0/sqrt(170.0)), | //!< b0 b1 b2 b3 b4 b5 b6 b7 = 0 1 1 1 0 0 0 1 |
| complex(+1.0/sqrt(170.0), −1.0/sqrt(170.0)), | //!< b0 b1 b2 b3 b4 b5 b6 b7 = 0 1 1 1 0 0 1 0 |
| complex(+1.0/sqrt(170.0), −1.0/sqrt(170.0)), | //!< b0 b1 b2 b3 b4 b5 b6 b7 = 0 1 1 1 0 0 1 1 |
| complex(+3.0/sqrt(170.0), −5.0/sqrt(170.0)), | //!< b0 b1 b2 b3 b4 b5 b6 b7 = 0 1 1 1 0 1 0 0 |
| complex(+3.0/sqrt(170.0), −7.0/sqrt(170.0)), | //!< b0 b1 b2 b3 b4 b5 b6 b7 = 0 1 1 1 0 1 0 1 |
| complex(+1.0/sqrt(170.0), −5.0/sqrt(170.0)), | //!< b0 b1 b2 b3 b4 b5 b6 b7 = 0 1 1 1 0 1 1 0 |
| complex(+1.0/sqrt(170.0), −7.0/sqrt(170.0)), | //!< b0 b1 b2 b3 b4 b5 b6 b7 = 0 1 1 1 0 1 1 1 |
| complex(+5.0/sqrt(170.0), −3.0/sqrt(170.0)), | //!< b0 b1 b2 b3 b4 b5 b6 b7 = 0 1 1 1 1 0 0 0 |
| complex(+5.0/sqrt(170.0), −1.0/sqrt(170.0)), | //!< b0 b1 b2 b3 b4 b5 b6 b7 = 0 1 1 1 1 0 0 1 |
| complex(+7.0/sqrt(170.0), −3.0/sqrt(170.0)), | //!< b0 b1 b2 b3 b4 b5 b6 b7 = 0 1 1 1 1 0 1 0 |
| complex(+7.0/sqrt(170.0), −1.0/sqrt(170.0)), | //!< b0 b1 b2 b3 b4 b5 b6 b7 = 0 1 1 1 1 0 1 1 |
| complex(+5.0/sqrt(170.0), −5.0/sqrt(170.0)), | //!< b0 b1 b2 b3 b4 b5 b6 b7 = 0 1 1 1 1 1 0 0 |
| complex(+5.0/sqrt(170.0), −7.0/sqrt(170.0)), | //!< b0 b1 b2 b3 b4 b5 b6 b7 = 0 1 1 1 1 1 0 1 |
| complex(+7.0/sqrt(170.0), −5.0/sqrt(170.0)), | //!< b0 b1 b2 b3 b4 b5 b6 b7 = 0 1 1 1 1 1 1 0 |
| complex(+7.0/sqrt(170.0), −7.0/sqrt(170.0)), | //!< b0 b1 b2 b3 b4 b5 b6 b7 = 0 1 1 1 1 1 1 1 |
| complex(−13.0/sqrt(170.0), +13.0/sqrt(170.0)), | //!< b0 b1 b2 b3 b4 b5 b6 b7 = 1 0 0 0 0 0 0 0 |
| complex(−13.0/sqrt(170.0), +15.0/sqrt(170.0)), | //!< b0 b1 b2 b3 b4 b5 b6 b7 = 1 0 0 0 0 0 0 1 |
| complex(−15.0/sqrt(170.0), +13.0/sqrt(170.0)), | //!< b0 b1 b2 b3 b4 b5 b6 b7 = 1 0 0 0 0 0 1 0 |
| complex(−15.0/sqrt(170.0), +15.0/sqrt(170.0)), | //!< b0 b1 b2 b3 b4 b5 b6 b7 = 1 0 0 0 0 0 1 1 |
| complex(−13.0/sqrt(170.0), +11.0/sqrt(170.0)), | //!< b0 b1 b2 b3 b4 b5 b6 b7 = 1 0 0 0 0 1 0 0 |
| complex(−13.0/sqrt(170.0), +9.0/sqrt(170.0)), | //!< b0 b1 b2 b3 b4 b5 b6 b7 = 1 0 0 0 0 1 0 1 |
| complex(−15.0/sqrt(170.0), +11.0/sqrt(170.0)), | //!< b0 b1 b2 b3 b4 b5 b6 b7 = 1 0 0 0 0 1 1 0 |
| complex(−15.0/sqrt(170.0), +9.0/sqrt(170.0)), | //!< b0 b1 b2 b3 b4 b5 b6 b7 = 1 0 0 0 0 1 1 1 |
| complex(−11.0/sqrt(170.0), +13.0/sqrt(170.0)), | //!< b0 b1 b2 b3 b4 b5 b6 b7 = 1 0 0 0 1 0 0 0 |
| complex(−11.0/sqrt(170.0), +15.0/sqrt(170.0)), | //!< b0 b1 b2 b3 b4 b5 b6 b7 = 1 0 0 0 1 0 0 1 |
| complex(−9.0/sqrt(170.0), +13.0/sqrt(170.0)), | //!< b0 b1 b2 b3 b4 b5 b6 b7 = 1 0 0 0 1 0 1 0 |
| complex(−9.0/sqrt(170.0), +15.0/sqrt(170.0)), | //!< b0 b1 b2 b3 b4 b5 b6 b7 = 1 0 0 0 1 0 1 1 |
| complex(−11.0/sqrt(170.0), +11.0/sqrt(170.0)), | //!< b0 b1 b2 b3 b4 b5 b6 b7 = 1 0 0 0 1 1 0 0 |
| complex(−11.0/sqrt(170.0), +9.0/sqrt(170.0)), | //!< b0 b1 b2 b3 b4 b5 b6 b7 = 1 0 0 0 1 1 0 1 |
| complex(−9.0/sqrt(170.0), +11.0/sqrt(170.0)), | //!< b0 b1 b2 b3 b4 b5 b6 b7 = 1 0 0 0 1 1 1 0 |
| complex(−9.0/sqrt(170.0), +9.0/sqrt(170.0)), | //!< b0 b1 b2 b3 b4 b5 b6 b7 = 1 0 0 0 1 1 1 1 |
| complex(−13.0/sqrt(170.0), +3.0/sqrt(170.0)), | //!< b0 b1 b2 b3 b4 b5 b6 b7 = 1 0 0 1 0 0 0 0 |
| complex(−13.0/sqrt(170.0), +1.0/sqrt(170.0)), | //!< b0 b1 b2 b3 b4 b5 b6 b7 = 1 0 0 1 0 0 0 1 |
| complex(−15.0/sqrt(170.0), +3.0/sqrt(170.0)), | //!< b0 b1 b2 b3 b4 b5 b6 b7 = 1 0 0 1 0 0 1 0 |
| complex(−15.0/sqrt(170.0), +1.0/sqrt(170.0)), | //!< b0 b1 b2 b3 b4 b5 b6 b7 = 1 0 0 1 0 0 1 1 |
| complex(−13.0/sqrt(170.0), +5.0/sqrt(170.0)), | //!< b0 b1 b2 b3 b4 b5 b6 b7 = 1 0 0 1 0 1 0 0 |
| complex(−13.0/sqrt(170.0), +7.0/sqrt(170.0)), | //!< b0 b1 b2 b3 b4 b5 b6 b7 = 1 0 0 1 0 1 0 1 |
| complex(−15.0/sqrt(170.0), +5.0/sqrt(170.0)), | //!< b0 b1 b2 b3 b4 b5 b6 b7 = 1 0 0 1 0 1 1 0 |
| complex(−15.0/sqrt(170.0), +7.0/sqrt(170.0)), | //!< b0 b1 b2 b3 b4 b5 b6 b7 = 1 0 0 1 0 1 1 1 |
| complex(−11.0/sqrt(170.0), +3.0/sqrt(170.0)), | //!< b0 b1 b2 b3 b4 b5 b6 b7 = 1 0 0 1 1 0 0 0 |
| complex(−11.0/sqrt(170.0), +1.0/sqrt(170.0)), | //!< b0 b1 b2 b3 b4 b5 b6 b7 = 1 0 0 1 1 0 0 1 |
| complex(−9.0/sqrt(170.0), +3.0/sqrt(170.0)), | //!< b0 b1 b2 b3 b4 b5 b6 b7 = 1 0 0 1 1 0 1 0 |
| complex(−9.0/sqrt(170.0), +1.0/sqrt(170.0)), | //!< b0 b1 b2 b3 b4 b5 b6 b7 = 1 0 0 1 1 0 1 1 |
| complex(−11.0/sqrt(170.0), +5.0/sqrt(170.0)), | //!< b0 b1 b2 b3 b4 b5 b6 b7 = 1 0 0 1 1 1 0 0 |
| complex(−11.0/sqrt(170.0), +7.0/sqrt(170.0)), | //!< b0 b1 b2 b3 b4 b5 b6 b7 = 1 0 0 1 1 1 0 1 |
| complex(−9.0/sqrt(170.0), +5.0/sqrt(170.0)), | //!< b0 b1 b2 b3 b4 b5 b6 b7 = 1 0 0 1 1 1 1 0 |
| complex(−9.0/sqrt(170.0), +7.0/sqrt(170.0)), | //!< b0 b1 b2 b3 b4 b5 b6 b7 = 1 0 0 1 1 1 1 1 |
| complex(−3.0/sqrt(170.0), +13.0/sqrt(170.0)), | //!< b0 b1 b2 b3 b4 b5 b6 b7 = 1 0 1 0 0 0 0 0 |
| complex(−3.0/sqrt(170.0), +15.0/sqrt(170.0)), | //!< b0 b1 b2 b3 b4 b5 b6 b7 = 1 0 1 0 0 0 0 1 |
| complex(−1.0/sqrt(170.0), +13.0/sqrt(170.0)), | //!< b0 b1 b2 b3 b4 b5 b6 b7 = 1 0 1 0 0 0 1 0 |
| complex(−1.0/sqrt(170.0), +15.0/sqrt(170.0)), | //!< b0 b1 b2 b3 b4 b5 b6 b7 = 1 0 1 0 0 0 1 1 |
| complex(−3.0/sqrt(170.0), +11.0/sqrt(170.0)), | //!< b0 b1 b2 b3 b4 b5 b6 b7 = 1 0 1 0 0 1 0 0 |
| complex(−3.0/sqrt(170.0), +9.0/sqrt(170.0)), | //!< b0 b1 b2 b3 b4 b5 b6 b7 = 1 0 1 0 0 1 0 1 |
| complex(−1.0/sqrt(170.0), +11.0/sqrt(170.0)), | //!< b0 b1 b2 b3 b4 b5 b6 b7 = 1 0 1 0 0 1 1 0 |
| complex(−1.0/sqrt(170.0), +9.0/sqrt(170.0)), | //!< b0 b1 b2 b3 b4 b5 b6 b7 = 1 0 1 0 0 1 1 1 |
| complex(−5.0/sqrt(170.0), +13.0/sqrt(170.0)), | //!< b0 b1 b2 b3 b4 b5 b6 b7 = 1 0 1 0 1 0 0 0 |
| complex(−5.0/sqrt(170.0), +15.0/sqrt(170.0)), | //!< b0 b1 b2 b3 b4 b5 b6 b7 = 1 0 1 0 1 0 0 1 |
| complex(−7.0/sqrt(170.0), +13.0/sqrt(170.0)), | //!< b0 b1 b2 b3 b4 b5 b6 b7 = 1 0 1 0 1 0 1 0 |
| complex(−7.0/sqrt(170.0), +15.0/sqrt(170.0)), | //!< b0 b1 b2 b3 b4 b5 b6 b7 = 1 0 1 0 1 0 1 1 |
| complex(−5.0/sqrt(170.0), +11.0/sqrt(170.0)), | //!< b0 b1 b2 b3 b4 b5 b6 b7 = 1 0 1 0 1 1 0 0 |
| complex(−5.0/sqrt(170.0), +9.0/sqrt(170.0)), | //!< b0 b1 b2 b3 b4 b5 b6 b7 = 1 0 1 0 1 1 0 1 |
| complex(−7.0/sqrt(170.0), +11.0/sqrt(170.0)), | //!< b0 b1 b2 b3 b4 b5 b6 b7 = 1 0 1 0 1 1 1 0 |
| complex(−7.0/sqrt(170.0), +9.0/sqrt(170.0)), | //!< b0 b1 b2 b3 b4 b5 b6 b7 = 1 0 1 0 1 1 1 1 |
| complex(−3.0/sqrt(170.0), +3.0/sqrt(170.0)), | //!< b0 b1 b2 b3 b4 b5 b6 b7 = 1 0 1 1 0 0 0 0 |
| complex(−3.0/sqrt(170.0), +1.0/sqrt(170.0)), | //!< b0 b1 b2 b3 b4 b5 b6 b7 = 1 0 1 1 0 0 0 1 |
| complex(−1.0/sqrt(170.0), +1.0/sqrt(170.0)), | //!< b0 b1 b2 b3 b4 b5 b6 b7 = 1 0 1 1 0 0 1 0 |
| complex(−1.0/sqrt(170.0), +1.0/sqrt(170.0)), | //!< b0 b1 b2 b3 b4 b5 b6 b7 = 1 0 1 1 0 0 1 1 |
| complex(−3.0/sqrt(170.0), +5.0/sqrt(170.0)), | //!< b0 b1 b2 b3 b4 b5 b6 b7 = 1 0 1 1 0 1 0 0 |
| complex(−3.0/sqrt(170.0), +7.0/sqrt(170.0)), | //!< b0 b1 b2 b3 b4 b5 b6 b7 = 1 0 1 1 0 1 0 1 |
| complex(−1.0/sqrt(170.0), +5.0/sqrt(170.0)), | //!< b0 b1 b2 b3 b4 b5 b6 b7 = 1 0 1 1 0 1 1 0 |
| complex(−1.0/sqrt(170.0), +7.0/sqrt(170.0)), | //!< b0 b1 b2 b3 b4 b5 b6 b7 = 1 0 1 1 0 1 1 1 |
| complex(−5.0/sqrt(170.0), +3.0/sqrt(170.0)), | //!< b0 b1 b2 b3 b4 b5 b6 b7 = 1 0 1 1 1 0 0 0 |
| complex(−5.0/sqrt(170.0), +1.0/sqrt(170.0)), | //!< b0 b1 b2 b3 b4 b5 b6 b7 = 1 0 1 1 1 0 0 1 |
| complex(−7.0/sqrt(170.0), +3.0/sqrt(170.0)), | //!< b0 b1 b2 b3 b4 b5 b6 b7 = 1 0 1 11 0 1 0 |
| complex(−7.0/sqrt(170.0), +1.0/sqrt(170.0)), | //!< b0 b1 b2 b3 b4 b5 b6 b7 = 1 0 1 1 1 0 1 1 |
| complex(−5.0/sqrt(170.0), +5.0/sqrt(170.0)), | //!< b0 b1 b2 b3 b4 b5 b6 b7 = 1 0 1 1 1 1 0 0 |
| complex(−5.0/sqrt(170.0), +7.0/sqrt(170.0)), | //!< b0 b1 b2 b3 b4 b5 b6 b7 = 1 0 1 1 1 1 0 1 |
| complex(−7.0/sqrt(170.0), +5.0/sqrt(170.0)), | //!< b0 b1 b2 b3 b4 b5 b6 b7 = 1 0 1 1 1 1 1 0 |
| complex(−7.0/sqrt(170.0), +7.0/sqrt(170.0)), | //!< b0 b1 b2 b3 b4 b5 b6 b7 = 1 0 1 1 1 1 1 1 |
| complex(−13.0/sqrt(170.0), −13.0/sqrt(170.0)), | //!< b0 b1 b2 b3 b4 b5 b6 b7 = 1 1 0 0 0 0 0 0 |

TABLE 9-continued

| | |
|---|---|
| complex(−13.0/sqrt(170.0), −15.0/sqrt(170.0)), | //!< b0 b1 b2 b3 b4 b5 b6 b7 = 1 1 0 0 0 0 0 1 |
| complex(−15.0/sqrt(170.0), −13.0/sqrt(170.0)), | //!< b0 b1 b2 b3 b4 b5 b6 b7 = 1 1 0 0 0 0 1 0 |
| complex(−15.0/sqrt(170.0), −15.0/sqrt(170.0)), | //!< b0 b1 b2 b3 b4 b5 b6 b7 = 1 1 0 0 0 0 1 1 |
| complex(−13.0/sqrt(170.0), −11.0/sqrt(170.0)), | //!< b0 b1 b2 b3 b4 b5 b6 b7 = 1 1 0 0 0 1 0 0 |
| complex(−13.0/sqrt(170.0), −9.0/sqrt(170.0)), | //!< b0 b1 b2 b3 b4 b5 b6 b7 = 1 1 0 0 0 1 0 1 |
| complex(−15.0/sqrt(170.0), −11.0/sqrt(170.0)), | //!< b0 b1 b2 b3 b4 b5 b6 b7 = 1 1 0 0 0 1 1 0 |
| complex(−15.0/sqrt(170.0), −9.0/sqrt(170.0)), | //!< b0 b1 b2 b3 b4 b5 b6 b7 = 1 1 0 0 0 1 1 1 |
| complex(−11.0/sqrt(170.0), −13.0/sqrt(170.0)), | //!< b0 b1 b2 b3 b4 b5 b6 b7 = 1 1 0 0 1 0 0 0 |
| complex(−11.0/sqrt(170.0), −15.0/sqrt(170.0)), | //!< b0 b1 b2 b3 b4 b5 b6 b7 = 1 1 0 0 1 0 0 1 |
| complex(−9.0/sqrt(170.0), −13.0/sqrt(170.0)), | //!< b0 b1 b2 b3 b4 b5 b6 b7 = 1 1 0 0 1 0 1 0 |
| complex(−9.0/sqrt(170.0), −15.0/sqrt(170.0)), | //!< b0 b1 b2 b3 b4 b5 b6 b7 = 1 1 0 0 1 0 1 1 |
| complex(−11.0/sqrt(170.0), −11.0/sqrt(170.0)), | //!< b0 b1 b2 b3 b4 b5 b6 b7 = 1 1 0 0 1 1 0 0 |
| complex(−11.0/sqrt(170.0), −9.0/sqrt(170.0)), | //!< b0 b1 b2 b3 b4 b5 b6 b7 = 1 1 0 0 1 1 0 1 |
| complex(−9.0/sqrt(170.0), −11.0/sqrt(170.0)), | //!< b0 b1 b2 b3 b4 b5 b6 b7 = 1 1 0 0 1 1 1 0 |
| complex(−9.0/sqrt(170.0), −9.0/sqrt(170.0)), | //!< b0 b1 b2 b3 b4 b5 b6 b7 = 1 1 0 0 1 1 1 1 |
| complex(−13.0/sqrt(170.0), −3.0/sqrt(170.0)), | //!< b0 b1 b2 b3 b4 b5 b6 b7 = 1 1 0 1 0 0 0 0 |
| complex(−13.0/sqrt(170.0), −1.0/sqrt(170.0)), | //!< b0 b1 b2 b3 b4 b5 b6 b7 = 1 1 0 1 0 0 0 1 |
| complex(−15.0/sqrt(170.0), −3.0/sqrt(170.0)), | //!< b0 b1 b2 b3 b4 b5 b6 b7 = 1 1 0 1 0 0 1 0 |
| complex(−15.0/sqrt(170.0), −1.0/sqrt(170.0)), | //!< b0 b1 b2 b3 b4 b5 b6 b7 = 1 1 0 1 0 0 1 1 |
| complex(−13.0/sqrt(170.0), −5.0/sqrt(170.0)), | //!< b0 b1 b2 b3 b4 b5 b6 b7 = 1 1 0 1 0 1 0 0 |
| complex(−13.0/sqrt(170.0), −7.0/sqrt(170.0)), | //!< b0 b1 b2 b3 b4 b5 b6 b7 = 1 1 0 1 0 1 0 1 |
| complex(−15.0/sqrt(170.0), −5.0/sqrt(170.0)), | //!< b0 b1 b2 b3 b4 b5 b6 b7 = 1 1 0 1 0 1 1 0 |
| complex(−15.0/sqrt(170.0), −7.0/sqrt(170.0)), | //!< b0 b1 b2 b3 b4 b5 b6 b7 = 1 1 0 1 0 1 1 1 |
| complex(−11.0/sqrt(170.0), −3.0/sqrt(170.0)), | //!< b0 b1 b2 b3 b4 b5 b6 b7 = 1 1 0 1 1 0 0 0 |
| complex(−11.0/sqrt(170.0), −1.0/sqrt(170.0)), | //!< b0 b1 b2 b3 b4 b5 b6 b7 = 1 1 0 1 1 0 0 1 |
| complex(−9.0/sqrt(170.0), −3.0/sqrt(170.0)), | //!< b0 b1 b2 b3 b4 b5 b6 b7 = 1 1 0 1 1 0 1 0 |
| complex(−9.0/sqrt(170.0), −1.0/sqrt(170.0)), | //!< b0 b1 b2 b3 b4 b5 b6 b7 = 1 1 0 1 1 0 1 1 |
| complex(−11.0/sqrt(170.0), −5.0/sqrt(170.0)), | //!< b0 b1 b2 b3 b4 b5 b6 b7 = 1 1 0 1 1 1 0 0 |
| complex(−11.0/sqrt(170.0), −7.0/sqrt(170.0)), | //!< b0 b1 b2 b3 b4 b5 b6 b7 = 1 1 0 1 1 1 0 1 |
| complex(−9.0/sqrt(170.0), −5.0/sqrt(170.0)), | //!< b0 b1 b2 b3 b4 b5 b6 b7 = 1 1 0 1 1 1 1 0 |
| complex(−9.0/sqrt(170.0), −7.0/sqrt(170.0)), | //!< b0 b1 b2 b3 b4 b5 b6 b7 = 1 1 0 1 1 1 1 1 |
| complex(−3.0/sqrt(170.0), −13.0/sqrt(170.0)), | //!< b0 b1 b2 b3 b4 b5 b6 b7 = 1 1 1 0 0 0 0 0 |
| complex(−3.0/sqrt(170.0), −15.0/sqrt(170.0)), | //!< b0 b1 b2 b3 b4 b5 b6 b7 = 1 1 1 0 0 0 0 1 |
| complex(−1.0/sqrt(170.0), −13.0/sqrt(170.0)), | //!< b0 b1 b2 b3 b4 b5 b6 b7 = 1 1 1 0 0 0 1 0 |
| complex(−1.0/sqrt(170.0), −15.0/sqrt(170.0)), | //!< b0 b1 b2 b3 b4 b5 b6 b7 = 1 1 1 0 0 0 1 1 |
| complex(−3.0/sqrt(170.0), −11.0/sqrt(170.0)), | //!< b0 b1 b2 b3 b4 b5 b6 b7 = 1 1 1 0 0 1 0 0 |
| complex(−3.0/sqrt(170.0), −9.0/sqrt(170.0)), | //!< b0 b1 b2 b3 b4 b5 b6 b7 = 1 1 1 0 0 1 0 1 |
| complex(−1.0/sqrt(170.0), −11.0/sqrt(170.0)), | //!< b0 b1 b2 b3 b4 b5 b6 b7 = 1 1 1 0 0 1 1 0 |
| complex(−1.0/sqrt(170.0), −9.0/sqrt(170.0)), | //!< b0 b1 b2 b3 b4 b5 b6 b7 = 1 1 1 0 0 1 1 1 |
| complex(−5.0/sqrt(170.0), −13.0/sqrt(170.0)), | //!< b0 b1 b2 b3 b4 b5 b6 b7 = 1 1 1 0 1 0 0 0 |
| complex(−5.0/sqrt(170.0), −15.0/sqrt(170.0)), | //!< b0 b1 b2 b3 b4 b5 b6 b7 = 1 1 1 0 1 0 0 1 |
| complex(−7.0/sqrt(170.0), −13.0/sqrt(170.0)), | //!< b0 b1 b2 b3 b4 b5 b6 b7 = 1 1 1 0 1 0 1 0 |
| complex(−7.0/sqrt(170.0), −15.0/sqrt(170.0)), | //!< b0 b1 b2 b3 b4 b5 b6 b7 = 1 1 1 0 1 0 1 1 |
| complex(−5.0/sqrt(170.0), −11.0/sqrt(170.0)), | //!< b0 b1 b2 b3 b4 b5 b6 b7 = 1 1 1 0 1 1 0 0 |
| complex(−5.0/sqrt(170.0), −9.0/sqrt(170.0)), | //!< b0 b1 b2 b3 b4 b5 b6 b7 = 1 1 1 0 1 1 0 1 |
| complex(−7.0/sqrt(170.0), −11.0/sqrt(170.0)), | //!< b0 b1 b2 b3 b4 b5 b6 b7 = 1 1 1 0 1 1 1 0 |
| complex(−7.0/sqrt(170.0), −9.0/sqrt(170.0)), | //!< b0 b1 b2 b3 b4 b5 b6 b7 = 1 1 1 0 1 1 1 1 |
| complex(−3.0/sqrt(170.0), −3.0/sqrt(170.0)), | //!< b0 b1 b2 b3 b4 b5 b6 b7 = 1 1 1 1 0 0 0 0 |
| complex(−3.0/sqrt(170.0), −1.0/sqrt(170.0)), | //!< b0 b1 b2 b3 b4 b5 b6 b7 = 1 1 1 1 0 0 0 1 |
| complex(−1.0/sqrt(170.0), −3.0/sqrt(170.0)), | //!< b0 b1 b2 b3 b4 b5 b6 b7 = 1 1 1 1 0 0 1 0 |
| complex(−1.0/sqrt(170.0), −1.0/sqrt(170.0)), | //!< b0 b1 b2 b3 b4 b5 b6 b7 = 1 1 1 1 0 0 1 1 |
| complex(−3.0/sqrt(170.0), −5.0/sqrt(170.0)), | //!< b0 b1 b2 b3 b4 b5 b6 b7 = 1 1 1 1 0 1 0 0 |
| complex(−3.0/sqrt(170.0), −7.0/sqrt(170.0)), | //!< b0 b1 b2 b3 b4 b5 b6 b7 = 1 1 1 1 0 1 0 1 |
| complex(−1.0/sqrt(170.0), −5.0/sqrt(170.0)), | //!< b0 b1 b2 b3 b4 b5 b6 b7 = 1 1 1 1 0 1 1 0 |
| complex(−1.0/sqrt(170.0), −7.0/sqrt(170.0)), | //!< b0 b1 b2 b3 b4 b5 b6 b7 = 1 1 1 1 0 1 1 1 |
| complex(−5.0/sqrt(170.0), −3.0/sqrt(170.0)), | //!< b0 b1 b2 b3 b4 b5 b6 b7 = 1 1 1 1 1 0 0 0 |
| complex(−5.0/sqrt(170.0), −1.0/sqrt(170.0)), | //!< b0 b1 b2 b3 b4 b5 b6 b7 = 1 1 1 1 1 0 0 1 |
| complex(−7.0/sqrt(170.0), −3.0/sqrt(170.0)), | //!< b0 b1 b2 b3 b4 b5 b6 b7 = 1 1 1 1 1 0 1 0 |
| complex(−7.0/sqrt(170.0), −1.0/sqrt(170.0)), | //!< b0 b1 b2 b3 b4 b5 b6 b7 = 1 1 1 1 1 0 1 1 |
| complex(−5.0/sqrt(170.0), −5.0/sqrt(170.0)), | //!< b0 b1 b2 b3 b4 b5 b6 b7 = 1 1 1 1 1 1 0 0 |
| complex(−5.0/sqrt(170.0), −7.0/sqrt(170.0)), | //!< b0 b1 b2 b3 b4 b5 b6 b7 = 1 1 1 1 1 1 0 1 |
| complex(−7.0/sqrt(170.0), −5.0/sqrt(170.0)), | //!< b0 b1 b2 b3 b4 b5 b6 b7 = 1 1 1 1 1 1 1 0 |
| complex(−7.0/sqrt(170.0), −7.0/sqrt(170.0)), | //!< b0 b1 b2 b3 b4 b5 b6 b7 = 1 1 1 1 1 1 1 1 |

FIG. 12 briefly shows a constellation point which is divided four quadrants as 00, 10, 11 and 01, respectively. After constellation points corresponding to 64QAM are arranged in a first quadrant denoted by 00, two bits [b0 b1] may be added to design constellation points having a length of 8 bits. Thereafter, the constellation points, in which [0 1], [1 0] and [1 1] are substituted for [b0 b1], may be designed by X-axis symmetry, Y-axis symmetry and origin symmetry of the constellation points of the first quadrant. Table 10 below shows one of 256QAM constellation points to which the design method described with reference to FIG. 12 is applied.

TABLE 10

| | |
|---|---|
| complex(+11.0/sqrt(170.0), +11.0/sqrt(170.0)), | //!< b0 b1 b2 b3 b4 b5 b6 b7 = 0 0 0 0 0 0 0 0 |
| complex(+11.0/sqrt(170.0), +9.0/sqrt(170.0)), | //!< b0 b1 b2 b3 b4 b5 b6 b7 = 0 0 0 0 0 0 0 1 |
| complex(+9.0/sqrt(170.0), +11.0/sqrt(170.0)), | //!< b0 b1 b2 b3 b4 b5 b6 b7 = 0 0 0 0 0 0 1 0 |

TABLE 10-continued

| | |
|---|---|
| complex(+9.0/sqrt(170.0), +9.0/sqrt(170.0)), | //!< b0 b1 b2 b3 b4 b5 b6 b7 = 0 0 0 0 0 0 1 1 |
| complex(+11.0/sqrt(170.0), +13.0/sqrt(170.0)), | //!< b0 b1 b2 b3 b4 b5 b6 b7 = 0 0 0 0 0 1 0 0 |
| complex(+11.0/sqrt(170.0), +15.0/sqrt(170.0)), | //!< b0 b1 b2 b3 b4 b5 b6 b7 = 0 0 0 0 0 1 0 1 |
| complex(+9.0/sqrt(170.0), +13.0/sqrt(170.0)), | //!< b0 b1 b2 b3 b4 b5 b6 b7 = 0 0 0 0 0 1 1 0 |
| complex(+9.0/sqrt(170.0), +15.0/sqrt(170.0)), | //!< b0 b1 b2 b3 b4 b5 b6 b7 = 0 0 0 0 0 1 1 1 |
| complex(+13.0/sqrt(170.0), +11.0/sqrt(170.0)), | //!< b0 b1 b2 b3 b4 b5 b6 b7 = 0 0 0 0 1 0 0 0 |
| complex(+13.0/sqrt(170.0), +9.0/sqrt(170.0)), | //!< b0 b1 b2 b3 b4 b5 b6 b7 = 0 0 0 0 1 0 0 1 |
| complex(+15.0/sqrt(170.0), +11.0/sqrt(170.0)), | //!< b0 b1 b2 b3 b4 b5 b6 b7 = 0 0 0 0 1 0 1 0 |
| complex(+15.0/sqrt(170.0), +9.0/sqrt(170.0)), | //!< b0 b1 b2 b3 b4 b5 b6 b7 = 0 0 0 0 1 0 1 1 |
| complex(+13.0/sqrt(170.0), +13.0/sqrt(170.0)), | //!< b0 b1 b2 b3 b4 b5 b6 b7 = 0 0 0 0 1 1 0 0 |
| complex(+13.0/sqrt(170.0), +15.0/sqrt(170.0)), | //!< b0 b1 b2 b3 b4 b5 b6 b7 = 0 0 0 0 1 1 0 1 |
| complex(+15.0/sqrt(170.0), +13.0/sqrt(170.0)), | //!< b0 b1 b2 b3 b4 b5 b6 b7 = 0 0 0 0 1 1 1 0 |
| complex(+15.0/sqrt(170.0), +15.0/sqrt(170.0)), | //!< b0 b1 b2 b3 b4 b5 b6 b7 = 0 0 0 0 1 1 1 1 |
| complex(+11.0/sqrt(170.0), +5.0/sqrt(170.0)), | //!< b0 b1 b2 b3 b4 b5 b6 b7 = 0 0 0 1 0 0 0 0 |
| complex(+11.0/sqrt(170.0), +7.0/sqrt(170.0)), | //!< b0 b1 b2 b3 b4 b5 b6 b7 = 0 0 0 1 0 0 0 1 |
| complex(+9.0/sqrt(170.0), +5.0/sqrt(170.0)), | //!< b0 b1 b2 b3 b4 b5 b6 b7 = 0 0 0 1 0 0 1 0 |
| complex(+9.0/sqrt(170.0), +7.0/sqrt(170.0)), | //!< b0 b1 b2 b3 b4 b5 b6 b7 = 0 0 0 1 0 0 1 1 |
| complex(+11.0/sqrt(170.0), +3.0/sqrt(170.0)), | //!< b0 b1 b2 b3 b4 b5 b6 b7 = 0 0 0 1 0 1 0 0 |
| complex(+11.0/sqrt(170.0), +1.0/sqrt(170.0)), | //!< b0 b1 b2 b3 b4 b5 b6 b7 = 0 0 0 1 0 1 0 1 |
| complex(+9.0/sqrt(170.0), +3.0/sqrt(170.0)), | //!< b0 b1 b2 b3 b4 b5 b6 b7 = 0 0 0 1 0 1 1 0 |
| complex(+9.0/sqrt(170.0), +1.0/sqrt(170.0)), | //!< b0 b1 b2 b3 b4 b5 b6 b7 = 0 0 0 1 0 1 1 1 |
| complex(+13.0/sqrt(170.0), +5.0/sqrt(170.0)), | //!< b0 b1 b2 b3 b4 b5 b6 b7 = 0 0 0 1 1 0 0 0 |
| complex(+13.0/sqrt(170.0), +7.0/sqrt(170.0)), | //!< b0 b1 b2 b3 b4 b5 b6 b7 = 0 0 0 1 1 0 0 1 |
| complex(+15.0/sqrt(170.0), +5.0/sqrt(170.0)), | //!< b0 b1 b2 b3 b4 b5 b6 b7 = 0 0 0 1 1 0 1 0 |
| complex(+15.0/sqrt(170.0), +7.0/sqrt(170.0)), | //!< b0 b1 b2 b3 b4 b5 b6 b7 = 0 0 0 1 1 0 1 1 |
| complex(+13.0/sqrt(170.0), +3.0/sqrt(170.0)), | //!< b0 b1 b2 b3 b4 b5 b6 b7 = 0 0 0 1 1 1 0 0 |
| complex(+13.0/sqrt(170.0), +1.0/sqrt(170.0)), | //!< b0 b1 b2 b3 b4 b5 b6 b7 = 0 0 0 1 1 1 0 1 |
| complex(+15.0/sqrt(170.0), +3.0/sqrt(170.0)), | //!< b0 b1 b2 b3 b4 b5 b6 b7 = 0 0 0 1 1 1 1 0 |
| complex(+15.0/sqrt(170.0), +1.0/sqrt(170.0)), | //!< b0 b1 b2 b3 b4 b5 b6 b7 = 0 0 0 1 1 1 1 1 |
| complex(+5.0/sqrt(170.0), +11.0/sqrt(170.0)), | //!< b0 b1 b2 b3 b4 b5 b6 b7 = 0 0 1 0 0 0 0 0 |
| complex(+5.0/sqrt(170.0), +9.0/sqrt(170.0)), | //!< b0 b1 b2 b3 b4 b5 b6 b7 = 0 0 1 0 0 0 0 1 |
| complex(+7.0/sqrt(170.0), +11.0/sqrt(170.0)), | //!< b0 b1 b2 b3 b4 b5 b6 b7 = 0 0 1 0 0 0 1 0 |
| complex(+7.0/sqrt(170.0), +9.0/sqrt(170.0)), | //!< b0 b1 b2 b3 b4 b5 b6 b7 = 0 0 1 0 0 0 1 1 |
| complex(+5.0/sqrt(170.0), +13.0/sqrt(170.0)), | //!< b0 b1 b2 b3 b4 b5 b6 b7 = 0 0 1 0 0 1 0 0 |
| complex(+5.0/sqrt(170.0), +15.0/sqrt(170.0)), | //!< b0 b1 b2 b3 b4 b5 b6 b7 = 0 0 1 0 0 1 0 1 |
| complex(+7.0/sqrt(170.0), +13.0/sqrt(170.0)), | //!< b0 b1 b2 b3 b4 b5 b6 b7 = 0 0 1 0 0 1 1 0 |
| complex(+7.0/sqrt(170.0), +15.0/sqrt(170.0)), | //!< b0 b1 b2 b3 b4 b5 b6 b7 = 0 0 1 0 0 1 1 1 |
| complex(+3.0/sqrt(170.0), +11.0/sqrt(170.0)), | //!< b0 b1 b2 b3 b4 b5 b6 b7 = 0 0 1 0 1 0 0 0 |
| complex(+3.0/sqrt(170.0), +9.0/sqrt(170.0)), | //!< b0 b1 b2 b3 b4 b5 b6 b7 = 0 0 1 0 1 0 0 1 |
| complex(+1.0/sqrt(170.0), +11.0/sqrt(170.0)), | //!< b0 b1 b2 b3 b4 b5 b6 b7 = 0 0 1 0 1 0 1 0 |
| complex(+1.0/sqrt(170.0), +9.0/sqrt(170.0)), | //!< b0 b1 b2 b3 b4 b5 b6 b7 = 0 0 1 0 1 0 1 1 |
| complex(+3.0/sqrt(170.0), +13.0/sqrt(170.0)), | //!< b0 b1 b2 b3 b4 b5 b6 b7 = 0 0 1 0 1 1 0 0 |
| complex(+3.0/sqrt(170.0), +15.0/sqrt(170.0)), | //!< b0 b1 b2 b3 b4 b5 b6 b7 = 0 0 1 0 1 1 0 1 |
| complex(+1.0/sqrt(170.0), +13.0/sqrt(170.0)), | //!< b0 b1 b2 b3 b4 b5 b6 b7 = 0 0 1 0 1 1 1 0 |
| complex(+1.0/sqrt(170.0), +15.0/sqrt(170.0)), | //!< b0 b1 b2 b3 b4 b5 b6 b7 = 0 0 1 0 1 1 1 1 |
| complex(+5.0/sqrt(170.0), +5.0/sqrt(170.0)), | //!< b0 b1 b2 b3 b4 b5 b6 b7 = 0 0 1 1 0 0 0 0 |
| complex(+5.0/sqrt(170.0), +7.0/sqrt(170.0)), | //!< b0 b1 b2 b3 b4 b5 b6 b7 = 0 0 1 1 0 0 0 1 |
| complex(+7.0/sqrt(170.0), +5.0/sqrt(170.0)), | //!< b0 b1 b2 b3 b4 b5 b6 b7 = 0 0 1 1 0 0 1 0 |
| complex(+7.0/sqrt(170.0), +7.0/sqrt(170.0)), | //!< b0 b1 b2 b3 b4 b5 b6 b7 = 0 0 1 1 0 0 1 1 |
| complex(+5.0/sqrt(170.0), +3.0/sqrt(170.0)), | //!< b0 b1 b2 b3 b4 b5 b6 b7 = 0 0 1 1 0 1 0 0 |
| complex(+5.0/sqrt(170.0), +1.0/sqrt(170.0)), | //!< b0 b1 b2 b3 b4 b5 b6 b7 = 0 0 1 1 0 1 0 1 |
| complex(+7.0/sqrt(170.0), +3.0/sqrt(170.0)), | //!< b0 b1 b2 b3 b4 b5 b6 b7 = 0 0 1 1 0 1 1 0 |
| complex(+7.0/sqrt(170.0), +1.0/sqrt(170.0)), | //!< b0 b1 b2 b3 b4 b5 b6 b7 = 0 0 1 1 0 1 1 1 |
| complex(+3.0/sqrt(170.0), +5.0/sqrt(170.0)), | //!< b0 b1 b2 b3 b4 b5 b6 b7 = 0 0 1 1 1 0 0 0 |
| complex(+3.0/sqrt(170.0), +7.0/sqrt(170.0)), | //!< b0 b1 b2 b3 b4 b5 b6 b7 = 0 0 1 1 1 0 0 1 |
| complex(+1.0/sqrt(170.0), +5.0/sqrt(170.0)), | //!< b0 b1 b2 b3 b4 b5 b6 b7 = 0 0 1 1 1 0 1 0 |
| complex(+1.0/sqrt(170.0), +7.0/sqrt(170.0)), | //!< b0 b1 b2 b3 b4 b5 b6 b7 = 0 0 1 1 1 0 1 1 |
| complex(+3.0/sqrt(170.0), +3.0/sqrt(170.0)), | //!< b0 b1 b2 b3 b4 b5 b6 b7 = 0 0 1 1 1 1 0 0 |
| complex(+3.0/sqrt(170.0), +1.0/sqrt(170.0)), | //!< b0 b1 b2 b3 b4 b5 b6 b7 = 0 0 1 1 1 1 0 1 |
| complex(+1.0/sqrt(170.0), +3.0/sqrt(170.0)), | //!< b0 b1 b2 b3 b4 b5 b6 b7 = 0 0 1 1 1 1 1 0 |
| complex(+1.0/sqrt(170.0), +1.0/sqrt(170.0)), | //!< b0 b1 b2 b3 b4 b5 b6 b7 = 0 0 1 1 1 1 1 1 |
| complex(+11.0/sqrt(170.0), −11.0/sqrt(170.0)), | //!< b0 b1 b2 b3 b4 b5 b6 b7 = 0 1 0 0 0 0 0 0 |
| complex(+11.0/sqrt(170.0), −9.0/sqrt(170.0)), | //!< b0 b1 b2 b3 b4 b5 b6 b7 = 0 1 0 0 0 0 0 1 |
| complex(+9.0/sqrt(170.0), −11.0/sqrt(170.0)), | //!< b0 b1 b2 b3 b4 b5 b6 b7 = 0 1 0 0 0 0 1 0 |
| complex(+9.0/sqrt(170.0), −9.0/sqrt(170.0)), | //!< b0 b1 b2 b3 b4 b5 b6 b7 = 0 1 0 0 0 0 1 1 |
| complex(+11.0/sqrt(170.0), −13.0/sqrt(170.0)), | //!< b0 b1 b2 b3 b4 b5 b6 b7 = 0 1 0 0 0 1 0 0 |
| complex(+11.0/sqrt(170.0), −15.0/sqrt(170.0)), | //!< b0 b1 b2 b3 b4 b5 b6 b7 = 0 1 0 0 0 1 0 1 |
| complex(+9.0/sqrt(170.0), −13.0/sqrt(170.0)), | //!< b0 b1 b2 b3 b4 b5 b6 b7 = 0 1 0 0 0 1 1 0 |
| complex(+9.0/sqrt(170.0), −15.0/sqrt(170.0)), | //!< b0 b1 b2 b3 b4 b5 b6 b7 = 0 1 0 0 0 1 1 1 |
| complex(+13.0/sqrt(170.0), −11.0/sqrt(170.0)), | //!< b0 b1 b2 b3 b4 b5 b6 b7 = 0 1 0 0 1 0 0 0 |
| complex(+13.0/sqrt(170.0), −9.0/sqrt(170.0)), | //!< b0 b1 b2 b3 b4 b5 b6 b7 = 0 1 0 0 1 0 0 1 |
| complex(+15.0/sqrt(170.0), −11.0/sqrt(170.0)), | //!< b0 b1 b2 b3 b4 b5 b6 b7 = 0 1 0 0 1 0 1 0 |
| complex(+15.0/sqrt(170.0), −9.0/sqrt(170.0)), | //!< b0 b1 b2 b3 b4 b5 b6 b7 = 0 1 0 0 1 0 1 1 |
| complex(+13.0/sqrt(170.0), −13.0/sqrt(170.0)), | //!< b0 b1 b2 b3 b4 b5 b6 b7 = 0 1 0 0 1 1 0 0 |
| complex(+13.0/sqrt(170.0), −15.0/sqrt(170.0)), | //!< b0 b1 b2 b3 b4 b5 b6 b7 = 0 1 0 0 1 1 0 1 |
| complex(+15.0/sqrt(170.0), −13.0/sqrt(170.0)), | //!< b0 b1 b2 b3 b4 b5 b6 b7 = 0 1 0 0 1 1 1 0 |
| complex(+15.0/sqrt(170.0), −15.0/sqrt(170.0)), | //!< b0 b1 b2 b3 b4 b5 b6 b7 = 0 1 0 0 1 1 1 1 |
| complex(+11.0/sqrt(170.0), −5.0/sqrt(170.0)), | //!< b0 b1 b2 b3 b4 b5 b6 b7 = 0 1 0 1 0 0 0 0 |
| complex(+11.0/sqrt(170.0), −7.0/sqrt(170.0)), | //!< b0 b1 b2 b3 b4 b5 b6 b7 = 0 1 0 1 0 0 0 1 |
| complex(+9.0/sqrt(170.0), −5.0/sqrt(170.0)), | //!< b0 b1 b2 b3 b4 b5 b6 b7 = 0 1 0 1 0 0 1 0 |

TABLE 10-continued

| | |
|---|---|
| complex(+9.0/sqrt(170.0), −7.0/sqrt(170.0)), | //!< b0 b1 b2 b3 b4 b5 b6 b7 = 0 1 0 1 0 0 1 1 |
| complex(+11.0/sqrt(170.0), −3.0/sqrt(170.0)), | //!< b0 b1 b2 b3 b4 b5 b6 b7 = 0 1 0 1 0 1 0 0 |
| complex(+11.0/sqrt(170.0), −1.0/sqrt(170.0)), | //!< b0 b1 b2 b3 b4 b5 b6 b7 = 0 1 0 1 0 1 0 1 |
| complex(+9.0/sqrt(170.0), −3.0/sqrt(170.0)), | //!< b0 b1 b2 b3 b4 b5 b6 b7 = 0 1 0 1 0 1 1 0 |
| complex(+9.0/sqrt(170.0), −1.0/sqrt(170.0)), | //!< b0 b1 b2 b3 b4 b5 b6 b7 = 0 1 0 1 0 1 1 1 |
| complex(+13.0/sqrt(170.0), −5.0/sqrt(170.0)), | //!< b0 b1 b2 b3 b4 b5 b6 b7 = 0 1 0 1 1 0 0 0 |
| complex(+13.0/sqrt(170.0), −7.0/sqrt(170.0)), | //!< b0 b1 b2 b3 b4 b5 b6 b7 = 0 1 0 1 1 0 0 1 |
| complex(+15.0/sqrt(170.0), −5.0/sqrt(170.0)), | //!< b0 b1 b2 b3 b4 b5 b6 b7 = 0 1 0 1 1 0 1 0 |
| complex(+15.0/sqrt(170.0), −7.0/sqrt(170.0)), | //!< b0 b1 b2 b3 b4 b5 b6 b7 = 0 1 0 1 1 0 1 1 |
| complex(+13.0/sqrt(170.0), −3.0/sqrt(170.0)), | //!< b0 b1 b2 b3 b4 b5 b6 b7 = 0 1 0 1 1 1 0 0 |
| complex(+13.0/sqrt(170.0), −1.0/sqrt(170.0)), | //!< b0 b1 b2 b3 b4 b5 b6 b7 = 0 1 0 1 1 1 0 1 |
| complex(+15.0/sqrt(170.0), −3.0/sqrt(170.0)), | //!< b0 b1 b2 b3 b4 b5 b6 b7 = 0 1 0 1 1 1 1 0 |
| complex(+15.0/sqrt(170.0), −1.0/sqrt(170.0)), | //!< b0 b1 b2 b3 b4 b5 b6 b7 = 0 1 0 1 1 1 1 1 |
| complex(+5.0/sqrt(170.0), −11.0/sqrt(170.0)), | //!< b0 b1 b2 b3 b4 b5 b6 b7 = 0 1 1 0 0 0 0 0 |
| complex(+5.0/sqrt(170.0), −9.0/sqrt(170.0)), | //!< b0 b1 b2 b3 b4 b5 b6 b7 = 0 1 1 0 0 0 0 1 |
| complex(+7.0/sqrt(170.0), −11.0/sqrt(170.0)), | //!< b0 b1 b2 b3 b4 b5 b6 b7 = 0 1 1 0 0 0 1 0 |
| complex(+7.0/sqrt(170.0), −9.0/sqrt(170.0)), | //!< b0 b1 b2 b3 b4 b5 b6 b7 = 0 1 1 0 0 0 1 1 |
| complex(+5.0/sqrt(170.0), −13.0/sqrt(170.0)), | //!< b0 b1 b2 b3 b4 b5 b6 b7 = 0 1 1 0 0 1 0 0 |
| complex(+5.0/sqrt(170.0), −15.0/sqrt(170.0)), | //!< b0 b1 b2 b3 b4 b5 b6 b7 = 0 1 1 0 0 1 0 1 |
| complex(+7.0/sqrt(170.0), −13.0/sqrt(170.0)), | //!< b0 b1 b2 b3 b4 b5 b6 b7 = 0 1 1 0 0 1 1 0 |
| complex(+7.0/sqrt(170.0), −15.0/sqrt(170.0)), | //!< b0 b1 b2 b3 b4 b5 b6 b7 = 0 1 1 0 0 1 1 1 |
| complex(+3.0/sqrt(170.0), −11.0/sqrt(170.0)), | //!< b0 b1 b2 b3 b4 b5 b6 b7 = 0 1 1 0 1 0 0 0 |
| complex(+3.0/sqrt(170.0), −9.0/sqrt(170.0)), | //!< b0 b1 b2 b3 b4 b5 b6 b7 = 0 1 1 0 1 0 0 1 |
| complex(+1.0/sqrt(170.0), −11.0/sqrt(170.0)), | //!< b0 b1 b2 b3 b4 b5 b6 b7 = 0 1 1 0 1 0 1 0 |
| complex(+1.0/sqrt(170.0), −9.0/sqrt(170.0)), | //!< b0 b1 b2 b3 b4 b5 b6 b7 = 0 1 1 0 1 0 1 1 |
| complex(+3.0/sqrt(170.0), −13.0/sqrt(170.0)), | //!< b0 b1 b2 b3 b4 b5 b6 b7 = 0 1 1 0 1 1 0 0 |
| complex(+3.0/sqrt(170.0), −15.0/sqrt(170.0)), | //!< b0 b1 b2 b3 b4 b5 b6 b7 = 0 1 1 0 1 1 0 1 |
| complex(+1.0/sqrt(170.0), −13.0/sqrt(170.0)), | //!< b0 b1 b2 b3 b4 b5 b6 b7 = 0 1 1 0 1 1 1 0 |
| complex(+1.0/sqrt(170.0), −15.0/sqrt(170.0)), | //!< b0 b1 b2 b3 b4 b5 b6 b7 = 0 1 1 0 1 1 1 1 |
| complex(+5.0/sqrt(170.0), −5.0/sqrt(170.0)), | //!< b0 b1 b2 b3 b4 b5 b6 b7 = 0 1 1 1 0 0 0 0 |
| complex(+5.0/sqrt(170.0), −7.0/sqrt(170.0)), | //!< b0 b1 b2 b3 b4 b5 b6 b7 = 0 1 1 1 0 0 0 1 |
| complex(+7.0/sqrt(170.0), −5.0/sqrt(170.0)), | //!< b0 b1 b2 b3 b4 b5 b6 b7 = 0 1 1 1 0 0 1 0 |
| complex(+7.0/sqrt(170.0), −7.0/sqrt(170.0)), | //!< b0 b1 b2 b3 b4 b5 b6 b7 = 0 1 1 1 0 0 1 1 |
| complex(+5.0/sqrt(170.0), −3.0/sqrt(170.0)), | //!< b0 b1 b2 b3 b4 b5 b6 b7 = 0 1 1 1 0 1 0 0 |
| complex(+5.0/sqrt(170.0), −1.0/sqrt(170.0)), | //!< b0 b1 b2 b3 b4 b5 b6 b7 = 0 1 1 1 0 1 0 1 |
| complex(+7.0/sqrt(170.0), −3.0/sqrt(170.0)), | //!< b0 b1 b2 b3 b4 b5 b6 b7 = 0 1 1 1 0 1 1 0 |
| complex(+7.0/sqrt(170.0), −1.0/sqrt(170.0)), | //!< b0 b1 b2 b3 b4 b5 b6 b7 = 0 1 1 1 0 1 1 1 |
| complex(+3.0/sqrt(170.0), −5.0/sqrt(170.0)), | //!< b0 b1 b2 b3 b4 b5 b6 b7 = 0 1 1 1 1 0 0 0 |
| complex(+3.0/sqrt(170.0), −7.0/sqrt(170.0)), | //!< b0 b1 b2 b3 b4 b5 b6 b7 = 0 1 1 1 1 0 0 1 |
| complex(+1.0/sqrt(170.0), −5.0/sqrt(170.0)), | //!< b0 b1 b2 b3 b4 b5 b6 b7 = 0 1 1 1 1 0 1 0 |
| complex(+1.0/sqrt(170.0), −7.0/sqrt(170.0)), | //!< b0 b1 b2 b3 b4 b5 b6 b7 = 0 1 1 1 1 0 1 1 |
| complex(+3.0/sqrt(170.0), −3.0/sqrt(170.0)), | //!< b0 b1 b2 b3 b4 b5 b6 b7 = 0 1 1 1 1 1 0 0 |
| complex(+3.0/sqrt(170.0), −1.0/sqrt(170.0)), | //!< b0 b1 b2 b3 b4 b5 b6 b7 = 0 1 1 1 1 1 0 1 |
| complex(+1.0/sqrt(170.0), −3.0/sqrt(170.0)), | //!< b0 b1 b2 b3 b4 b5 b6 b7 = 0 1 1 1 1 1 1 0 |
| complex(+1.0/sqrt(170.0), −1.0/sqrt(170.0)), | //!< b0 b1 b2 b3 b4 b5 b6 b7 = 0 1 1 1 1 1 1 1 |
| complex(−11.0/sqrt(170.0), +11.0/sqrt(170.0)), | //!< b0 b1 b2 b3 b4 b5 b6 b7 = 1 0 0 0 0 0 0 0 |
| complex(−11.0/sqrt(170.0), +9.0/sqrt(170.0)), | //!< b0 b1 b2 b3 b4 b5 b6 b7 = 1 0 0 0 0 0 0 1 |
| complex(−9.0/sqrt(170.0), +11.0/sqrt(170.0)), | //!< b0 b1 b2 b3 b4 b5 b6 b7 = 1 0 0 0 0 0 1 0 |
| complex(−9.0/sqrt(170.0), +9.0/sqrt(170.0)), | //!< b0 b1 b2 b3 b4 b5 b6 b7 = 1 0 0 0 0 0 1 1 |
| complex(−11.0/sqrt(170.0), +13.0/sqrt(170.0)), | //!< b0 b1 b2 b3 b4 b5 b6 b7 = 1 0 0 0 0 1 0 0 |
| complex(−11.0/sqrt(170.0), +15.0/sqrt(170.0)), | //!< b0 b1 b2 b3 b4 b5 b6 b7 = 1 0 0 0 0 1 0 1 |
| complex(−9.0/sqrt(170.0), +13.0/sqrt(170.0)), | //!< b0 b1 b2 b3 b4 b5 b6 b7 = 1 0 0 0 0 1 1 0 |
| complex(−9.0/sqrt(170.0), +15.0/sqrt(170.0)), | //!< b0 b1 b2 b3 b4 b5 b6 b7 = 1 0 0 0 0 1 1 1 |
| complex(−13.0/sqrt(170.0), +11.0/sqrt(170.0)), | //!< b0 b1 b2 b3 b4 b5 b6 b7 = 1 0 0 0 1 0 0 0 |
| complex(−13.0/sqrt(170.0), +9.0/sqrt(170.0)), | //!< b0 b1 b2 b3 b4 b5 b6 b7 = 1 0 0 0 1 0 0 1 |
| complex(−15.0/sqrt(170.0), +11.0/sqrt(170.0)), | //!< b0 b1 b2 b3 b4 b5 b6 b7 = 1 0 0 0 1 0 1 0 |
| complex(−15.0/sqrt(170.0), +9.0/sqrt(170.0)), | //!< b0 b1 b2 b3 b4 b5 b6 b7 = 1 0 0 0 1 0 1 1 |
| complex(−13.0/sqrt(170.0), +13.0/sqrt(170.0)), | //!< b0 b1 b2 b3 b4 b5 b6 b7 = 1 0 0 0 1 1 0 0 |
| complex(−13.0/sqrt(170.0), +15.0/sqrt(170.0)), | //!< b0 b1 b2 b3 b4 b5 b6 b7 = 1 0 0 0 1 1 0 1 |
| complex(−15.0/sqrt(170.0), +13.0/sqrt(170.0)), | //!< b0 b1 b2 b3 b4 b5 b6 b7 = 1 0 0 0 1 1 1 0 |
| complex(−15.0/sqrt(170.0), +15.0/sqrt(170.0)), | //!< b0 b1 b2 b3 b4 b5 b6 b7 = 1 0 0 0 1 1 1 1 |
| complex(−11.0/sqrt(170.0), +5.0/sqrt(170.0)), | //!< b0 b1 b2 b3 b4 b5 b6 b7 = 1 0 0 1 0 0 0 0 |
| complex(−11.0/sqrt(170.0), +7.0/sqrt(170.0)), | //!< b0 b1 b2 b3 b4 b5 b6 b7 = 1 0 0 1 0 0 0 1 |
| complex(−9.0/sqrt(170.0), +5.0/sqrt(170.0)), | //!< b0 b1 b2 b3 b4 b5 b6 b7 = 1 0 0 1 0 0 1 0 |
| complex(−9.0/sqrt(170.0), +7.0/sqrt(170.0)), | //!< b0 b1 b2 b3 b4 b5 b6 b7 = 1 0 0 1 0 0 1 1 |
| complex(−11.0/sqrt(170.0), +3.0/sqrt(170.0)), | //!< b0 b1 b2 b3 b4 b5 b6 b7 = 1 0 0 1 0 1 0 0 |
| complex(−11.0/sqrt(170.0), +1.0/sqrt(170.0)), | //!< b0 b1 b2 b3 b4 b5 b6 b7 = 1 0 0 1 0 1 0 1 |
| complex(−9.0/sqrt(170.0), +3.0/sqrt(170.0)), | //!< b0 b1 b2 b3 b4 b5 b6 b7 = 1 0 0 1 0 1 1 0 |
| complex(−9.0/sqrt(170.0), +1.0/sqrt(170.0)), | //!< b0 b1 b2 b3 b4 b5 b6 b7 = 1 0 0 1 0 1 1 1 |
| complex(−13.0/sqrt(170.0), +5.0/sqrt(170.0)), | //!< b0 b1 b2 b3 b4 b5 b6 b7 = 1 0 0 1 1 0 0 0 |
| complex(−13.0/sqrt(170.0), +7.0/sqrt(170.0)), | //!< b0 b1 b2 b3 b4 b5 b6 b7 = 1 0 0 1 1 0 0 1 |
| complex(−15.0/sqrt(170.0), +5.0/sqrt(170.0)), | //!< b0 b1 b2 b3 b4 b5 b6 b7 = 1 0 0 1 1 0 1 0 |
| complex(−15.0/sqrt(170.0), +7.0/sqrt(170.0)), | //!< b0 b1 b2 b3 b4 b5 b6 b7 = 1 0 0 1 1 0 1 1 |
| complex(−13.0/sqrt(170.0), +3.0/sqrt(170.0)), | //!< b0 b1 b2 b3 b4 b5 b6 b7 = 1 0 0 1 1 1 0 0 |
| complex(−13.0/sqrt(170.0), +1.0/sqrt(170.0)), | //!< b0 b1 b2 b3 b4 b5 b6 b7 = 1 0 0 1 1 1 0 1 |
| complex(−15.0/sqrt(170.0), +3.0/sqrt(170.0)), | //!< b0 b1 b2 b3 b4 b5 b6 b7 = 1 0 0 1 1 1 1 0 |
| complex(−15.0/sqrt(170.0), +1.0/sqrt(170.0)), | //!< b0 b1 b2 b3 b4 b5 b6 b7 = 1 0 0 1 1 1 1 1 |
| complex(−5.0/sqrt(170.0), +11.0/sqrt(170.0)), | //!< b0 b1 b2 b3 b4 b5 b6 b7 = 1 0 1 0 0 0 0 0 |
| complex(−5.0/sqrt(170.0), +9.0/sqrt(170.0)), | //!< b0 b1 b2 b3 b4 b5 b6 b7 = 1 0 1 0 0 0 0 1 |
| complex(−7.0/sqrt(170.0), +11.0/sqrt(170.0)), | //!< b0 b1 b2 b3 b4 b5 b6 b7 = 1 0 1 0 0 0 1 0 |

TABLE 10-continued

| | |
|---|---|
| complex(−7.0/sqrt(170.0), +9.0/sqrt(170.0)), | //!< b0 b1 b2 b3 b4 b5 b6 b7 = 1 0 1 0 0 0 1 1 |
| complex(−5.0/sqrt(170.0), +13.0/sqrt(170.0)), | //!< b0 b1 b2 b3 b4 b5 b6 b7 = 1 0 1 0 0 1 0 0 |
| complex(−5.0/sqrt(170.0), +15.0/sqrt(170.0)), | //!< b0 b1 b2 b3 b4 b5 b6 b7 = 1 0 1 0 0 1 0 1 |
| complex(−7.0/sqrt(170.0), +13.0/sqrt(170.0)), | //!< b0 b1 b2 b3 b4 b5 b6 b7 = 1 0 1 0 0 1 1 0 |
| complex(−7.0/sqrt(170.0), +15.0/sqrt(170.0)), | //!< b0 b1 b2 b3 b4 b5 b6 b7 = 1 0 1 0 0 1 1 1 |
| complex(−3.0/sqrt(170.0), +11.0/sqrt(170.0)), | //!< b0 b1 b2 b3 b4 b5 b6 b7 = 1 0 1 0 1 0 0 0 |
| complex(−3.0/sqrt(170.0), +9.0/sqrt(170.0)), | //!< b0 b1 b2 b3 b4 b5 b6 b7 = 1 0 1 0 1 0 0 1 |
| complex(−1.0/sqrt(170.0), +11.0/sqrt(170.0)), | //!< b0 b1 b2 b3 b4 b5 b6 b7 = 1 0 1 0 1 0 1 0 |
| complex(−1.0/sqrt(170.0), +9.0/sqrt(170.0)), | //!< b0 b1 b2 b3 b4 b5 b6 b7 = 1 0 1 0 1 0 1 1 |
| complex(−3.0/sqrt(170.0), +13.0/sqrt(170.0)), | //!< b0 b1 b2 b3 b4 b5 b6 b7 = 1 0 1 0 1 1 0 0 |
| complex(−3.0/sqrt(170.0), +15.0/sqrt(170.0)), | //!< b0 b1 b2 b3 b4 b5 b6 b7 = 1 0 1 0 1 1 0 1 |
| complex(−1.0/sqrt(170.0), +13.0/sqrt(170.0)), | //!< b0 b1 b2 b3 b4 b5 b6 b7 = 1 0 1 0 1 1 1 0 |
| complex(−1.0/sqrt(170.0), +15.0/sqrt(170.0)), | //!< b0 b1 b2 b3 b4 b5 b6 b7 = 1 0 1 0 1 1 1 1 |
| complex(−5.0/sqrt(170.0), +5.0/sqrt(170.0)), | //!< b0 b1 b2 b3 b4 b5 b6 b7 = 1 0 1 1 0 0 0 0 |
| complex(−5.0/sqrt(170.0), +7.0/sqrt(170.0)), | //!< b0 b1 b2 b3 b4 b5 b6 b7 = 1 0 1 1 0 0 0 1 |
| complex(−7.0/sqrt(170.0), +5.0/sqrt(170.0)), | //!< b0 b1 b2 b3 b4 b5 b6 b7 = 1 0 1 1 0 0 1 0 |
| complex(−7.0/sqrt(170.0), +7.0/sqrt(170.0)), | //!< b0 b1 b2 b3 b4 b5 b6 b7 = 1 0 1 1 0 0 1 1 |
| complex(−5.0/sqrt(170.0), +3.0/sqrt(170.0)), | //!< b0 b1 b2 b3 b4 b5 b6 b7 = 1 0 1 1 0 1 0 0 |
| complex(−5.0/sqrt(170.0), +1.0/sqrt(170.0)), | //!< b0 b1 b2 b3 b4 b5 b6 b7 = 1 0 1 1 0 1 0 1 |
| complex(−7.0/sqrt(170.0), +3.0/sqrt(170.0)), | //!< b0 b1 b2 b3 b4 b5 b6 b7 = 1 0 1 1 0 1 1 0 |
| complex(−7.0/sqrt(170.0), +1.0/sqrt(170.0)), | //!< b0 b1 b2 b3 b4 b5 b6 b7 = 1 0 1 1 0 1 1 1 |
| complex(−3.0/sqrt(170.0), +5.0/sqrt(170.0)), | //!< b0 b1 b2 b3 b4 b5 b6 b7 = 1 0 1 1 1 0 0 0 |
| complex(−3.0/sqrt(170.0), +7.0/sqrt(170.0)), | //!< b0 b1 b2 b3 b4 b5 b6 b7 = 1 0 1 1 1 0 0 1 |
| complex(−1.0/sqrt(170.0), +5.0/sqrt(170.0)), | //!< b0 b1 b2 b3 b4 b5 b6 b7 = 1 0 1 1 1 0 1 0 |
| complex(−1.0/sqrt(170.0), +7.0/sqrt(170.0)), | //!< b0 b1 b2 b3 b4 b5 b6 b7 = 1 0 1 1 1 0 1 1 |
| complex(−3.0/sqrt(170.0), +3.0/sqrt(170.0)), | //!< b0 b1 b2 b3 b4 b5 b6 b7 = 1 0 1 1 1 1 0 0 |
| complex(−3.0/sqrt(170.0), +1.0/sqrt(170.0)), | //!< b0 b1 b2 b3 b4 b5 b6 b7 = 1 0 1 1 1 1 0 1 |
| complex(−1.0/sqrt(170.0), +3.0/sqrt(170.0)), | //!< b0 b1 b2 b3 b4 b5 b6 b7 = 1 0 1 1 1 1 1 0 |
| complex(−1.0/sqrt(170.0), +1.0/sqrt(170.0)), | //!< b0 b1 b2 b3 b4 b5 b6 b7 = 1 0 1 1 1 1 1 1 |
| complex(−11.0/sqrt(170.0), −11.0/sqrt(170.0)), | //!< b0 b1 b2 b3 b4 b5 b6 b7 = 1 1 0 0 0 0 0 0 |
| complex(−11.0/sqrt(170.0), −9.0/sqrt(170.0)), | //!< b0 b1 b2 b3 b4 b5 b6 b7 = 1 1 0 0 0 0 0 1 |
| complex(−9.0/sqrt(170.0), −11.0/sqrt(170.0)), | //!< b0 b1 b2 b3 b4 b5 b6 b7 = 1 1 0 0 0 0 1 0 |
| complex(−9.0/sqrt(170.0), −9.0/sqrt(170.0)), | //!< b0 b1 b2 b3 b4 b5 b6 b7 = 1 1 0 0 0 0 1 1 |
| complex(−11.0/sqrt(170.0), −13.0/sqrt(170.0)), | //!< b0 b1 b2 b3 b4 b5 b6 b7 = 1 1 0 0 0 1 0 0 |
| complex(−11.0/sqrt(170.0), −15.0/sqrt(170.0)), | //!< b0 b1 b2 b3 b4 b5 b6 b7 = 1 1 0 0 0 1 0 1 |
| complex(−9.0/sqrt(170.0), −13.0/sqrt(170.0)), | //!< b0 b1 b2 b3 b4 b5 b6 b7 = 1 1 0 0 0 1 1 0 |
| complex(−9.0/sqrt(170.0), −15.0/sqrt(170.0)), | //!< b0 b1 b2 b3 b4 b5 b6 b7 = 1 1 0 0 0 1 1 1 |
| complex(−13.0/sqrt(170.0), −11.0/sqrt(170.0)), | //!< b0 b1 b2 b3 b4 b5 b6 b7 = 1 1 0 0 1 0 0 0 |
| complex(−13.0/sqrt(170.0), −9.0/sqrt(170.0)), | //!< b0 b1 b2 b3 b4 b5 b6 b7 = 1 1 0 0 1 0 0 1 |
| complex(−15.0/sqrt(170.0), −11.0/sqrt(170.0)), | //!< b0 b1 b2 b3 b4 b5 b6 b7 = 1 1 0 0 1 0 1 0 |
| complex(−15.0/sqrt(170.0), −9.0/sqrt(170.0)), | //!< b0 b1 b2 b3 b4 b5 b6 b7 = 1 1 0 0 1 0 1 1 |
| complex(−13.0/sqrt(170.0), −13.0/sqrt(170.0)), | //!< b0 b1 b2 b3 b4 b5 b6 b7 = 1 1 0 0 1 1 0 0 |
| complex(−13.0/sqrt(170.0), −15.0/sqrt(170.0)), | //!< b0 b1 b2 b3 b4 b5 b6 b7 = 1 1 0 0 1 1 0 1 |
| complex(−15.0/sqrt(170.0), −13.0/sqrt(170.0)), | //!< b0 b1 b2 b3 b4 b5 b6 b7 = 1 1 0 0 1 1 1 0 |
| complex(−15.0/sqrt(170.0), −15.0/sqrt(170.0)), | //!< b0 b1 b2 b3 b4 b5 b6 b7 = 1 1 0 0 1 1 1 1 |
| complex(−11.0/sqrt(170.0), −5.0/sqrt(170.0)), | //!< b0 b1 b2 b3 b4 b5 b6 b7 = 1 1 0 1 0 0 0 0 |
| complex(−11.0/sqrt(170.0), −7.0/sqrt(170.0)), | //!< b0 b1 b2 b3 b4 b5 b6 b7 = 1 1 0 1 0 0 0 1 |
| complex(−9.0/sqrt(170.0), −5.0/sqrt(170.0)), | //!< b0 b1 b2 b3 b4 b5 b6 b7 = 1 1 0 1 0 0 1 0 |
| complex(−9.0/sqrt(170.0), −7.0/sqrt(170.0)), | //!< b0 b1 b2 b3 b4 b5 b6 b7 = 1 1 0 1 0 0 1 1 |
| complex(−11.0/sqrt(170.0), −3.0/sqrt(170.0)), | //!< b0 b1 b2 b3 b4 b5 b6 b7 = 1 1 0 1 0 1 0 0 |
| complex(−11.0/sqrt(170.0), −1.0/sqrt(170.0)), | //!< b0 b1 b2 b3 b4 b5 b6 b7 = 1 1 0 1 0 1 0 1 |
| complex(−9.0/sqrt(170.0), −3.0/sqrt(170.0)), | //!< b0 b1 b2 b3 b4 b5 b6 b7 = 1 1 0 1 0 1 1 0 |
| complex(−9.0/sqrt(170.0), −1.0/sqrt(170.0)), | //!< b0 b1 b2 b3 b4 b5 b6 b7 = 1 1 0 1 0 1 1 1 |
| complex(−13.0/sqrt(170.0), −5.0/sqrt(170.0)), | //!< b0 b1 b2 b3 b4 b5 b6 b7 = 1 1 0 1 1 0 0 0 |
| complex(−13.0/sqrt(170.0), −7.0/sqrt(170.0)), | //!< b0 b1 b2 b3 b4 b5 b6 b7 = 1 1 0 1 1 0 0 1 |
| complex(−15.0/sqrt(170.0), −5.0/sqrt(170.0)), | //!< b0 b1 b2 b3 b4 b5 b6 b7 = 1 1 0 1 1 0 1 0 |
| complex(−15.0/sqrt(170.0), −7.0/sqrt(170.0)), | //!< b0 b1 b2 b3 b4 b5 b6 b7 = 1 1 0 1 1 0 1 1 |
| complex(−13.0/sqrt(170.0), −3.0/sqrt(170.0)), | //!< b0 b1 b2 b3 b4 b5 b6 b7 = 1 1 0 1 1 1 0 0 |
| complex(−13.0/sqrt(170.0), −1.0/sqrt(170.0)), | //!< b0 b1 b2 b3 b4 b5 b6 b7 = 1 1 0 1 1 1 0 1 |
| complex(−15.0/sqrt(170.0), −3.0/sqrt(170.0)), | //!< b0 b1 b2 b3 b4 b5 b6 b7 = 1 1 0 1 1 1 1 0 |
| complex(−15.0/sqrt(170.0), −1.0/sqrt(170.0)), | //!< b0 b1 b2 b3 b4 b5 b6 b7 = 1 1 0 1 1 1 1 1 |
| complex(−5.0/sqrt(170.0), −11.0/sqrt(170.0)), | //!< b0 b1 b2 b3 b4 b5 b6 b7 = 1 1 1 0 0 0 0 0 |
| complex(−5.0/sqrt(170.0), −9.0/sqrt(170.0)), | //!< b0 b1 b2 b3 b4 b5 b6 b7 = 1 1 1 0 0 0 0 1 |
| complex(−7.0/sqrt(170.0), −11.0/sqrt(170.0)), | //!< b0 b1 b2 b3 b4 b5 b6 b7 = 1 1 1 0 0 0 1 0 |
| complex(−7.0/sqrt(170.0), −9.0/sqrt(170.0)), | //!< b0 b1 b2 b3 b4 b5 b6 b7 = 1 1 1 0 0 0 1 1 |
| complex(−5.0/sqrt(170.0), −13.0/sqrt(170.0)), | //!< b0 b1 b2 b3 b4 b5 b6 b7 = 1 1 1 0 0 1 0 0 |
| complex(−5.0/sqrt(170.0), −15.0/sqrt(170.0)), | //!< b0 b1 b2 b3 b4 b5 b6 b7 = 1 1 1 0 0 1 0 1 |
| complex(−7.0/sqrt(170.0), −13.0/sqrt(170.0)), | //!< b0 b1 b2 b3 b4 b5 b6 b7 = 1 1 1 0 0 1 1 0 |
| complex(−7.0/sqrt(170.0), −15.0/sqrt(170.0)), | //!< b0 b1 b2 b3 b4 b5 b6 b7 = 1 1 1 0 0 1 1 1 |
| complex(−3.0/sqrt(170.0), −11.0/sqrt(170.0)), | //!< b0 b1 b2 b3 b4 b5 b6 b7 = 1 1 1 0 1 0 0 0 |
| complex(−3.0/sqrt(170.0), −9.0/sqrt(170.0)), | //!< b0 b1 b2 b3 b4 b5 b6 b7 = 1 1 1 0 1 0 0 1 |
| complex(−1.0/sqrt(170.0), −11.0/sqrt(170.0)), | //!< b0 b1 b2 b3 b4 b5 b6 b7 = 1 1 1 0 1 0 1 0 |
| complex(−1.0/sqrt(170.0), −9.0/sqrt(170.0)), | //!< b0 b1 b2 b3 b4 b5 b6 b7 = 1 1 1 0 1 0 1 1 |
| complex(−3.0/sqrt(170.0), −13.0/sqrt(170.0)), | //!< b0 b1 b2 b3 b4 b5 b6 b7 = 1 1 1 0 1 1 0 0 |
| complex(−3.0/sqrt(170.0), −15.0/sqrt(170.0)), | //!< b0 b1 b2 b3 b4 b5 b6 b7 = 1 1 1 0 1 1 0 1 |
| complex(−1.0/sqrt(170.0), −13.0/sqrt(170.0)), | //!< b0 b1 b2 b3 b4 b5 b6 b7 = 1 1 1 0 1 1 1 0 |
| complex(−1.0/sqrt(170.0), −15.0/sqrt(170.0)), | //!< b0 b1 b2 b3 b4 b5 b6 b7 = 1 1 1 0 1 1 1 1 |
| complex(−5.0/sqrt(170.0), −5.0/sqrt(170.0)), | //!< b0 b1 b2 b3 b4 b5 b6 b7 = 1 1 1 1 0 0 0 0 |
| complex(−5.0/sqrt(170.0), −7.0/sqrt(170.0)), | //!< b0 b1 b2 b3 b4 b5 b6 b7 = 1 1 1 1 0 0 0 1 |
| complex(−7.0/sqrt(170.0), −5.0/sqrt(170.0)), | //!< b0 b1 b2 b3 b4 b5 b6 b7 = 1 1 1 1 0 0 1 0 |

TABLE 10-continued

| | | |
|---|---|---|
| complex(−7.0/sqrt(170.0), −7.0/sqrt(170.0)), | //!< b0 b1 b2 b3 b4 b5 b6 b7 = | 1 1 1 1 0 0 1 1 |
| complex(−5.0/sqrt(170.0), −3.0/sqrt(170.0)), | //!< b0 b1 b2 b3 b4 b5 b6 b7 = | 1 1 1 1 0 1 0 0 |
| complex(−5.0/sqrt(170.0), −1.0/sqrt(170.0)), | //!< b0 b1 b2 b3 b4 b5 b6 b7 = | 1 1 1 1 0 1 0 1 |
| complex(−7.0/sqrt(170.0), −3.0/sqrt(170.0)), | //!< b0 b1 b2 b3 b4 b5 b6 b7 = | 1 1 1 1 0 1 1 0 |
| complex(−7.0/sqrt(170.0), −1.0/sqrt(170.0)), | //!< b0 b1 b2 b3 b4 b5 b6 b7 = | 1 1 1 1 0 1 1 1 |
| complex(−3.0/sqrt(170.0), −5.0/sqrt(170.0)), | //!< b0 b1 b2 b3 b4 b5 b6 b7 = | 1 1 1 1 1 0 0 0 |
| complex(−3.0/sqrt(170.0), −7.0/sqrt(170.0)), | //!< b0 b1 b2 b3 b4 b5 b6 b7 = | 1 1 1 1 1 0 0 1 |
| complex(−1.0/sqrt(170.0), −5.0/sqrt(170.0)), | //!< b0 b1 b2 b3 b4 b5 b6 b7 = | 1 1 1 1 1 0 1 0 |
| complex(−1.0/sqrt(170.0), −7.0/sqrt(170.0)), | //!< b0 b1 b2 b3 b4 b5 b6 b7 = | 1 1 1 1 1 0 1 1 |
| complex(−3.0/sqrt(170.0), −3.0/sqrt(170.0)), | //!< b0 b1 b2 b3 b4 b5 b6 b7 = | 1 1 1 1 1 1 0 0 |
| complex(−3.0/sqrt(170.0), −1.0/sqrt(170.0)), | //!< b0 b1 b2 b3 b4 b5 b6 b7 = | 1 1 1 1 1 1 0 1 |
| complex(−1.0/sqrt(170.0), −3.0/sqrt(170.0)), | //!< b0 b1 b2 b3 b4 b5 b6 b7 = | 1 1 1 1 1 1 1 0 |
| complex(−1.0/sqrt(170.0), −1.0/sqrt(170.0)), | //!< b0 b1 b2 b3 b4 b5 b6 b7 = | 1 1 1 1 1 1 1 1 |

Figure 13:
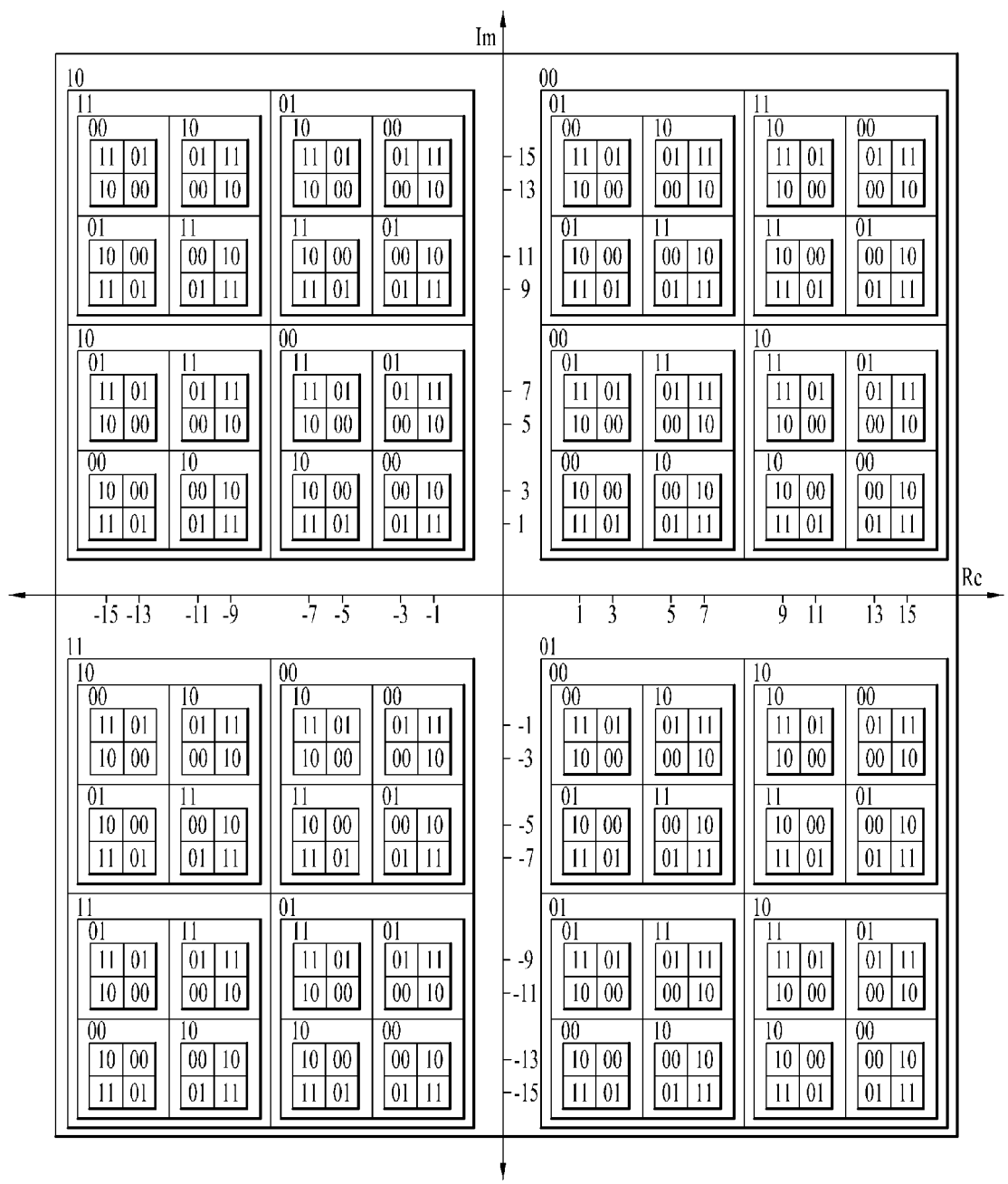
FIG. 13 is a diagram showing another example of a constellation point design method for supporting a 256QAM scheme.

FIG. 13 is a diagram showing another example of a constellation point design method for supporting a 256QAM scheme.

In FIG. 13, one smallest rectangle denotes a constellation point of a 256QAM scheme. In FIG. 13, an x-axis denotes a real-number axis and a y-axis denotes an imaginary-number axis. In addition, constellation points are arranged at intervals of 1, 3, 5, 7, 9, 11, 13 and 15.

In each constellation point, octuple bits are modulated and coded to be transformed into one OFDM symbol/signal and is mapped. In FIG. 13, two bits for distinguishing amonng quandrants configure most significant bits (MSBs) and each of four blocks in each quadrant is also composed of two next bits. In addition, each of the four blocks includes four small blocks, each of which is distinguished by two bits. Lastly, smallest blocks are distinguished by two bits and mean constellation points. Accordingly, as the method for interpreting FIG. 13, one constellation point is finally distinguished by eight bits, by sequentially distinguishing between the blocks by two bits, starting from two bits for distinguishing among the four quadrants.

For example, referring to FIG. 13, first, each quadrant is composed of two MSBs [b0 b1]. In each quadrant, constellation points corresponding to 64QAM are arranged using the above-described methods. In FIG. 13, the constellation points [b0 b1 b2 b3 b4 b5 b6 b7]=[0 0 1 1 0 0 1 1] are mapped to complex(+15/sqrt(170), +15/sqrt(170)) and transmitted. In addition, the constellation points [b0 b1 b2 b3 b4 b5 b6 b7]=[1 0 0 1 0 0 0 1] are mapped to complex(−3/sqrt(170), +15/sqrt(170)) and transmitted. By this method, all constellation points shown in FIG. 13 may be distinguished.

Figure 14:
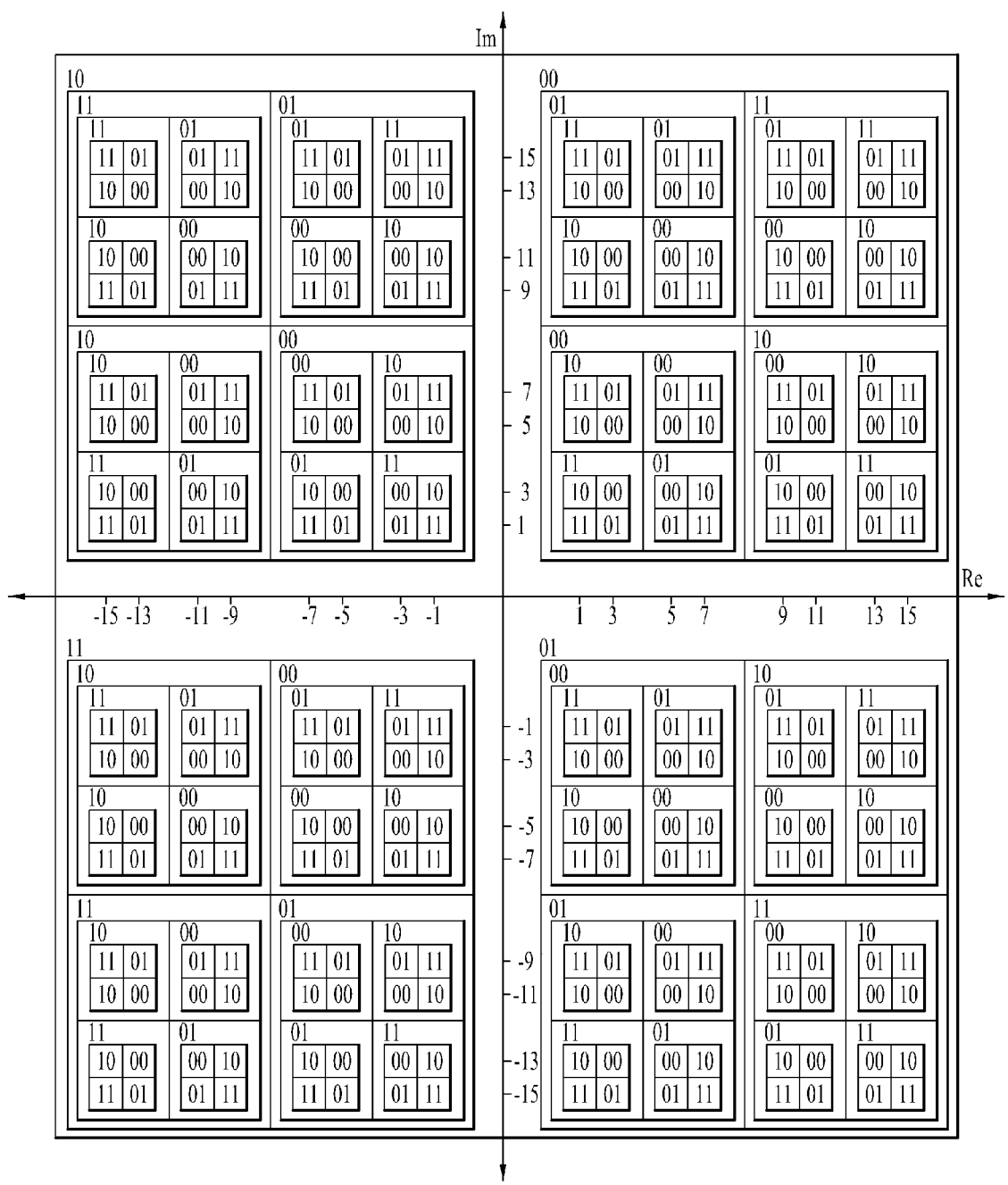
FIG. 14 is a diagram showing another example of a constellation point design method for supporting a 256QAM scheme.

FIG. 14 is a diagram showing another example of a constellation point design method for supporting a 256QAM scheme.

The constellation mapping method of FIG. 14 is equal to the method described with reference to FIG. 13 but is different from FIG. 13 in values configuring the constellation points.

Referring to FIG. 14, first, the quadrant is composed of two MSBs [b0 b1]. At this time, in each quadrant, constellation points corresponding to 64QAM are arranged using the above-described methods. In FIG. 14, the constellation points [b0 b1 b2 b3 b4 b5 b6 b7]=[0 0 1 1 0 0 1 1] are mapped to complex(+9/sqrt(170), +9/sqrt(170)) and transmitted. In addition, the constellation points [b0 b1 b2 b3 b4 b5 b6 b7]=[1 0 0 1 0 0 0 1] are mapped to complex(−3/sqrt(170), +9/sqrt(170)) and transmitted. By this method, the constellation points shown in FIG. 14 may be distinguished.

The constellation points shown in FIG. 14 are shown in Table 11 below. That is, in the 256QAM scheme, 8 bits b(i), b(i+1), b(i+2), b(i+3), b(i+4), b(i+5), b(i+6), b(i+7) may be mapped to a complex modulation symbol $x=(I+jQ)/\sqrt{170}$. At this time, I denotes a real-number axis value and Q denotes an imaginary-number axis value.

TABLE 11

| b(i), . . . , b(i + 7) | I | Q |
|---|---|---|
| 00000000 | 5 | 5 |
| 00000001 | 5 | 1 |
| 00000010 | 7 | 5 |
| 00000011 | 7 | 7 |
| 00000100 | 5 | 3 |
| 00000101 | 5 | 1 |
| 00000110 | 7 | 3 |
| 00000111 | 7 | 1 |
| 00001000 | 3 | 5 |
| 00001001 | 3 | 7 |
| 00001010 | 1 | 5 |
| 00001011 | 1 | 7 |
| 00001100 | 3 | 3 |
| 00001101 | 3 | 1 |
| 00001110 | 1 | 3 |
| 00001111 | 1 | 1 |
| 00010000 | 5 | 11 |
| 00010001 | 5 | 9 |
| 00010010 | 7 | 11 |
| 00010011 | 7 | 9 |
| 00010100 | 5 | 13 |
| 00010101 | 5 | 15 |
| 00010110 | 7 | 13 |
| 00010111 | 7 | 15 |
| 00011000 | 3 | 11 |
| 00011001 | 3 | 9 |
| 00011010 | 1 | 11 |
| 00011011 | 1 | 9 |
| 00011100 | 3 | 13 |
| 00011101 | 3 | 15 |
| 00011110 | 1 | 13 |
| 00011111 | 1 | 15 |
| 00100000 | 11 | 5 |
| 00100001 | 11 | 7 |
| 00100010 | 9 | 5 |
| 00100011 | 9 | 7 |
| 00100100 | 11 | 3 |
| 00100101 | 11 | 1 |
| 00100110 | 9 | 3 |
| 00100111 | 9 | 1 |
| 00101000 | 13 | 5 |
| 00101001 | 13 | 7 |
| 00101010 | 15 | 5 |
| 00101011 | 15 | 7 |
| 00101100 | 13 | 3 |
| 00101101 | 13 | 1 |
| 00101110 | 15 | 3 |
| 00101111 | 15 | 1 |
| 00110000 | 11 | 11 |
| 00110001 | 11 | 9 |
| 00110010 | 9 | 11 |
| 00110011 | 9 | 9 |
| 00110100 | 11 | 13 |
| 00110101 | 11 | 15 |
| 00110110 | 9 | 13 |

TABLE 11-continued

| b(i), . . . , b(i + 7) | I | Q |
|---|---|---|
| 00110111 | 9 | 15 |
| 00111000 | 13 | 11 |
| 00111001 | 13 | 9 |
| 00111010 | 15 | 11 |
| 00111011 | 15 | 9 |
| 00111100 | 13 | 13 |
| 00111101 | 13 | 15 |
| 00111110 | 15 | 13 |
| 00111111 | 15 | 15 |
| 01000000 | 5 | −5 |
| 01000001 | 5 | −7 |
| 01000010 | 7 | −5 |
| 01000011 | 7 | −7 |
| 01000100 | 5 | −3 |
| 01000101 | 5 | −1 |
| 01000110 | 7 | −3 |
| 01000111 | 7 | −1 |
| 01001000 | 3 | −5 |
| 01001001 | 3 | −7 |
| 01001010 | 1 | −5 |
| 01001011 | 1 | −7 |
| 01001100 | 3 | −3 |
| 01001101 | 3 | −1 |
| 01001110 | 1 | −3 |
| 01001111 | 1 | −1 |
| 01010000 | 5 | −11 |
| 01010001 | 5 | −9 |
| 01010010 | 7 | −11 |
| 01010011 | 7 | −9 |
| 01010100 | 5 | −13 |
| 01010101 | 5 | −15 |
| 01010110 | 7 | −13 |
| 01010111 | 7 | −15 |
| 01011000 | 3 | −11 |
| 01011001 | 3 | −9 |
| 01011010 | 1 | −11 |
| 01011011 | 1 | −9 |
| 01011100 | 3 | −13 |
| 01011101 | 3 | −15 |
| 01011110 | 1 | −13 |
| 01011111 | 1 | −15 |
| 01100000 | 11 | −5 |
| 01100001 | 11 | −7 |
| 01100010 | 9 | −5 |
| 01100011 | 9 | −7 |
| 01100100 | 11 | −3 |
| 01100101 | 11 | −1 |
| 01100110 | 9 | −3 |
| 01100111 | 9 | −1 |
| 01101000 | 13 | −5 |
| 01101001 | 13 | −7 |
| 01101010 | 15 | −5 |
| 01101011 | 15 | −7 |
| 01101100 | 13 | −3 |
| 01101101 | 13 | −1 |
| 01101110 | 15 | −3 |
| 01101111 | 15 | −1 |
| 01110000 | 11 | −11 |
| 01110001 | 11 | −9 |
| 01110010 | 9 | −11 |
| 01110011 | 9 | −9 |
| 01110100 | 11 | −13 |
| 01110101 | 11 | −15 |
| 01110110 | 9 | −13 |
| 01110111 | 9 | −15 |
| 01111000 | 13 | −11 |
| 01111001 | 13 | −9 |
| 01111010 | 15 | −11 |
| 01111011 | 15 | −9 |
| 01111100 | 13 | −13 |
| 01111101 | 13 | −15 |
| 01111110 | 15 | −13 |
| 01111111 | 15 | −15 |
| 10000000 | −5 | 5 |
| 10000001 | −5 | 7 |
| 10000010 | −7 | 5 |
| 10000011 | −7 | 7 |
| 10000100 | −5 | 3 |
| 10000101 | −5 | 1 |
| 10000110 | −7 | 3 |
| 10000111 | −7 | 1 |
| 10001000 | −3 | 5 |
| 10001001 | −3 | 7 |
| 10001010 | −1 | 5 |
| 10001011 | −1 | 7 |
| 10001100 | −3 | 3 |
| 10001101 | −3 | 1 |
| 10001110 | −1 | 3 |
| 10001111 | −1 | 1 |
| 10010000 | −5 | 11 |
| 10010001 | −5 | 9 |
| 10010010 | −7 | 11 |
| 10010011 | −7 | 9 |
| 10010100 | −5 | 13 |
| 10010101 | −5 | 15 |
| 10010110 | −7 | 13 |
| 10010111 | −7 | 15 |
| 10011000 | −3 | 11 |
| 10011001 | −3 | 9 |
| 10011010 | −1 | 11 |
| 10011011 | −1 | 9 |
| 10011100 | −3 | 13 |
| 10011101 | −3 | 15 |
| 10011110 | −1 | 13 |
| 10011111 | −1 | 15 |
| 10100000 | −11 | 5 |
| 10100001 | −11 | 7 |
| 10100010 | −9 | 5 |
| 10100011 | −9 | 7 |
| 10100100 | −11 | 3 |
| 10100101 | −11 | 1 |
| 10100110 | −9 | 3 |
| 10100111 | −9 | 1 |
| 10101000 | −13 | 5 |
| 10101001 | −13 | 7 |
| 10101010 | −15 | 5 |
| 10101011 | −15 | 7 |
| 10101100 | −13 | 3 |
| 10101101 | −13 | 1 |
| 10101110 | −15 | 3 |
| 10101111 | −15 | 1 |
| 10110000 | −11 | 11 |
| 10110001 | −11 | 9 |
| 10110010 | −9 | 11 |
| 10110011 | −9 | 9 |
| 10110100 | −11 | 13 |
| 10110101 | −11 | 15 |
| 10110110 | −9 | 13 |
| 10110111 | −9 | 15 |
| 10111000 | −13 | 11 |
| 10111001 | −13 | 9 |
| 10111010 | −15 | 11 |
| 10111011 | −15 | 9 |
| 10111100 | −13 | 13 |
| 10111101 | −13 | 15 |
| 10111110 | −15 | 13 |
| 10111111 | −15 | 15 |
| 11000000 | −5 | −5 |
| 11000001 | −5 | −7 |
| 11000010 | −7 | −5 |
| 11000011 | −7 | −7 |
| 11000100 | −5 | −3 |
| 11000101 | −5 | −1 |
| 11000110 | −7 | −3 |
| 11000111 | −7 | −1 |
| 11001000 | −3 | −5 |
| 11001001 | −3 | −7 |
| 11001010 | −1 | −5 |
| 11001011 | −1 | −7 |
| 11001100 | −3 | −3 |
| 11001101 | −3 | −1 |
| 11001110 | −1 | −3 |
| 11001111 | −1 | −1 |
| 11010000 | −5 | −11 |
| 11010001 | −5 | −9 |
| 11010010 | −7 | −11 |

TABLE 11-continued

| b(i), . . . , b(i + 7) | I | Q |
|---|---|---|
| 11010011 | −7 | −9 |
| 11010100 | −5 | −13 |
| 11010101 | −5 | −15 |
| 11010110 | −7 | −13 |
| 11010111 | −7 | −15 |
| 11011000 | −3 | −11 |
| 11011001 | −3 | −9 |
| 11011010 | −1 | −11 |
| 11011011 | −1 | −9 |
| 11011100 | −3 | −13 |
| 11011101 | −3 | −15 |
| 11011110 | −1 | −13 |
| 11011111 | −1 | −15 |
| 11100000 | −11 | −5 |
| 11100001 | −11 | −7 |
| 11100010 | −9 | −5 |
| 11100011 | −9 | −7 |
| 11100100 | −11 | −3 |
| 11100101 | −11 | −1 |
| 11100110 | −9 | −3 |
| 11100111 | −9 | −1 |
| 11101000 | −13 | −5 |
| 11101001 | −13 | −7 |
| 11101010 | −15 | −5 |
| 11101011 | −15 | −7 |
| 11101100 | −13 | −3 |
| 11101101 | −13 | −1 |
| 11101110 | −15 | −3 |
| 11101111 | −15 | −1 |
| 11110000 | −11 | −11 |
| 11110001 | −11 | −9 |
| 11110010 | −9 | −11 |
| 11110011 | −9 | −9 |
| 11110100 | −11 | −13 |
| 11110101 | −11 | −15 |
| 11110110 | −9 | −13 |
| 11110111 | −9 | −15 |
| 11111000 | −13 | −11 |
| 11111001 | −13 | −9 |
| 11111010 | −15 | −11 |
| 11111011 | −15 | −9 |
| 11111100 | −13 | −13 |
| 11111101 | −13 | −15 |
| 11111110 | −15 | −13 |
| 11111111 | −15 | −15 |

5. Implementation Apparatus

Figure 15:
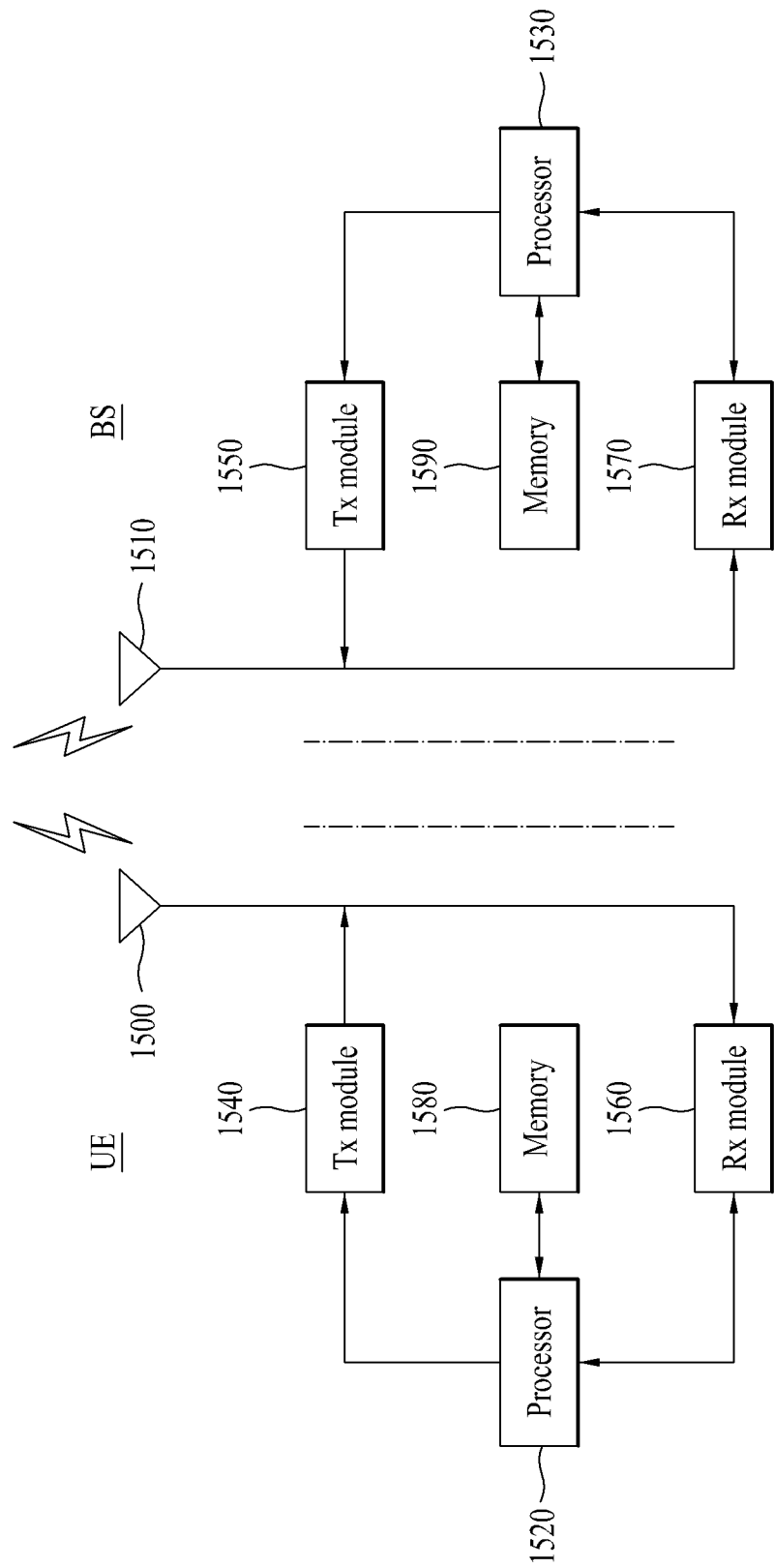
FIG. 15 is a diagram showing an apparatus for implementing the methods shown in FIGS. 1 to 14.

The apparatus described with reference to FIG. 15 can implement the methods described with reference to FIGS. 1 to 14.

A user equipment (UE) may operate as a transmitter in uplink and as a receiver in downlink. In addition, an eNB (e-Node B) may operate as a receiver in uplink and as a transmitter in downlink.

That is, the UE and the eNB may include transmission (Tx) modules 1540 and 1550 and reception (Rx) modules 1550 and 1570 for controlling transmission and reception of information, data and/or messages and antennas 1500 and 1510 for transmitting and receiving information, data and/or messages, respectively.

In addition, the UE and the eNB may include processors 1520 and 1530 for performing the above-described embodiments of the present invention and memories 1580 and 1590 for temporarily or semi-permanently storing the processing procedures of the processors, respectively.

The embodiments of the present invention may be performed using the components and functions of the UE and the eNB. For example, the processor of the eNB may combine the methods described in Chapters 1 to 4 to maintain or manage the MCS/TBS index tables for supporting 256QAM and signal $I_{MCS}$ for supporting 256QAM. In addition, the processor of the eNB and/or the UE may map the OFDM symbols modulated using the 256QAM scheme via the constellation mapping method described with reference to FIGS. 11 to 14 and Tables 9 to 11. For detailed methods, refer to the description of Chapters 1 to 4.

The Tx modules and the Rx modules included in the UE and the eNB may perform packet modulation/demodulation functions for data transmission, a fast packet channel coding function, orthogonal frequency division multiple access (OFDMA) packet scheduling, time division duplex (TDD) packet scheduling and/or a channel multiplexing function. In addition, the UE and the eNB of FIG. 15 may further include low-power radio frequency (RF)/intermediate frequency (IF) modules.

In the present invention, as the UE, a personal digital assistant (PDA), a cellular phone, a personal communication service (PCS) phone, a global system for mobile (GSM) phone, a wideband CDMA (WCDMA) phone, a mobile broadband system (MBS) phone, a handheld PC, a laptop, a smartphone, a multimode multiband (MM-MB) terminal, etc. may be used.

The smartphone is a terminal obtained by mixing the advantages of a mobile communication terminal and a PDA and may mean a terminal obtained by adding the functions of the PDA, that is, schedule management, fax transmission and reception and a data communication functions such as Internet access, to the mobile communication terminal. In addition, the MM-MB terminal refers to a terminal which may include a multi modem chip and operate in a portable Internet system and other mobile communication systems (e.g., a code division multiple access (CDMA) 2000 system, a wideband CDMA (WCDMA) system, etc.).

The embodiments of the present invention can be implemented by a variety of means, for example, hardware, firmware, software, or a combination thereof.

In the case of implementing the present invention by hardware, the present invention can be implemented with application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in the memory unit 1580 and 1590 so that it can be driven by the processors 1520 and 1530. The memory units are located inside or outside of the processors, so that they can communicate with the aforementioned processors via a variety of well-known parts.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Moreover, it will be apparent that some claims referring to specific claims may be combined with other claims referring to the other claims other than the specific claims to constitute the embodiment or add new claims by means of amendment after the application is filed.

The embodiments of the present invention have the following effects.

First, by transmitting and receiving data using a high-order modulation scheme, it is possible to efficiently transmit and receive data.

Second, by designing a new constellation point in order to support 256QAM, it is possible to transmit and receive data using a 256QAM scheme.

It will be appreciated by persons skilled in the art that the effects that can be achieved through the embodiments of the present invention are not limited to the above-described effects and other effects which are not described herein will be derived and understood from the above description of the embodiments of the present invention. That is, it will be appreciated by persons skilled in the art that the unintended effects that can be achieved by implementing the present invention may be derived from the embodiments of the present invention.

The embodiments of the present invention are applicable to various wireless access systems. Examples of the various wireless access systems include a 3$^{rd}$ generation partnership project (3GPP) system, a 3GPP2 system and/or an Institute of Electrical and Electronics Engineers (IEEE) 802.xx system, etc. The embodiments of the present invention are applicable to all technical fields using the various wireless access systems in addition to the various wireless access systems.

What is claimed is:

1. A method for transmitting a modulation symbol using a 256 quadrature amplitude modulation (QAM) scheme at a transmitter in a wireless access system, the method comprising:

modulating octuple bits into one modulation symbol using the 256QAM scheme;

mapping the modulation symbol to one of 256QAM constellation points; and transmitting the mapped modulation symbol, wherein the 256QAM constellation points are configured as in the following Table:

TABLE

| b(i), . . . , b(i + 7) | I | Q |
|---|---|---|
| 00000000 | 5 | 5 |
| 00000001 | 5 | 7 |
| 00000010 | 7 | 5 |
| 00000011 | 7 | 7 |
| 00000100 | 5 | 3 |
| 00000101 | 5 | 1 |
| 00000110 | 7 | 3 |
| 00000111 | 7 | 1 |
| 00001000 | 3 | 5 |
| 00001001 | 3 | 7 |
| 00001010 | 1 | 5 |
| 00001011 | 1 | 7 |
| 00001100 | 3 | 3 |
| 00001101 | 3 | 1 |
| 00001110 | 1 | 3 |
| 00001111 | 1 | 1 |
| 00010000 | 5 | 11 |
| 00010001 | 5 | 9 |
| 00010010 | 7 | 11 |
| 00010011 | 7 | 9 |
| 00010100 | 5 | 13 |
| 00010101 | 5 | 15 |
| 00010110 | 7 | 13 |
| 00010111 | 7 | 15 |
| 00011000 | 3 | 11 |
| 00011001 | 3 | 9 |
| 00011010 | 1 | 11 |
| 00011011 | 1 | 9 |
| 00011100 | 3 | 13 |
| 00011101 | 3 | 15 |
| 00011110 | 1 | 13 |
| 00011111 | 1 | 15 |
| 00100000 | 11 | 5 |
| 00100001 | 11 | 7 |
| 00100010 | 9 | 5 |
| 00100011 | 9 | 7 |
| 00100100 | 11 | 3 |
| 00100101 | 11 | 1 |
| 00100110 | 9 | 3 |
| 00100111 | 9 | 1 |
| 00101000 | 13 | 5 |
| 00101001 | 13 | 7 |
| 00101010 | 15 | 5 |
| 00101011 | 15 | 7 |
| 00101100 | 13 | 3 |
| 00101101 | 13 | 1 |
| 00101110 | 15 | 3 |
| 00101111 | 15 | 1 |
| 00110000 | 11 | 11 |
| 00110001 | 11 | 9 |
| 00110010 | 9 | 11 |
| 00110011 | 9 | 9 |
| 00110100 | 11 | 13 |
| 00110101 | 11 | 15 |
| 00110110 | 9 | 13 |
| 00110111 | 9 | 15 |
| 00111000 | 13 | 11 |
| 00111001 | 13 | 9 |
| 00111010 | 15 | 11 |
| 00111011 | 15 | 9 |
| 00111100 | 13 | 13 |
| 00111101 | 13 | 15 |
| 00111110 | 15 | 13 |
| 00111111 | 15 | 15 |
| 01000000 | 5 | −5 |
| 01000001 | 5 | −1 |
| 01000010 | 7 | −5 |
| 01000011 | 7 | −7 |
| 01000100 | 5 | −3 |
| 01000101 | 5 | −1 |
| 01000110 | 7 | −3 |
| 01000111 | 7 | −1 |
| 01001000 | 3 | −5 |
| 01001001 | 3 | −7 |
| 01001010 | 1 | −5 |
| 01001011 | 1 | −7 |
| 01001100 | 3 | −3 |
| 01001101 | 3 | −1 |
| 01001110 | 1 | −3 |
| 01001111 | 1 | −1 |
| 01010000 | 5 | −11 |
| 01010001 | 5 | −9 |
| 01010010 | 7 | −11 |
| 01010011 | 7 | −9 |
| 01010100 | 5 | −13 |
| 01010101 | 5 | −15 |
| 01010110 | 7 | −13 |
| 01010111 | 7 | −15 |
| 01011000 | 3 | −11 |
| 01011001 | 3 | −9 |
| 01011010 | 1 | −11 |
| 01011011 | 1 | −9 |
| 01011100 | 3 | −13 |
| 01011101 | 3 | −15 |
| 01011110 | 1 | −13 |
| 01011111 | 1 | −15 |
| 01100000 | 11 | −5 |
| 01100001 | 11 | −7 |
| 01100010 | 9 | −5 |
| 01100011 | 9 | −7 |
| 01100100 | 11 | −3 |
| 01100101 | 11 | −1 |
| 01100110 | 9 | −3 |
| 01100111 | 9 | −1 |
| 01101000 | 13 | −5 |
| 01101001 | 13 | −7 |
| 01101010 | 15 | −5 |
| 01101011 | 15 | −7 |

TABLE-continued

| b(i), ..., b(i + 7) | I | Q |
|---|---|---|
| 01101100 | 13 | −3 |
| 01101101 | 13 | −1 |
| 01101110 | 15 | −3 |
| 01101111 | 15 | −1 |
| 01110000 | 11 | −11 |
| 01110001 | 11 | −9 |
| 01110010 | 9 | −11 |
| 01110011 | 9 | −9 |
| 01110100 | 11 | −13 |
| 01110101 | 11 | −15 |
| 01110110 | 9 | −13 |
| 01110111 | 9 | −15 |
| 01111000 | 13 | −11 |
| 01111001 | 13 | −9 |
| 01111010 | 15 | −11 |
| 01111011 | 15 | −9 |
| 01111100 | 13 | −13 |
| 01111101 | 13 | −15 |
| 01111110 | 15 | −13 |
| 01111111 | 15 | −15 |
| 10000000 | −5 | 5 |
| 10000001 | −5 | 1 |
| 10000010 | −7 | 5 |
| 10000011 | −7 | 1 |
| 10000100 | −5 | 3 |
| 10000101 | −5 | 1 |
| 10000110 | −7 | 3 |
| 10000111 | −7 | 1 |
| 10001000 | −3 | 5 |
| 10001001 | −3 | 7 |
| 10001010 | −1 | 5 |
| 10001011 | −1 | 7 |
| 10001100 | −3 | 3 |
| 10001101 | −3 | 1 |
| 10001110 | −1 | 3 |
| 10001111 | −1 | 1 |
| 10010000 | −5 | 11 |
| 10010001 | −5 | 9 |
| 10010010 | −7 | 11 |
| 10010011 | −7 | 9 |
| 10010100 | −5 | 13 |
| 10010101 | −5 | 15 |
| 10010110 | −7 | 13 |
| 10010111 | −7 | 15 |
| 10011000 | −3 | 11 |
| 10011001 | −3 | 9 |
| 10011010 | −1 | 11 |
| 10011011 | −1 | 9 |
| 10011100 | −3 | 13 |
| 10011101 | −3 | 15 |
| 10011110 | −1 | 13 |
| 10011111 | −1 | 15 |
| 10100000 | −11 | 5 |
| 10100001 | −11 | 7 |
| 10100010 | −9 | 5 |
| 10100011 | −9 | 7 |
| 10100100 | −11 | 3 |
| 10100101 | −11 | 1 |
| 10100110 | −9 | 3 |
| 10100111 | −9 | 1 |
| 10101000 | −13 | 5 |
| 10101001 | −13 | 7 |
| 10101010 | −15 | 5 |
| 10101011 | −15 | 7 |
| 10101100 | −13 | 3 |
| 10101101 | −13 | 1 |
| 10101110 | −15 | 3 |
| 10101111 | −15 | 1 |
| 10110000 | −11 | 11 |
| 10110001 | −11 | 9 |
| 10110010 | −9 | 11 |
| 10110011 | −9 | 9 |
| 10110100 | −11 | 13 |
| 10110101 | −11 | 15 |
| 10110110 | −9 | 13 |
| 10110111 | −9 | 15 |
| 10111000 | −13 | 11 |
| 10111001 | −13 | 9 |
| 10111010 | −15 | 11 |
| 10111011 | −15 | 9 |
| 10111100 | −13 | 13 |
| 10111101 | −13 | 15 |
| 10111110 | −15 | 13 |
| 10111111 | −15 | 15 |
| 11000000 | −5 | −5 |
| 11000001 | −5 | −7 |
| 11000010 | −7 | −5 |
| 11000011 | −7 | −7 |
| 11000100 | −5 | −3 |
| 11000101 | −5 | −1 |
| 11000110 | −7 | −3 |
| 11000111 | −7 | −1 |
| 11001000 | −3 | −5 |
| 11001001 | −3 | −7 |
| 11001010 | −1 | −5 |
| 11001011 | −1 | −7 |
| 11001100 | −3 | −3 |
| 11001101 | −3 | −1 |
| 11001110 | −1 | −3 |
| 11001111 | −1 | −1 |
| 11010000 | −5 | −11 |
| 11010001 | −5 | −9 |
| 11010010 | −7 | −11 |
| 11010011 | −7 | −9 |
| 11010100 | −5 | −13 |
| 11010101 | −5 | −15 |
| 11010110 | −7 | −13 |
| 11010111 | −7 | −15 |
| 11011000 | −3 | −11 |
| 11011001 | −3 | −9 |
| 11011010 | −1 | −11 |
| 11011011 | −1 | −9 |
| 11011100 | −3 | −13 |
| 11011101 | −3 | −15 |
| 11011110 | −1 | −13 |
| 11011111 | −1 | −15 |
| 11100000 | −11 | −5 |
| 11100001 | −11 | −7 |
| 11100010 | −9 | −5 |
| 11100011 | −9 | −7 |
| 11100100 | −11 | −3 |
| 11100101 | −11 | −1 |
| 11100110 | −9 | −3 |
| 11100111 | −9 | −1 |
| 11101000 | −13 | −5 |
| 11101001 | −13 | −7 |
| 11101010 | −15 | −5 |
| 11101011 | −15 | −7 |
| 11101100 | −13 | −3 |
| 11101101 | −13 | −1 |
| 11101110 | −15 | −3 |
| 11101111 | −15 | −1 |
| 11110000 | −11 | −11 |
| 11110001 | −11 | −9 |
| 11110010 | −9 | −11 |
| 11110011 | −9 | −9 |
| 11110100 | −11 | −13 |
| 11110101 | −11 | −15 |
| 11110110 | −9 | −13 |
| 11110111 | −9 | −15 |
| 11111000 | −13 | −11 |
| 11111001 | −13 | −9 |
| 11111010 | −15 | −11 |
| 11111011 | −15 | −9 |
| 11111100 | −13 | −13 |
| 11111101 | −13 | −15 |
| 11111110 | −15 | −13 |
| 11111111 | −15 | −15 |

, where $0 \leq i \leq 7$, Q denotes an imaginary axis value and I denotes a real-number axis value.

2. The method according to claim 1, wherein the 256QAM constellation points are configured by arranging 64 64QAM constellation points in a first quadrant of the figure and by imaginary-number axis symmetry, real-number axis symmetry and original symmetry of the 64QAM constellation points.

3. The method according to claim 2, wherein the transmitter simultaneously manages a first table for supporting a legacy modulation scheme and a second table for supporting a 256QAM scheme.

4. The method according to claim 3, further comprising:
transmitting, at the transmitter, a higher layer signal including an indicator indicating whether the 256QAM scheme is supported; and
transmitting, at the transmitter to a receiver, a modulation and coding scheme (MCS) index indicating the 256QAM scheme by selecting from the second table.

5. The method according to claim 4, wherein the MCS index has a size of 5 bits.

6. The method according to claim 2, wherein the transmitter is a base station and the receiver is a user equipment (UE).

7. A transmitter for transmitting a modulation symbol using a 256 quadrature amplitude modulation (QAM) scheme in a wireless access system, the transmitter comprising:
a transmission unit; and
a processor configured to support the 256QAM scheme, wherein the processor is configured to:
modulate octuple bits into one modulation symbol using the 256QAM scheme;
map the modulation symbol to one of 256QAM constellation points; and
transmit the mapped modulation symbol using the transmission unit,
wherein the 256QAM constellation points are configured as in the following Table:

TABLE

| b(i), . . . , b(i + 7) | I | Q |
|---|---|---|
| 00000000 | 5 | 5 |
| 00000001 | 5 | 7 |
| 00000010 | 7 | 5 |
| 00000011 | 7 | 7 |
| 00000100 | 5 | 3 |
| 00000101 | 5 | 1 |
| 00000110 | 7 | 3 |
| 00000111 | 7 | 1 |
| 00001000 | 3 | 5 |
| 00001001 | 3 | 7 |
| 00001010 | 1 | 5 |
| 00001011 | 1 | 7 |
| 00001100 | 3 | 3 |
| 00001101 | 3 | 1 |
| 00001110 | 1 | 3 |
| 00001111 | 1 | 1 |
| 00010000 | 5 | 11 |
| 00010001 | 5 | 9 |
| 00010010 | 7 | 11 |
| 00010011 | 7 | 9 |
| 00010100 | 5 | 13 |
| 00010101 | 5 | 15 |
| 00010110 | 7 | 13 |
| 00010111 | 7 | 15 |
| 00011000 | 3 | 11 |
| 00011001 | 3 | 9 |
| 00011010 | 1 | 11 |
| 00011011 | 1 | 9 |
| 00011100 | 3 | 13 |
| 00011101 | 3 | 15 |
| 00011110 | 1 | 13 |
| 00011111 | 1 | 15 |
| 00100000 | 11 | 5 |
| 00100001 | 11 | 7 |

TABLE-continued

| b(i), . . . , b(i + 7) | I | Q |
|---|---|---|
| 00100010 | 9 | 5 |
| 00100011 | 9 | 7 |
| 00100100 | 11 | 3 |
| 00100101 | 11 | 1 |
| 00100110 | 9 | 3 |
| 00100111 | 9 | 1 |
| 00101000 | 13 | 5 |
| 00101001 | 13 | 7 |
| 00101010 | 15 | 5 |
| 00101011 | 15 | 7 |
| 00101100 | 13 | 3 |
| 00101101 | 13 | 1 |
| 00101110 | 15 | 3 |
| 00101111 | 15 | 1 |
| 00110000 | 11 | 11 |
| 00110001 | 11 | 9 |
| 00110010 | 9 | 11 |
| 00110011 | 9 | 9 |
| 00110100 | 11 | 13 |
| 00110101 | 11 | 15 |
| 00110110 | 9 | 13 |
| 00110111 | 9 | 15 |
| 00111000 | 13 | 11 |
| 00111001 | 13 | 9 |
| 00111010 | 15 | 11 |
| 00111011 | 15 | 9 |
| 00111100 | 13 | 13 |
| 00111101 | 13 | 15 |
| 00111110 | 15 | 13 |
| 00111111 | 15 | 15 |
| 01000000 | 5 | −5 |
| 01000001 | 5 | −1 |
| 01000010 | 7 | −5 |
| 01000011 | 7 | −7 |
| 01000100 | 5 | −3 |
| 01000101 | 5 | −1 |
| 01000110 | 7 | −3 |
| 01000111 | 7 | −1 |
| 01001000 | 3 | −5 |
| 01001001 | 3 | −7 |
| 01001010 | 1 | −5 |
| 01001011 | 1 | −7 |
| 01001100 | 3 | −3 |
| 01001101 | 3 | −1 |
| 01001110 | 1 | −3 |
| 01001111 | 1 | −1 |
| 01010000 | 5 | −11 |
| 01010001 | 5 | −9 |
| 01010010 | 7 | −11 |
| 01010011 | 7 | −9 |
| 01010100 | 5 | −13 |
| 01010101 | 5 | −15 |
| 01010110 | 7 | −13 |
| 01010111 | 7 | −15 |
| 01011000 | 3 | −11 |
| 01011001 | 3 | −9 |
| 01011010 | 1 | −11 |
| 01011011 | 1 | −9 |
| 01011100 | 3 | −13 |
| 01011101 | 3 | −15 |
| 01011110 | 1 | −13 |
| 01011111 | 1 | −15 |
| 01100000 | 11 | −5 |
| 01100001 | 11 | −7 |
| 01100010 | 9 | −5 |
| 01100011 | 9 | −7 |
| 01100100 | 11 | −3 |
| 01100101 | 11 | −1 |
| 01100110 | 9 | −3 |
| 01100111 | 9 | −1 |
| 01101000 | 13 | −5 |
| 01101001 | 13 | −1 |
| 01101010 | 15 | −5 |
| 01101011 | 15 | −7 |
| 01101100 | 13 | −3 |
| 01101101 | 13 | −1 |
| 01101110 | 15 | −3 |
| 01101111 | 15 | −1 |

TABLE-continued

| b(i), . . . , b(i + 7) | I | Q |
|---|---|---|
| 01110000 | 11 | −11 |
| 01110001 | 11 | −9 |
| 01110010 | 9 | −11 |
| 01110011 | 9 | −9 |
| 01110100 | 11 | −13 |
| 01110101 | 11 | −15 |
| 01110110 | 9 | −13 |
| 01110111 | 9 | −15 |
| 01111000 | 13 | −11 |
| 01111001 | 13 | −9 |
| 01111010 | 15 | −11 |
| 01111011 | 15 | −9 |
| 01111100 | 13 | −13 |
| 01111101 | 13 | −15 |
| 01111110 | 15 | −13 |
| 01111111 | 15 | −15 |
| 10000000 | −5 | 5 |
| 10000001 | −5 | 1 |
| 10000010 | −7 | 5 |
| 10000011 | −7 | 1 |
| 10000100 | −5 | 3 |
| 10000101 | −5 | 1 |
| 10000110 | −7 | 3 |
| 10000111 | −7 | 1 |
| 10001000 | −3 | 5 |
| 10001001 | −3 | 7 |
| 10001010 | −1 | 5 |
| 10001011 | −1 | 7 |
| 10001100 | −3 | 3 |
| 10001101 | −3 | 1 |
| 10001110 | −1 | 3 |
| 10001111 | −1 | 1 |
| 10010000 | −5 | 11 |
| 10010001 | −5 | 9 |
| 10010010 | −7 | 11 |
| 10010011 | −7 | 9 |
| 10010100 | −5 | 13 |
| 10010101 | −5 | 15 |
| 10010110 | −7 | 13 |
| 10010111 | −7 | 15 |
| 10011000 | −3 | 11 |
| 10011001 | −3 | 9 |
| 10011010 | −1 | 11 |
| 10011011 | −1 | 9 |
| 10011100 | −3 | 13 |
| 10011101 | −3 | 15 |
| 10011110 | −1 | 13 |
| 10011111 | −1 | 15 |
| 10100000 | −11 | 5 |
| 10100001 | −11 | 7 |
| 10100010 | −9 | 5 |
| 10100011 | −9 | 7 |
| 10100100 | −11 | 3 |
| 10100101 | −11 | 1 |
| 10100110 | −9 | 3 |
| 10100111 | −9 | 1 |
| 10101000 | −13 | 5 |
| 10101001 | −13 | 7 |
| 10101010 | −15 | 5 |
| 10101011 | −15 | 7 |
| 10101100 | −13 | 3 |
| 10101101 | −13 | 1 |
| 10101110 | −15 | 3 |
| 10101111 | −15 | 1 |
| 10110000 | −11 | 11 |
| 10110001 | −11 | 9 |
| 10110010 | −9 | 11 |
| 10110011 | −9 | 9 |
| 10110100 | −11 | 13 |
| 10110101 | −11 | 15 |
| 10110110 | −9 | 13 |
| 10110111 | −9 | 15 |
| 10111000 | −13 | 11 |
| 10111001 | −13 | 9 |
| 10111010 | −15 | 11 |
| 10111011 | −15 | 9 |
| 10111100 | −13 | 13 |
| 10111101 | −13 | 15 |
| 10111110 | −15 | 13 |
| 10111111 | −15 | 15 |
| 11000000 | −5 | −5 |
| 11000001 | −5 | −7 |
| 11000010 | −7 | −5 |
| 11000011 | −7 | −7 |
| 11000100 | −5 | −3 |
| 11000101 | −5 | −1 |
| 11000110 | −7 | −3 |
| 11000111 | −7 | −1 |
| 11001000 | −3 | −5 |
| 11001001 | −3 | −7 |
| 11001010 | −1 | −5 |
| 11001011 | −1 | −7 |
| 11001100 | −3 | −3 |
| 11001101 | −3 | −1 |
| 11001110 | −1 | −3 |
| 11001111 | −1 | −1 |
| 11010000 | −5 | −11 |
| 11010001 | −5 | −9 |
| 11010010 | −7 | −11 |
| 11010011 | −7 | −9 |
| 11010100 | −5 | −13 |
| 11010101 | −5 | −15 |
| 11010110 | −7 | −13 |
| 11010111 | −7 | −15 |
| 11011000 | −3 | −11 |
| 11011001 | −3 | −9 |
| 11011010 | −1 | −11 |
| 11011011 | −1 | −9 |
| 11011100 | −3 | −13 |
| 11011101 | −3 | −15 |
| 11011110 | −1 | −13 |
| 11011111 | −1 | −15 |
| 11100000 | −11 | −5 |
| 11100001 | −11 | −7 |
| 11100010 | −9 | −5 |
| 11100011 | −9 | −7 |
| 11100100 | −11 | −3 |
| 11100101 | −11 | −1 |
| 11100110 | −9 | −3 |
| 11100111 | −9 | −1 |
| 11101000 | −13 | −5 |
| 11101001 | −13 | −7 |
| 11101010 | −15 | −5 |
| 11101011 | −15 | −7 |
| 11101100 | −13 | −3 |
| 11101101 | −13 | −1 |
| 11101110 | −15 | −3 |
| 11101111 | −15 | −1 |
| 11110000 | −11 | −11 |
| 11110001 | −11 | −9 |
| 11110010 | −9 | −11 |
| 11110011 | −9 | −9 |
| 11110100 | −11 | −13 |
| 11110101 | −11 | −15 |
| 11110110 | −9 | −13 |
| 11110111 | −9 | −15 |
| 11111000 | −13 | −11 |
| 11111001 | −13 | −9 |
| 11111010 | −15 | −11 |
| 11111011 | −15 | −9 |
| 11111100 | −13 | −13 |
| 11111101 | −13 | −15 |
| 11111110 | −15 | −13 |
| 11111111 | −15 | −15 |

, where $0 \leq i \leq 7$, Q denotes an imaginary axis value and I denotes a real-number axis value.

8. The transmitter according to claim 7, wherein the 256QAM constellation points are configured by arranging 64 64QAM constellation points in a first quadrant and by imaginary-number axis symmetry, real-number axis symmetry and original symmetry of the 64QAM constellation points.

9. The transmitter according to claim 8, wherein the transmitter simultaneously manages a first table for supporting a legacy modulation scheme and a second table for supporting a 256QAM scheme.

10. The transmitter according to claim 9, wherein the transmitter controls the transmission unit to transmit a higher layer signal including an indicator indicating whether the 256QAM scheme is supported, and to transmit a modulation and coding scheme (MCS) index indicating the 256QAM scheme by selecting from the second table to a receiver.

11. The transmitter according to claim 10, wherein the MCS index has a size of 5 bits.

12. The transmitter according to claim 10, wherein the transmitter is a base station and the receiver is a user equipment (UE).

* * * * *